United States Patent [19]

Heiny

[11] Patent Number: 5,778,356
[45] Date of Patent: Jul. 7, 1998

[54] DYNAMICALLY SELECTABLE LANGUAGE DISPLAY SYSTEM FOR OBJECT ORIENTED DATABASE MANAGEMENT SYSTEM

[75] Inventor: William C. Heiny, Arvada, Colo.

[73] Assignee: Cadis, Inc., Boulder, Colo.

[21] Appl. No.: 745,255

[22] Filed: Nov. 8, 1996

Related U.S. Application Data

[63] Continuation-in-part of Ser. No. 339,481, Nov. 10, 1994, and a continuation-in-part of Ser. No. 527,161, Sep. 12, 1995, and a continuation-in-part of Ser. No. 526,555, Sep. 12, 1995.

[60] Provisional application No. 60/006,317, Nov. 7, 1995.

[51] Int. Cl.$^6$ ...................................................... G06F 17/30
[52] U.S. Cl. .............................. 707/2; 707/103; 707/104
[58] Field of Search ............................ 707/2, 103, 104

[56] References Cited

U.S. PATENT DOCUMENTS

| | | | |
|---|---|---|---|
| 3,343,133 | 9/1967 | Dirks . | |
| 4,318,184 | 3/1982 | Millett et al. | 707/1 |
| 4,879,648 | 11/1989 | Cochran et al. | 345/353 |
| 4,887,206 | 12/1989 | Natarajan | 705/29 |
| 4,918,602 | 4/1990 | Bone et al. | 705/1 |
| 4,930,071 | 5/1990 | Tou et al. | 707/4 |
| 4,984,155 | 1/1991 | Geier et al. | 705/26 |
| 5,021,992 | 6/1991 | Kondo | 395/54 |
| 5,109,337 | 4/1992 | Ferriter et al. | 705/29 |
| 5,133,075 | 7/1992 | Risch | 707/201 |
| 5,146,404 | 9/1992 | Calloway et al. | 705/1 |
| 5,148,541 | 9/1992 | Lee et al. | 707/2 |
| 5,191,534 | 3/1993 | Orr et al. | 364/468.12 |
| 5,206,949 | 4/1993 | Cochran et al. | 707/4 |
| 5,210,868 | 5/1993 | Shimada et al. | 707/104 |
| 5,257,365 | 10/1993 | Powers et al. | 707/100 |
| 5,260,866 | 11/1993 | Lisinski et al. | 705/29 |
| 5,283,865 | 2/1994 | Johnson | 345/357 |
| 5,440,482 | 8/1995 | Davis | 707/6 |
| 5,497,319 | 3/1996 | Chong et al. | 707/1 |
| 5,535,120 | 7/1996 | Chong et al. | 704/3 |
| 5,625,773 | 4/1997 | Bespalko et al. | 345/467 |
| 5,652,884 | 7/1997 | Palevich | 395/651 |
| 5,664,189 | 9/1997 | Wilcox et al. | 707/205 |

*Primary Examiner*—Wayne Amsbury
*Attorney, Agent, or Firm*—Baker & Botts, L.L.P.

[57] ABSTRACT

A dynamically selectable language display system for object oriented database management systems is disclosed. Class objects are provided having international string parameters that include a pointer to an international string list, the international string list including a language handle structure linked to a plurality of character strings in different languages. A handle manager is provided which is operative to select a character string corresponding to one of said plurality of character strings for display which corresponds to a dynamically selectable user specified language handle, whereby a representation of said class object may be simultaneously displayed to a plurality of users in different languages based upon a language handle individually selectable by each of said plurality of users.

1 Claim, 41 Drawing Sheets

| International String Attribute ← 290 |
|---|
| International String Name List — 284 |
| My Handle — 285 |
| defining Class Handle — 286 |
| is Required? — 287 |
| is Protected? — 288 |
| Meta Parameter List — 289 |

FIG. 13A

Enumerated Set Selector Specific Data

Boolean Selector Specific Data

DYNAMICALLY SELECTABLE LANGUAGE DISPLAY SYSTEM FOR OBJECT ORIENTED DATABASE MANAGEMENT SYSTEM

CROSS-REFERENCE TO RELATED APPLICATIONS

This application is a continuation-in-part of application Ser. No. 08/339,481, filed Nov. 10, 1994, by Thomas S. Kavanagh, et al., for OBJECT ORIENTED DATABASE MANAGEMENT SYSTEM, now pending, the entire disclosure of which is incorporated herein by reference. In addition, this application is a continuation-in-part of application Ser. No. 08/527,161, filed Sep. 12, 1995, by Thomas S. Kavanagh, et al., for METHOD AND APPARATUS FOR CONCURRENCY IN AN OBJECT ORIENTED DATABASE, now pending, the entire disclosure of which is incorporated herein by reference. This application is also a continuation-in-part of application Ser. No. 08/526,555, filed Sep. 12, 1995, by Thomas S. Kavanagh, et al., for IMPROVEMENTS IN AN OBJECT ORIENTED DATABASE MANAGEMENT SYSTEM, now pending, the entire disclosure of which is incorporated herein by reference. This application discloses information related to patent application Ser. No. 08/747,164, filed contemporaneously herewith on Nov. 7, 1996, by Christopher W. Beall, et al., for SEARCH ENGINE FOR REMOTE ACCESS TO DATABASE MANAGEMENT SYSTEMS, now pending the entire disclosure of which is incorporated herein by reference. This application also discloses information related to provisional patent application Ser. No. 60/006,317, filed Nov. 7, 1995, by Christopher W. Beall, et al., for SEARCH ENGINE FOR REMOTE OBJECT ORIENTED DATABASE MANAGEMENT SYSTEM, now pending, the entire disclosure of which is incorporated herein by reference.

BACKGROUND OF THE DISCLOSURE

Multi-national business enterprises often find it necessary to maintain mission critical information in databases. However, such information often may need to be accessed by individuals who speak different languages. The growth of the Internet, and the so-called World Wide Web, has created a wide area network that can be accessed world wide. Data available on a server or web site may be accessible by individuals world wide who speak many different languages.

In the past, it has been desirable to provide access to information, for example information in a database, which may be accessed in different languages simultaneously. In order to express different languages, different character sets must be supported by a database management system. Some languages can be expressed in character sets that only require a 8-bit field to uniquely specify each character. However, some languages such as Japanese may have character sets that are too large to specify all of the required characters with an 8-bit field.

In addition to differences in the actual language used in a database, other differences in the expression and operation of a database often need to be taken into account in different countries and different cultures. For example, date formats are often different. In some countries, the convention is to express the month, followed by the day, followed by the year. In other countries, it is common to express a date as a day, followed by a month, followed by a year. Thus, the expression Mar. 6, 1996 would be interpreted as Mar. 6, 1996 in some countries, and as Jun. 3, 1996 in others. In other areas, the year may come first, or an entirely different calendar may be used. For example, in Japan, the year may be expressed with reference to the dynasty of a particular emperor.

The formatting of numbers may be different between different countries and cultures. For example, some conventions use commas to separate the digits in a large number, such as U.S. Pat. No. 5,778,931. Other conventions may use different group separators such as periods. The local currency symbol may also be different.

Moreover, differences can exist in the operation of the database, such as in sort sequences. For example, a search or query may return a series of values that are displayed in alphabetical order. However, different languages may have different linguistic conventions. For example, in Spanish, the double characters "ll" and "ch" may be treated as single characters in the applicable sort sequence. In German, the "a umlaut" may be sorted before "b", but in Swedish, it should be sorted after "z". Specific linguistic sorts may be desirable for Arabic, Czech, Danish, Dutch, Finnish, German, Greek, Hebrew, Hungarian, Icelandic, Italian, Latin, Norwegian, Polish, Russian, Slovak, Spanish, Swedish, Swiss and Turkish.

In the past, it has been necessary to constrain individuals to accessing data maintained in a single language that is not their native language, and which may utilize only one sort sequence associated with that specific language. Alternatively, it might be possible to bulk copy data from one database in one language, to one or more other databases in other languages. However, it is difficult to keep such multiple databases in synchronization, and considerable time may be required each time a bulk copy is made, because typically time will be consumed performing required data conversions in addition to the time required for the actual copy operation. Normally, this would require the database to be taken down or off-line, rendering the data inaccessible while the bulk copy is being made. In the type of multi-national enterprise where the availability of data in multiple languages is most needed, at any given moment during a 24 hour period one or more offices around the world may be open and require access to current data. There may not be any convenient time during which the data could be taken off-line.

In the past, Oracle has attempted to address the problem of national language support. In version 7 of Oracle for Sun SPARC Solaris 2.x, for example, the character encoding scheme may be specified, but it is fixed for the life of the database. The character set for a given database cannot be changed subsequently without recreating the database. *Oracle7 for Sun SPARC Solaris 2.x: Installation & Configuration Guide*, at C-3 (Release 7.1.6 March 1995).

A solution to these problems should preferably accommodate remote access of a database in a runtime environment that can support iterative queries of the database with feedback to the user while providing acceptable speed and performance over a communications channel having limits upon the channel's bandwidth and/or throughput capability.

Attempts to address this problem in the past have not been entirely satisfactory, and leave room for improvement. There has been a long felt need for a database management system that could allow a plurality of different users to simultaneously access the same data in a single knowledge base in different languages.

SUMMARY OF THE INVENTION

The present invention provides a database management system that allows a plurality of different users to simultaneously access the same data in a single knowledge base in different languages.

The present invention may be employed in an especially advantageous embodiment of an object oriented database management system. In this patent, the example used for purposes of describing and illustrating the invention is a preferred embodiment involving an object oriented database management system. However, the ability to simultaneously access a collection of information in multiple languages has application to other environments, and other types of databases. The scope of the present invention is not necessarily limited to the specific embodiment described herein.

An advantageous embodiment and application of the present technology includes an object oriented database system that provides remote access to a knowledge base server over a network such as the Internet using executable content in a Java enabled client based html interpreter or browser application.

BRIEF DESCRIPTION OF THE DRAWINGS

FIG. 13A illustrates the data structure for an international string attribute.

DETAILED DESCRIPTION OF A PREFERRED EMBODIMENT

The present invention can be advantageously used in a client/server network environment. A number of configurations are possible, and only one example will be described herein. It should be understood that the present description is intended to be illustrative of a presently preferred embodiment, and is not necessarily limited to the particular example or configuration described herein.

Figure 1:
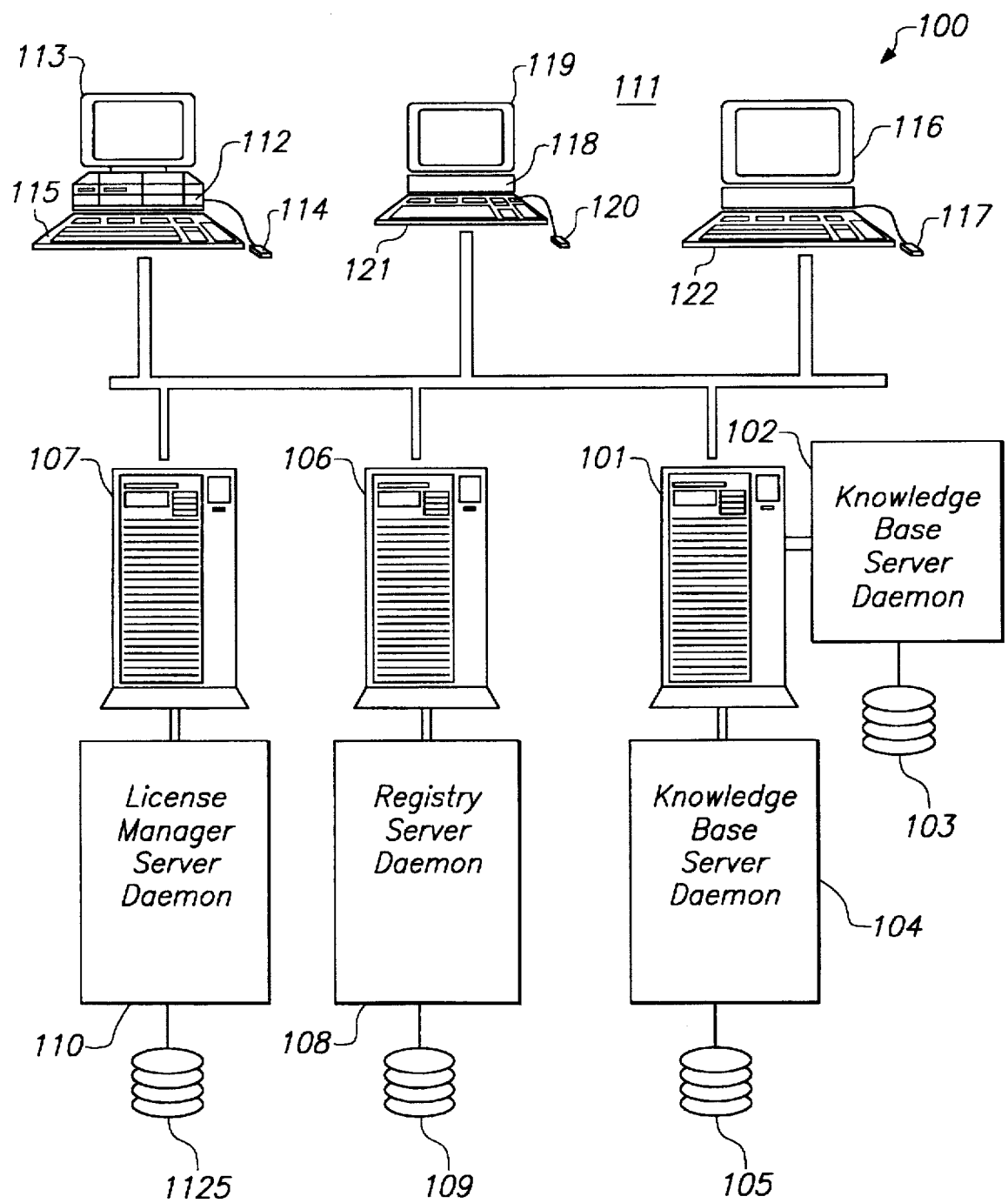
FIG. 1 is a schematic diagram of a network environment that is suitable for use in connection with the present invention.

A suitable network environment is illustrated in FIG. 1. The network 100 includes a first UNIX server host 101. One or more knowledge bases 123 (see FIG. 2) are installed on the first UNIX server host 101. In the example shown in FIG. 1, data such as a knowledge base 123 is physically stored on a first disk drive 103 (sometimes referred to as secondary storage), although those skilled in the art will appreciate that any digital storage may be used. In the illustrated example, a first knowledge base server daemon 102 runs on the first UNIX server host 101. More than one knowledge base server 102 may exist on the system 100. For example, a second knowledge base server daemon 104 may be provided. Similarly, data may be physically stored on a second disk drive 105. The first UNIX server host 101 may communicate over a network with a second UNIX server host 106 and a third UNIX server host 107. In this example, a registry server daemon 108 is installed on the second UNIX server host 106. The registry server daemon 108 could run on the same UNIX server host 101 as the knowledge base server daemons 102 and 104. Certain files containing information used by the registry server 108 may be physically stored on a third disk drive 109. The registry server 108 is used to administer user access to features and access to knowledge bases. The registry server 108 also allows a system administrator to set up different user profiles for different types of users. For example, there may be some users who only need access permission to retrieve parts from a knowledge base 123. Other users may need access permission to add parts, or edit existing parts. The registry server 108 provides a convenient way to specify and control user access to specific functions. The registry server 108 describes the knowledge bases in use, the users that are allowed to use the system, and the access rights that each user has to the listed knowledge bases.

A license manager server daemon 110 is installed on the third UNIX server host 107. The license manager server 110 controls the number of licenses available to any authorized user on the network 100. The license manager 110 uses "floating" licenses. For example, when twenty licenses are available through the license manager 110, any twenty users of the network can use these licenses concurrently.

Before a knowledge base server 102 can be started, the license manager server 110 and the registry server 108 must be running. In order for the registry server daemon 108 to continue to run, it must be able to obtain a license from the license manager server 110. If the registry server 108 can not contact the license manager server 110, it will exit. Therefore, in a presently preferred embodiment, the license manager server 110 should be started first. The registry server 108 should be started second. The knowledge base server 102 should be started thereafter.

Users may access data available through the knowledge base server 102 or the knowledge base server daemon 104 using a suitable workstation 111 connected to the network 100. For example, a Sun Microsystems SPARCstation 111, preferably running X11R5/Motif v1.2 software. Alternatively, a SPARC compatible workstation may be used. In addition, a Hewlett Packard series 700 workstation running Motif v1.2 with X11R5 will also give satisfactory results. In the illustrated example, the Sun Microsystems SPARCstation 111 runs a SunOS4.1.x operating system. A Hewlett Packard series 700 platform preferably includes HP-UX9.0.x software.

In addition, a user can access the network 100 using an IBM PC compatible computer 112 running Microsoft Windows 95 or Windows v3.1, or higher. In the illustrated example, the IBM PC compatible computer 112 can be a 386, 486, or Pentium based machine, although any microprocessor based computer may be employed. The IBM PC compatible computer 112 includes a display 113, a mouse 114, and a keyboard 115. The display 113 is preferably a VGA or SVGA CRT 113. In the illustrated example, the IBM PC compatible computer 112 may run MS-DOS 5.0 or later disk operating system, with MS-DOS 6.2 being presently preferred if the computer 112 is running Windows 3.1. The IBM PC compatible computer 112 also must have Winsock 1.1 compliant TCP/IP software. A windows client using an IBM PC compatible computer 112 will employ RPC calls via TCP/IP to communicate with the knowledge base server 102. The IBM PC compatible computer 112 should have sufficient available disk space for software installation. In the illustrated example, the IBM PC compatible computer 112 should also have at least 4 megabytes of RAM memory; 16 megabytes of memory is preferred. The Sun Microsystems SPARCstation 111 similarly has a display 116, a mouse 117, and a keyboard 122.

The illustrated network 100 shown in FIG. 1 also supports an X Windows client which employs a computer 118, which has a display 119, a mouse 120, and a keyboard 121. A user can access this system using X Windows in a proper emulation mode interfacing with the workstation 111.

In the example shown in FIG. 1, each of the server hosts 101, 106 and 107 may be a Sun Microsystems SPARCstation (or a SPARC compatible), or a Hewleft Packard series 700 computer. In a presently preferred embodiment, a single UNIX system on the network may be designated to run the knowledge base server daemon 102, the registry server daemon 108, and the license manager server daemon 110. This implementation may provide ease of administration. An embodiment wherein the object oriented database management software and knowledge bases reside on a single server host 101 local disk drive 103 is presently preferred because it is believed to give better performance. However, a knowledge base 123 for example may reside on a remote disk drive 109.

In the present example, the network environment includes an operating system with a file system, supports virtual memory, employs UDP/TCP/IP protocol, and provides ONC/RPC (open network computing/remote procedure call) services. Additional information concerning virtual memory is disclosed in Leffler, S. J.; McKusick, M. K.; Karels, M. J. and Quarterman, J. S., "*The Design and Implementation of the 4.3BSD UNIX Operating System,*" (1989), published by the Addison-Wesley Publishing Co., the entirety of which is incorporated herein by reference. Additional information is disclosed in Bach, M. J., "*The Design of the UNIX Operating System,*" (1986), published by Prentice-Hall, Inc., the entirety of which is incorporated herein by reference. Additional information concerning ONC/RPC services is disclosed in Bloomer, J., "*Power Programming With RPC,*" published by O'Reilly & Associates, Inc., the entirety of which is incorporated herein by reference. In addition, it is useful if the network environment supports multiprocessing and multitasking.

The system described and illustrated herein supports interactive editing by the user. Users are able to change the parts schema by adding and deleting part attributes, and are able to add whole sections to the schema to support their custom parts. In addition to schema editing, parts in the database may be repositioned within the schema hierarchy, as well as being modified, added, and deleted.

The object oriented architecture described herein provides an object oriented tool set that (1) supports dynamic class management, (2) supports a database having a large number of parts (e.g., in excess of several hundred thousand parts), (3) has performance sufficient to support interactive retrieval of parts by hundreds of users, and (4) understands and automatically manages the translation across different units of measure. This system may be referred to as a knowledge base management system.

The example of a knowledge base management system as described herein enables a user to locate "objects" by describing them in terms of their attributes. In a parts management application, these objects are parts, but it could be any other item described by a collection of attributes. Applications are created by subject matter experts—not computer programmers. The sophistication of the application is tied to the development of the subject based schema, not to computer program development.

Figure 2:
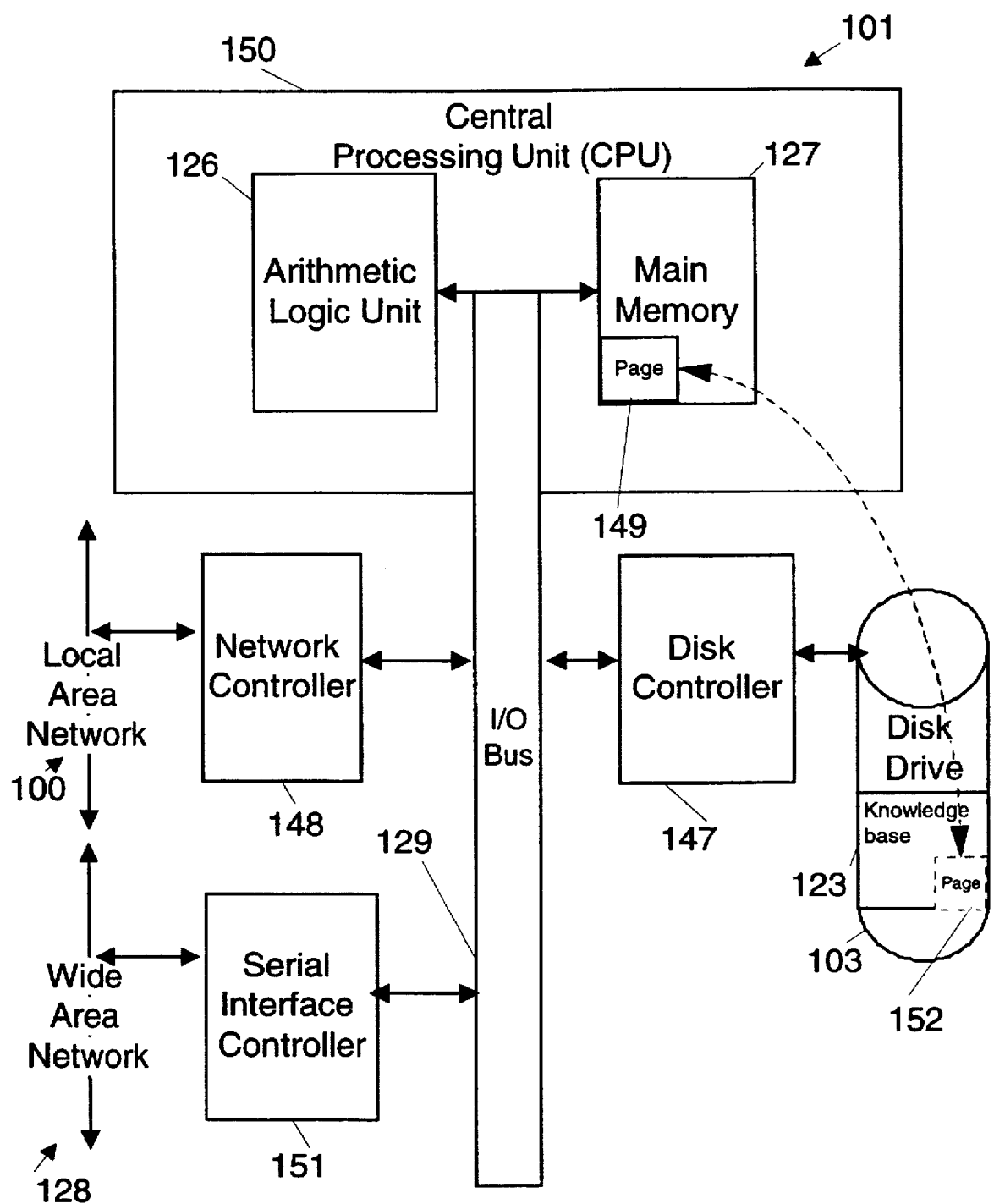
FIG. 2 is a schematic diagram of an example of a server architecture suitable for the invention.
Figure 4:
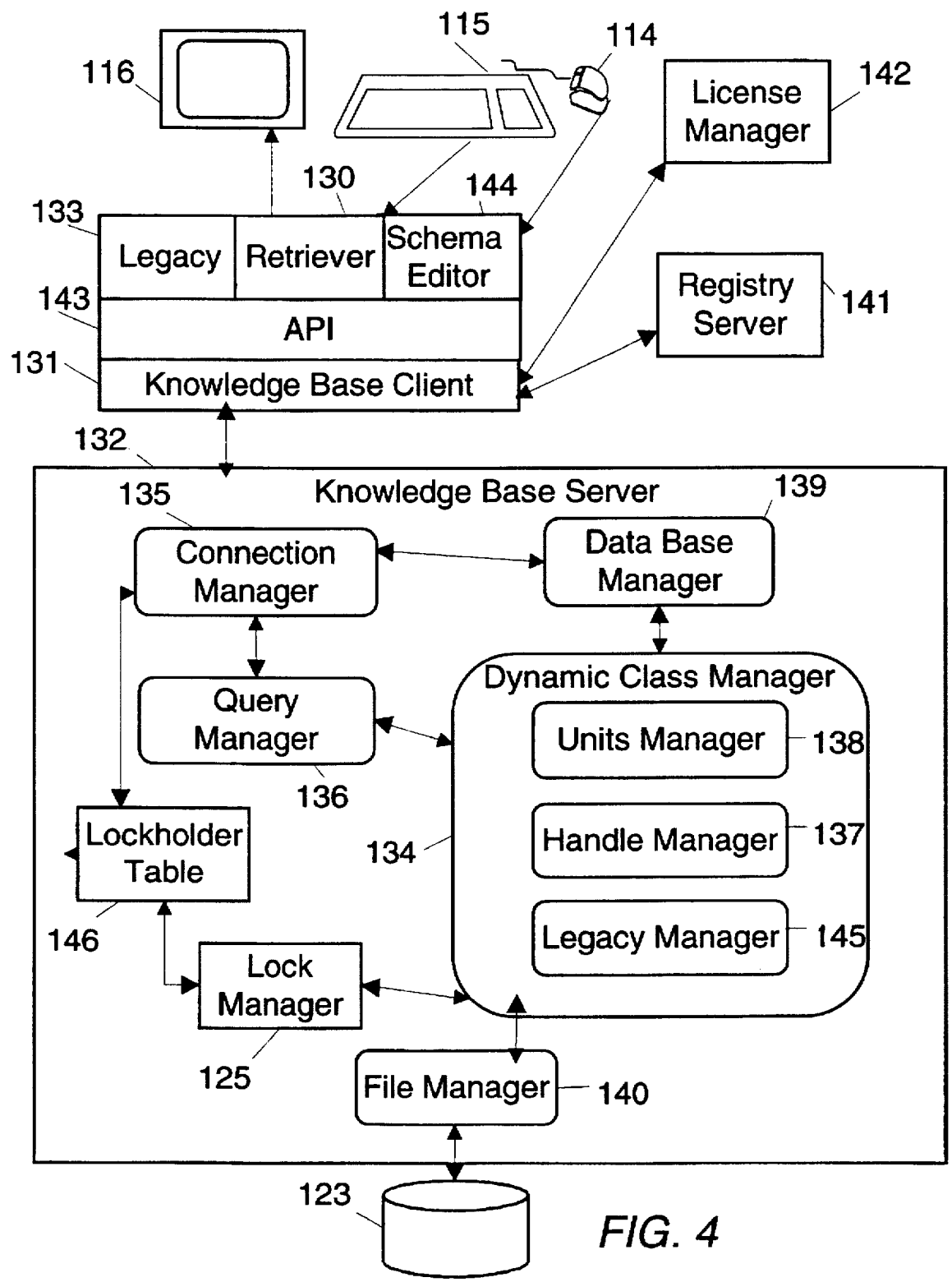
FIG. 4 is a block diagram depicting an overall architecture for an object oriented database management system in connection with which the present invention may advantageously be used.

FIG. 2 shows the major components of a computer hardware configuration 101 providing a suitable computational and communications environment for a knowledge base server 132 (shown in FIG. 4). Those skilled in the art will appreciate that the illustrated hardware configuration is only one example of many possible variations of platforms that could be used in connection with the present invention. The illustrated configuration consists of a central processing unit or CPU 150 which includes an arithmetic logical unit 126 operative to fetch and execute program instructions from a digital store or main memory 127. The programs are stored on a disk drive 103, access to which is provided through a disk controller 147. The knowledge base files 123 are also stored on disk drive 103 and accessed through virtual memory addresses in main memory 127, through which, when required, a page 152 of contiguous data in a disk file 123 is copied into main memory 127, providing a copy 149 of the page 152. The preferred embodiment of an object oriented database system uses virtual memory for this knowledge base management system. The knowledge base server 132 interacts with a client API 143 (see FIG. 4) through a local area network 100, access to which is facilitated by a network controller 148, or through a wide area network 128, access to which is facilitated by a serial interface controller 151. An I/O bus 129 provides a path for data transfers between the CPU 150 and the peripheral data storage, interface and communication components.

Figure 3:
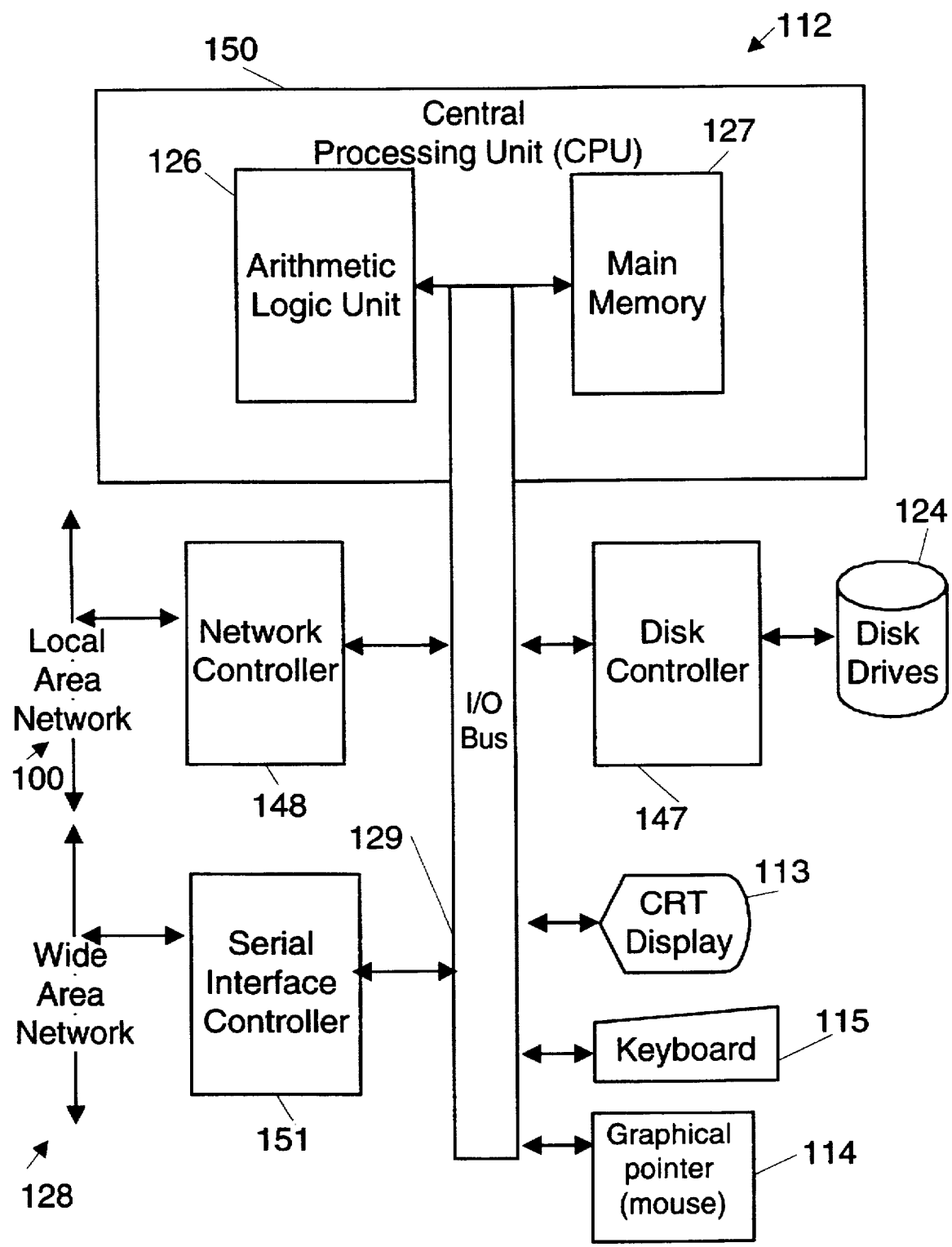
FIG. 3 is a schematic diagram of an example of a client architecture suitable for the invention

FIG. 3 shows the major components of a computer hardware configuration 112 providing a suitable computational and communications environment for a client application, such as a retriever 130, schema editor 144, a graphical user interface and an API 143 (see FIG. 4). The illustrated hardware configuration is only one example of many possible hardware platforms that could be used in connection with the present invention. This configuration consists of a central processing unit or CPU 150 which includes an arithmetic logical unit 126 which fetches and executes program instructions from main memory 127. The programs may be stored on one or more disk drives 124, access to which is provided through a disk controller 147. Alternatively, some portion of such programs may consist of executable content such as Java script or Java applets downloaded from the wide area network 128, which may be the Internet 128. The user interacts with the system through the keyboard 115 and a mouse or similar graphical pointer 114 with the graphical user interface displayed on the CRT display 113. The API 143 may communicate with the knowledge base server 132 through a local area network 100, access to which is facilitated by a network controller 148, or through a wide area network 128, access to which is facilitated by a serial interface controller 151. Alternatively, an API 143 may communicate with a proxy server through the wide area network 128. An I/O bus 129 provides a path for data transfers between the CPU 150 and the peripheral data storage, interface and communication components.

The present invention may be advantageously used in connection with an object oriented database management system. In order to appreciate the structure, function and operation of the invention, the overall architecture of a presently preferred embodiment of an object oriented database management system will be described. The structure, function, and operation of the preferred object oriented database management system is described in detail in applications Ser. No. 08/339,481, Ser. No. 08/527,161, and Ser. No. 08/526,555, all of which are now pending and are incorporated herein by reference.

Turning now to FIG. 4, a presently preferred embodiment of an object oriented database management system may include a retriever 130, a knowledge base client 131, and a knowledge base server 132. A legacy manager 133 is preferably included to facilitate organization of an existing legacy database into a schema for use in connection with the present invention. In the illustrated embodiment, the knowledge base server 132 includes a dynamic class manager 134, a connection manager 135, a query manager 136, a handle manager 137, a units manager 138, a database manager 139, a file manager 140, a lock manager 125, and a lockholder table 146. A presently preferred system also includes a registry server 141 and license manager 142 to control unauthorized user access to the system. A schema editor 144 is preferably provided to modify or customize the schema. An application programming interface or API 143 is also provided in the illustrated environment.

A knowledge base 123 is a database containing information, and is stored on a disk drive 103. The knowledge base 123 in the present example comprises three files: the schema file, the variable data file, and the instance file. A schema is a collection of classes, attributes, enumerators, languages, units, and unit families and their relationships.

In the presently illustrated example, each knowledge base server 132 provides access to one knowledge base 123. Therefore, the UNIX server host 101 runs one server for each knowledge base 123. However, the present invention is not limited to the illustrated example.

Unlike an RDBMS based application, with the present knowledge base management system solution, complexity, and thus response time, does not increase exponentially with size and number of relationships. Knowledge is not tied to the quantity of software code. Schema can be dynamically updated without recompiling the application. Data and schema are interactively user modifiable. A query is equivalent to finding corresponding indices, not computing RDBMS table joins. Database size is reduced. A knowledge base management system database 123 using the object oriented architecture described herein is typically about 1/10 the size of an equivalent RDBMS database.

Figure 5:
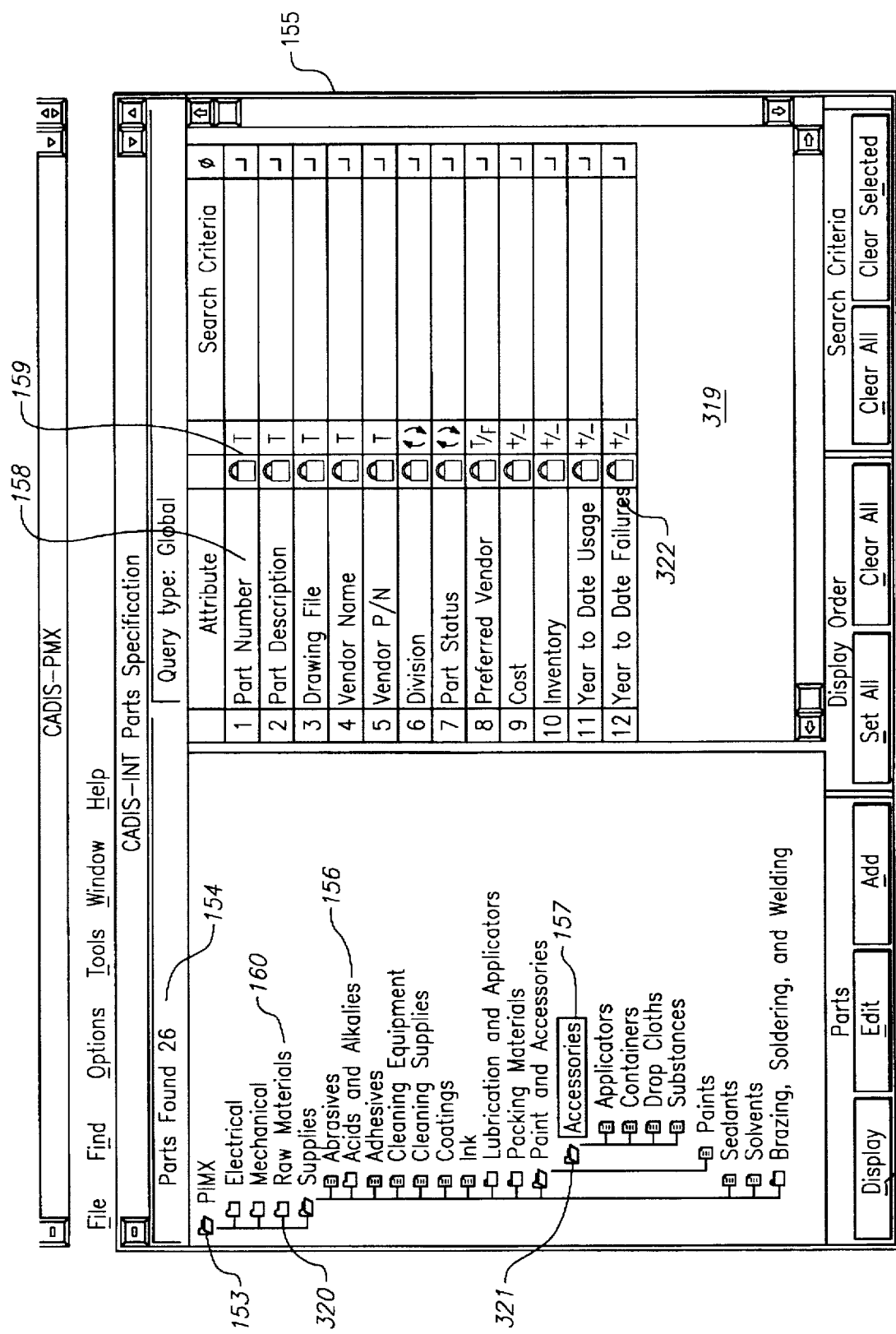
FIG. 5 depicts an example of a display of a part specification window where the selected language is English.

A user navigating down into an object oriented knowledge base 123 is preferably presented with information relating to the knowledge base 123 in the form of a graphical display on a CRT display 113. FIG. 5 is an example of a presently preferred graphical display. In this example, all information is displayed in the English language.

Figure 6:
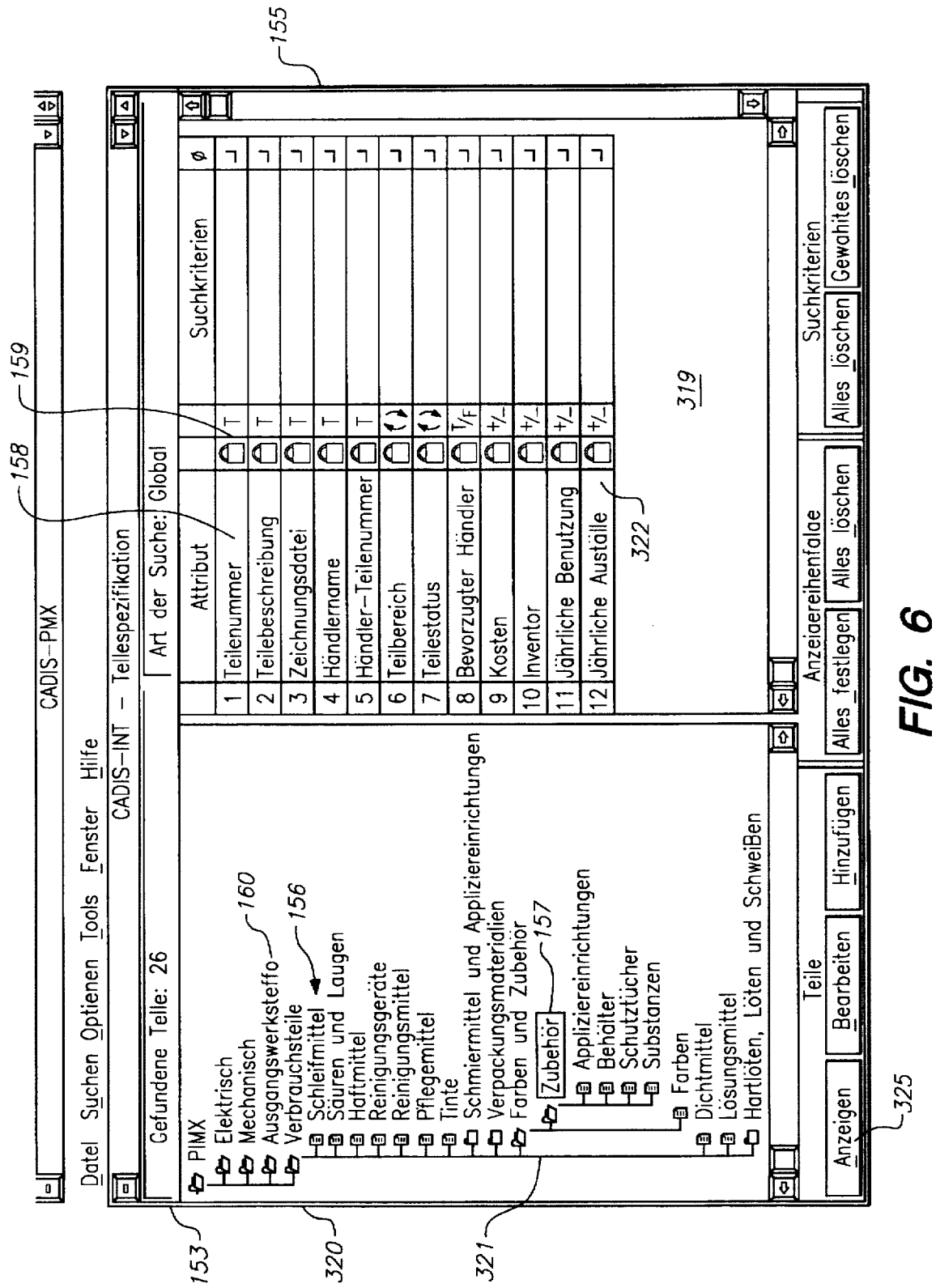
FIG. 6 depicts an example of a display of a part specification window where the selected language is German.

In accordance with the present invention, another user can, at the same time, access the knowledge base file 123 and display information in a similar graphical display, but which displays information in a different language, such as is shown in FIG. 6. FIG. 6 shows an example of a display of the same information in the German language. And the second German user can display information, and independently access and query the same knowledge base 123, simultaneously with the first English-speaking user who is displaying information in the English language. Other users can also access the same knowledge base 123 at the same time and display information in other selectable languages of their choice, such as Achinese, Afrikaans, Akan, Albanian, American English, Amharic, Arabic, Armenian, Assamese, Aymara, Azeri, Balinese, Baluchi, Bashkir, Batak Toba, Baule, Beja, Bemba, Bengali, Beti, Bhili, Bikol, Brahvi, Bugis, Bulgarian, Burmese, Buyi, Byelorussian, Cantonese, Catalan, Cebuano, Chagga, Chiga, Chuvash, Czech, Danish, Dimli, Dogri, Dong, Dutch-Flemish, Dyerma, Edo, Efik, English, Estonian, Ewe, Finnish, Fon, French, Fula, Fulakunda, Futa Jalon, Galician, Ganda, Georgian, German, Gilaki, Gogo, Gondi, Greek, Guarani, Gujarati, Gusii, Hadiyya, Hakka, Hani, Hausa, Haya, Hebrew, Hindi, Ho, Hungarian, Iban, Igbo, Ijaw, Ilocano, Italian, Japanese, Javanese, Kabyle, Kamba, Kannada, Kanuri, Karo-Dairi, Kashmiri, Kazakh, Kenuzi-Dongola, Khmer, Khmer (Northern), Kikuyu, Kituba, Klingon, Kongo, Konkani, Korean, Kurdish, Kurukh, Kyrgyz, Lampung, Lao, Latvian, Lingala, Lithuanian, Luba-Lulua, Luba-Shaba, Lubu, Luhya, Luo, Luri, Lwena, Macedonian, Madurese, Magindanaon, Makassar, Makua, Malagasy, Malay-Indonesian, Malay, Pattani, Malayalam, Malinke-Bambara-Dyula, Mandarin, Marathi, Mazandarani, Mbundu, Meithei, Mende, Meru, Miao, Mien, Min, Minangkabau, Mongolian, Mordvin, More, Nepali, Ngulu, Nkole, Norwegian, Nung, Nupe, Nyamwezi-Sukuma, Nyanja, Oriya, Oromo, Pampangan, Panay-Hiligaynon, Pangasinan, Pashtu, Pedi, Persian, Polish, Portuguese, Provengal, Punjabi, Quechua, Rejang, Riff, Romanian, Romany, Ruanda, Rundi, Russian, Samar-Leyte, Sango, Santali, Sasak, Serbo-Croatian, Sgaw, Shan, Shilha, Shona, Sidamo, Sindhi, Sinhalese, Slovak, Slovene, Soga, Somali, Songye, Soninke, Sotho, Spanish, Sundanese, Swahili, Swati, Swedish, Sylhetti, Tagalog, Tajiki, Tamazight, Tamil, Tatar, Tausug, Telugu, Temne, Thai, Tho, Thonga, Tibetan, Tigrinya, Tiv, Tonga, Tswana, Tudza, Tulu, Tumbuka, Turkish, Turkmen, Uighur, Ukrainian, Urdu, Uzbek, Vietnamese, Wolaytta, Wolof, Wu, Xhosa, Yao, Yi, Yiddish, Yoruba, Zande, Zhuang and Zulu. The present architecture has the capability of supporting a knowledge base that could be simultaneously viewed by a hundred different users in a hundred different languages. In addition, the language that a user has selected may be dynamically changed. In other words, a user may switch from one language to another during a session, and the display will be re-displayed in the new language that was selected by the user. For example, a user displaying the information shown in FIG. 5 in English may select a different language, such as German, and the system will then re-display the same screen of information in the new selected language, as shown in FIG. 6.

Figure 7:
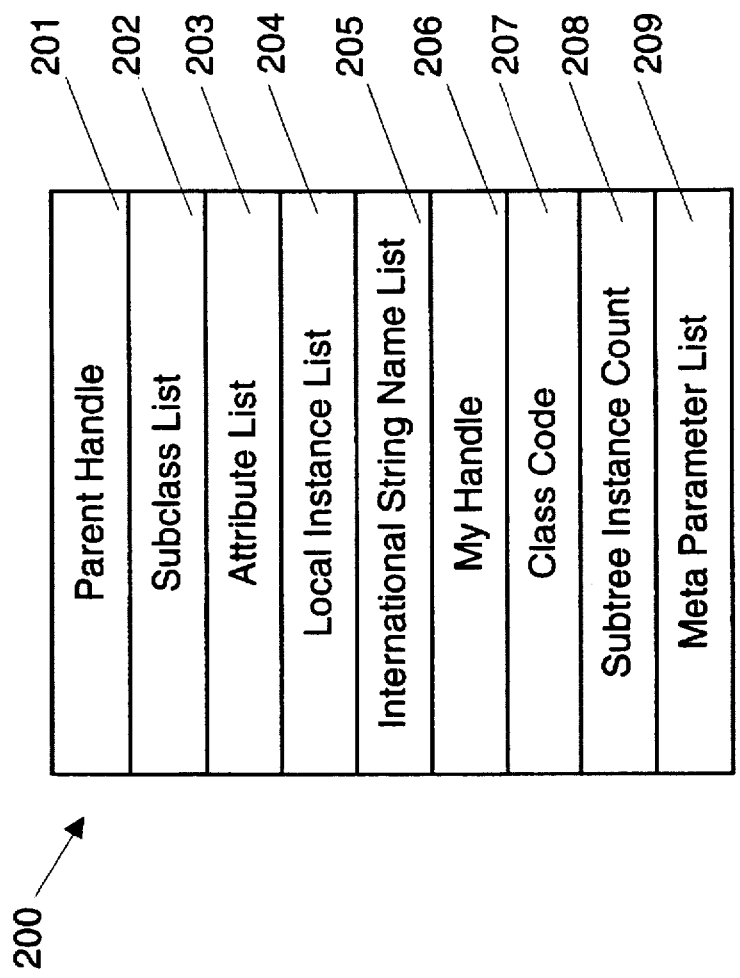
FIG. 7 shows the internal object representation for a class.

FIG. 7 shows the internal object representation for a class 200. In the present schema, a class object 200 has a parent handle 201. Every class object 200 includes stored information representing the handle of its parent class, except in the special case of a root class 153, which has no parent. A null is stored in this location in that case. A handle is a reference to an object. The parent handle information 201 is used by the handle manager 137 to identify the stored class object which is the parent class for the class object 200.

Figure 12:
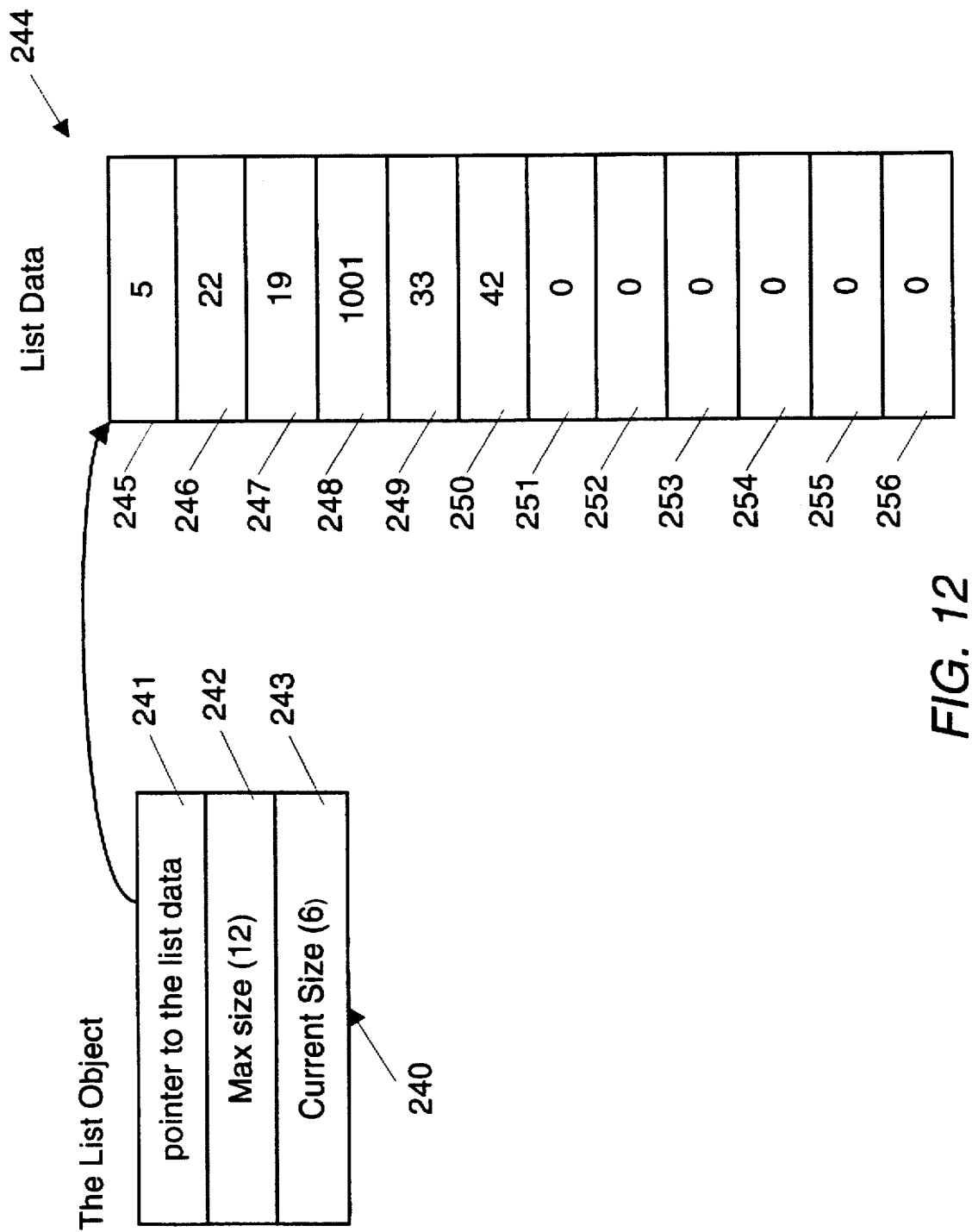
FIG. 12 depicts the data structure for a list object.

The class object 200 includes a subclass list 202. The subclass list 202 is a list of handles which may be used by the handle manager 137 to identify those class objects which are subclasses of the class 200. In the internal representation provided in the object oriented database management system described herein, lists can grow without bounds and are dynamic. Details concerning the architecture used for lists to achieve this advantage are shown in FIG. 12, and are described in more detail below. The available storage space is not a fixed or predetermined amount of space. The system does not have to allocate a large amount of space in advance just to accommodate further growth in the size of the knowledge base 123 (much of which space would typically go unused and therefore be wasted). Nor does the system have to run the risk of running out of memory space to store subclasses of a particular class (even though memory space is available in the main store 103) in situations where enough space was not allocated in advance specifically for the purpose of storing information identifying the subclasses of the class.

This provides flexibility and power to the database structure described herein, because the class object 200 may have an extremely large number of subclasses in a large object oriented database conforming to the architecture described herein without substantial degradation in performance.

The class object 200 includes an attribute list 203. The attribute list 203 is a list of handles. The handle manager 137 may use the information stored in the attribute list 203 to identify the attributes possessed by class object 200. The class object 200 also includes a local instance list 204, which is a handle list.

Figure 10:
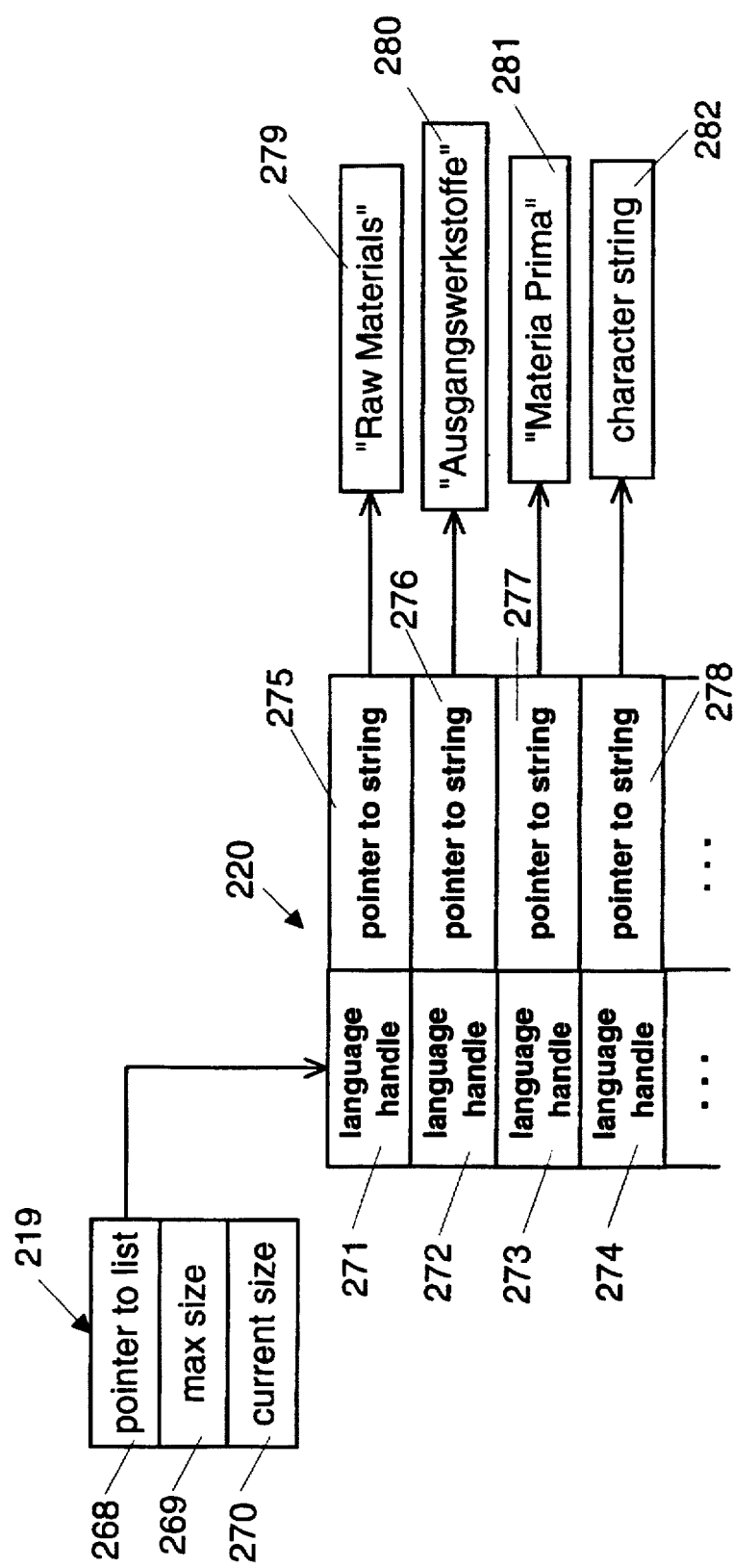
FIG. 10 depicts details of data structures used for international strings.

Field 205 shown in FIG. 7 is an area that is used to store an international string name list 219 (shown in FIG. 10). In accordance with the architecture and methods described more fully below, this is one of the features of the present invention that is used to eventually locate associated storage locations of text describing the class 200 in several different languages, and to select the appropriate text string for display that corresponds to the particular language that is desired by this particular user. This will be described in more detail in connection with FIG. 10.

Referring to FIG. 7, the class object 200 also includes a field 206 which is used to store the handle for the class 200. A field 207 stores an indication of the class code, i.e., whether it is primary, secondary, or a collection.

The class object 200 also includes a subtree instance count 208. The subtree instance count 208 is a numeric indication of the total number of items or instances present in all of the descendants of the class object 200, i.e., the total number of instances in class 200, all of the class 200's subclasses, all of the subclasses' subclasses, and so on. Referring, for example, to FIG. 5, the instance count 208 is used to generate the "parts found" 154 field which is displayed on the parts specification window 155. Thus, when a user is navigating through the tree structure 156 of a knowledge base 123, as a user selects and opens subclasses, the user can be immediately informed of the number of parts found 154 at any location on the tree 156 by retrieving the subtree instance count 208 for the current class 157 and passing that information to the retriever 130. The subtree instance count 208 is kept up to date whenever the knowledge base 123 is modified, so it is not necessary while a user is navigating through the tree structure 156 of the database 123 to perform a real time computation of parts found 154.

As shown in FIG. 7, the class object 200 also preferably includes a metaparameter list 209. The metaparameter list 209 is a string list, and may be used as a pointer to strings containing linking information for example, the name of a file that contains a graphical display of the type of parts represented by the class 200, thesaurus information used for Legacizing data, or other Legacizing information.

Turning now to FIG. 10, additional details of the structure and operation of international string list objects 219 can be explained. The international string list object 219 contains a pointer 268 to the list of text string pairs 220. More specifically, the pointer 268 may contain a pointer which points to the beginning pair 271 and 275 of the list 220. The international string list object 219 also includes a field 269 containing information on the maximum size or number of elements that have been allocated for the list 220. This field 269 can be used to determine the amount of storage space currently allocated for the list 220. The international string list object 219 has a field 270 which contains information on the current size of the list 220. This field 270 can be used to determine how many valid entries are contained in the list 220.

The fields 269 and 270 may be better understood in connection with similar fields used in a generic list object 240 shown in FIG. 12. FIG. 12 depicts an example of a generic list object 240. The class manager 134 uses lists of handles, lists of floating point values, lists of pointers to character strings, etc. whenever a variable amount of data can be associated with an object. The example list object 240 depicts a list of simple integers.

The list object 240 shown in FIG. 12 includes a pointer 241 which points to the beginning 245 of the list data 244. A list object 240 also includes a field 242 indicating the amount of space presently allocated for the list data 244. The list object 240 also includes a field 243 containing information indicating the amount of list data 244 currently in use.

The list data 244 contains the actual list of values. In the illustrated example shown in FIG. 12, the first item 245 in the list contains the numeric value "5". List item 246 contains the value "22". Similarly, in this example list items 247, 248, 249 and 250 also contain numeric values. The locations 245, 246, 247, 248, 249 and 250 contain valid data. List items 251, 252, 253, 254, 255 and 256 in this example are not currently in use and are set to zero. In this illustrated example, the currently allocated size 242 of the list is twelve. The amount of space that is actually in use 243 in this list 244 is six, meaning that the first six items in the list are valid.

The fields 269 and 270, shown in FIG. 10, operate in the same manner as that described for the fields 242 and 243, respectively, shown in FIG. 12.

Referring to FIG. 10, the list of text string pairs 220 contains a pair of fields for each language that is supported for this object. For example, the first pair comprises a first language handle 271 and a first pointer 275 to a string 279 associated with the corresponding object. The string is expressed in a first language corresponding to the first language handle 271. If the corresponding object is the selected class 160 shown in FIG. 5, the first language handle 271 corresponds to the English language in this example. The first pointer 275 then points (directly or indirectly) to the character string 279, which contains the English language string "Raw Materials" that is the name of the selected class 160 that is to be displayed to the user. The second language handle 272 in this example corresponds to the German language. A second pointer 276 points to the character string 280, which contains the German language string "Ausgangswerkstoffe" that is the name of the selected class 160 that is to be displayed to a user who speaks German.

Similarly, a third pair comprises a third language handle 273 and a third pointer 277 to a string 281 associated with the corresponding object that is represented in a third language corresponding to the third language handle 273. For example, if the third language is Spanish, the character string 281 would be "Materia Prima" for the Spanish name of the selected class. A fourth pair includes a fourth language handle 274 and a fourth pointer 278 which points to a string 282 that is the name of the selected class 160 in a fourth language corresponding to the fourth language handle 274. Additional pairs may be included, only four being shown here for simplicity. The number of languages that can be accommodated this way is sufficient to include every language spoken in the civilized world, if a database administrator desires to do so.

In FIG. 7, it should be understood that the area 205 is the international string list 219, and actually has three fields (or subfields) contained in the area 205. In the illustrated embodiment, the three fields 268, 269 and 270 shown as the international string list 219 in FIG. 10 are all embedded in the area 205 shown in FIG. 7. Thus, the area 205 contains a pointer 268 to the list of text string pairs 220, a field 269 containing information on the maximum size allocated for the list 220, and a field 270 which contains information on the current size of the list 220.

When an operation is performed that requires the display of text, such as the name of the class 200, using an international string list 219, the pointer 268 is used to locate the list of pairs 220. Based upon the language handle 273 corresponding to the language (for example Spanish) selected by the current user, the corresponding pointer 277 is used to locate the character string 281 (in this example "Materia Prima") which is retrieved and displayed to the user. A plurality of users may be viewing the same class 200, and each one can simultaneously view the name of the class 200 in his own language. The character string 279, 280, 281, or 282, etc., will be retrieved and displayed based upon the language handle 271, 272, 273, or 274, etc., respectively, which corresponds to the language selected by the user.

An example of the use of these data structures by the dynamic class manager 134 is the procedure of a user selecting a class 157 by clicking on a closed folder icon associated with the class 157 (see FIG. 5). When a class 157 is opened, the dynamic class manager 134 will check the class object 200 and retrieve the attribute list 203. The handles stored in the attribute list 203 will be passed to the handle manager 137. The handle manager 137 will return the virtual memory address for each attribute of the class. The dynamic class manager 134 may then use the list of pointers 220 for the international string list 219 to retrieve the character string text 279 for the selected language (in this example it would be the character string "Accessories") for the name for the class. That text information can then be passed through the API 143 so that it may eventually be provided to the retriever 130 for display to a user on the display 116. FIG. 5 shows an example of what a display screen looks like in a preferred embodiment of the invention.

It will be appreciated by those skilled in the art that a pointer could alternatively be used in the field 205 shown in FIG. 7, which could point to a separate international string list object 219 (see FIG. 10). For example, in the preferred embodiment, international string parameters 216 described in connection with FIG. 9A use this type of an approach. In the preferred embodiment described herein and shown in FIG. 7, the pointer 268, maximum size 269 and current size 270 are all stored in the international string name list 205 of the class object 200.

Figure 8A:
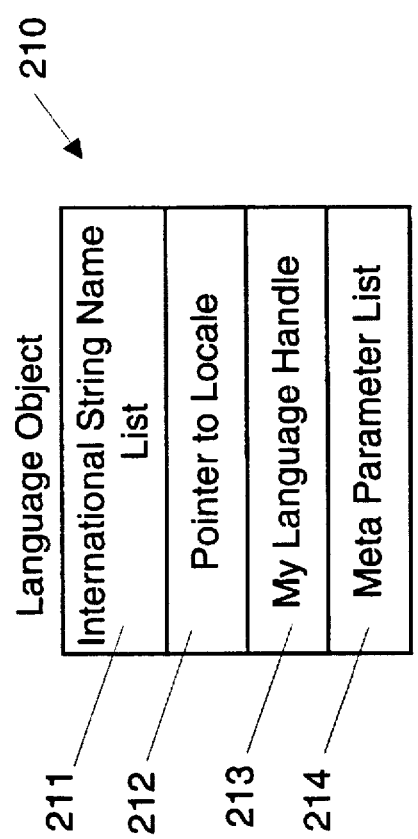
FIG. 8A shows the internal object representation for a language object.
Figure 8B:
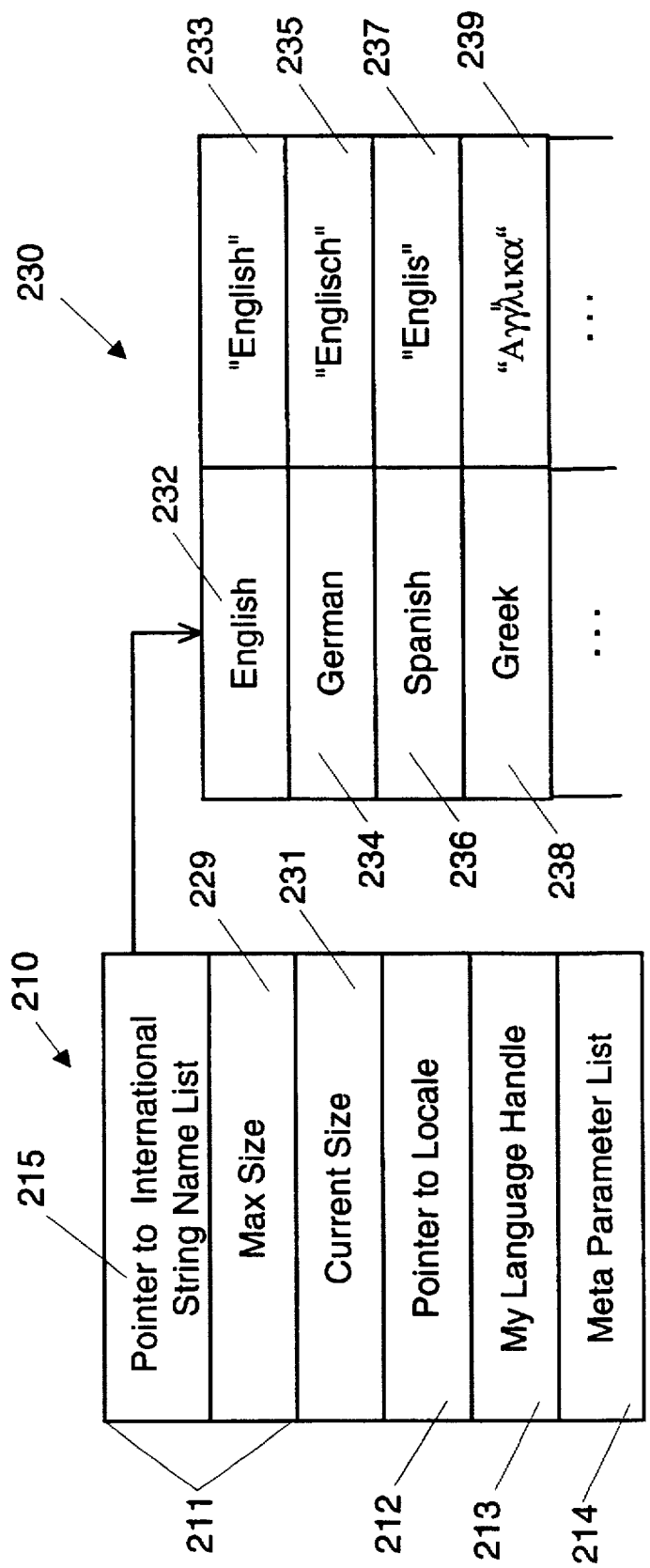
FIG. 8B shows the internal object representation for a language object in more detail.

A preferred implementation of multi-language capability in accordance with the present invention includes a schema object called a language object 210. Examples of language objects 210 are illustrated in FIGS. 8A & 8B. A language object 210 is provided for every language supported in the knowledge base.

A simplified representation of a language object 210 is shown in FIG. 8A. The language object 210 has a field 211 containing an international string name list 211, which will be discussed in more detail below. The language object 210 has a field 213 containing a handle 213 for this object 210, referred to sometimes as a language handle 213. The language object 210 also includes a metaparameter list 214.

A pointer to a character string stored in a locale field 212 is used to indicate where to find files that identify the character set to be used with this language, the sort sequence to be used, the format for representing dates, numeric quantities, currency, etc. The character string associated with the locale field 212 may be a string representing a path to such files Any custom rules applicable to this language are preferably locatable using the locale 212. Further information on the implementation of locale features is contained in Sandra Martin O'Donnell, Programming for the World: A Guide to Internationalization (1994), which is incorporated herein by reference. Routines in the software go to the language object 210 to retrieve the locale 212, and then use the locale 212 to get information on the character set to be used with this language, the sort sequence to be used, the format for representing dates, numeric quantities, currency, etc. Additional information appears in P. J. Plauger, *The Standard C Library* (1992), published by Prentice-Hall, Inc., the entire disclosure of which is incorporated herein by reference.

A more detailed representation of a language object 210 is shown in FIG. 8B. As stated above, the language object 210 has a field 211 containing an international string name list 211. In FIG. 8B, the field 211 is shown in more detail as including a pointer 215 to a local language name list 230. The language object 210

In FIG. 8A, it should be understood that the local language name list 211 actually has three fields (or subfields) 215, 229 and 231 which are shown in FIG. 8B, all of which are embedded in the area 211 shown in FIG. 8A. Thus, the area 211 contains a pointer 215 to a language name list 230 of text string pairs, a field 229 containing information on the maximum size allocated for the language name list 230, and a field 231 which contains information on the current size of the language name list 230.

The language name list 230 is a list of string pairs, where each pair contains a language handle 232 and a character string which is the name of the language for the language object 210, expressed in the language corresponding to the associated language handle 232. In each string pair contained in the language name list 230, the language handle identifies a particular language 232, 234, 236, or 238. The associated character string 233, 235, 237 and 239, respectively, is the text that is to be displayed to a user as the name of that particular language, when the user is viewing information in a selected language corresponding to the language handle.

The language name list may be used when it is desirable to display the name of a language to a user of the system. In a presently preferred embodiment, when a user initially accesses the database, he is presented with a menu and he can select one language from a list of available languages as the language in which he wants to view the retrieved information. A language object 210 would exist for each available language. At this step, the character string corresponding to the native expression of the name of each language in its own language will be retrieved from each language object's language name list 230. Thus, if the languages of English, German and Spanish were available, a user would be presented with the choice to select: "English," "Deutsch," or "Espanol." The character string "English" would be retrieved from field 233 associated with the language object 210 for the English language shown in FIG. 8B. The character string "Deutsch" would be retrieved from a similar character string field associated with the language object for the German language.

In a presently preferred embodiment, a user can dynamically change the language that he is using to view the database information. A pull down menu may be accessed to select any one of the available languages, and the display will be updated so that everything on the display will be changed to the new selected language. When the user is presented with the pull down menu to select one language from the list of available languages as the new language in which he wants to view the retrieved information, the names for the languages are displayed in the currently selected language. For example, if the user was currently viewing the display in the English language, then the language handle for English would be used to select the corresponding character string for each of the available languages. The character string for the English expression of the name of each language will be retrieved from each language object's language name list 230. Thus, if the languages of English, German and Spanish were available, a user would be presented with the choice to select: "English," "German," or "Spanish." The character string "English" would be retrieved from field 233 associated with the language object 210 for the English language shown in FIG. 8B. The character string "German" would be retrieved from a similar character string field associated with the language object for the German language. Conversely, if the user was currently viewing the information in German, then the user would be presented with the character string "Anglais" retrieved from the string 235 associated with the German language handle 234 in the language name list 230 corresponding to the English language object 210. And the character string "Deutsch" would be retrieved from a similar character string field associated with the language object for the German language.

Figure 9A:
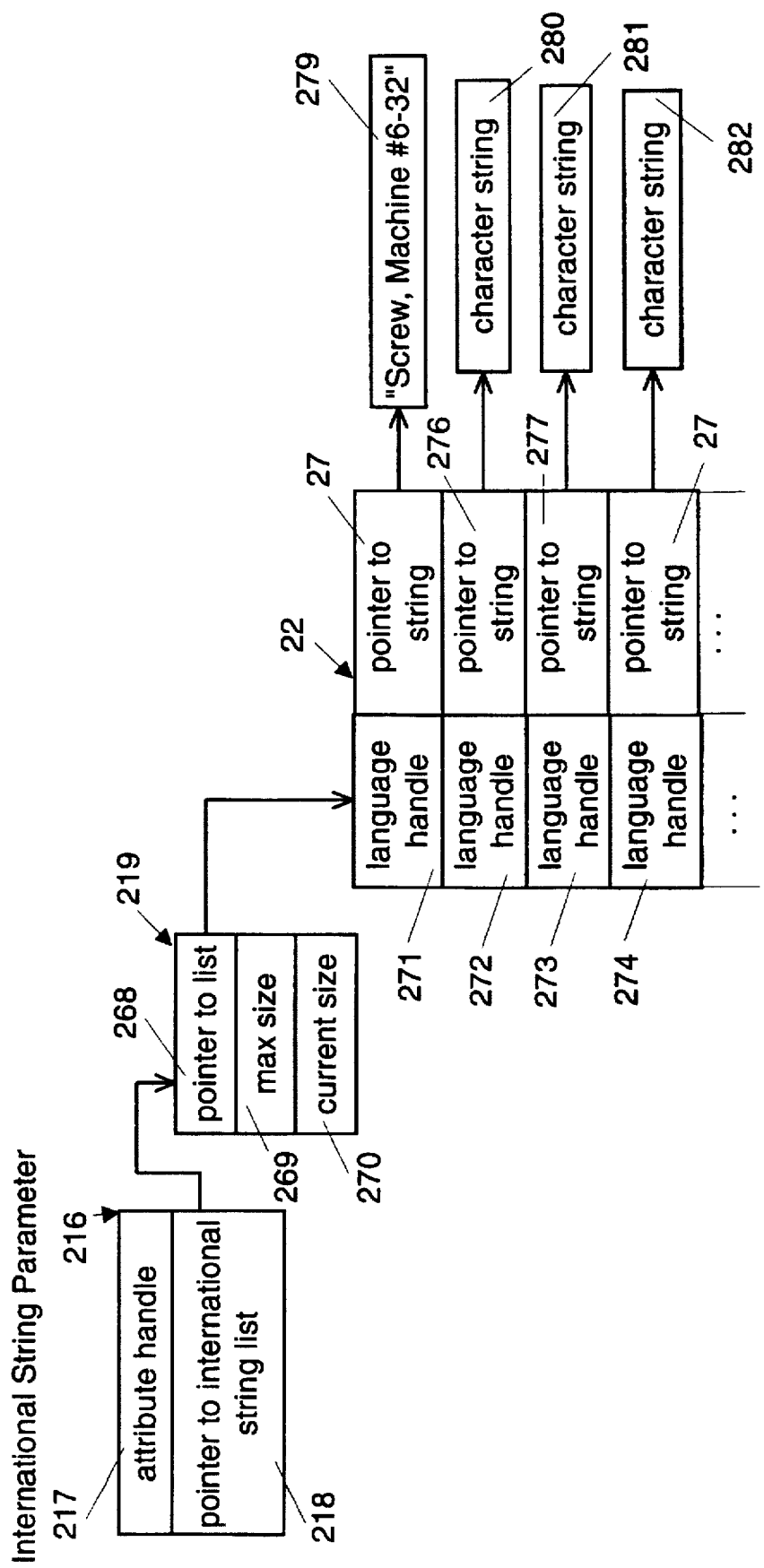
FIG. 9A depicts the data structure for an international string parameter object.
Figure 9B:
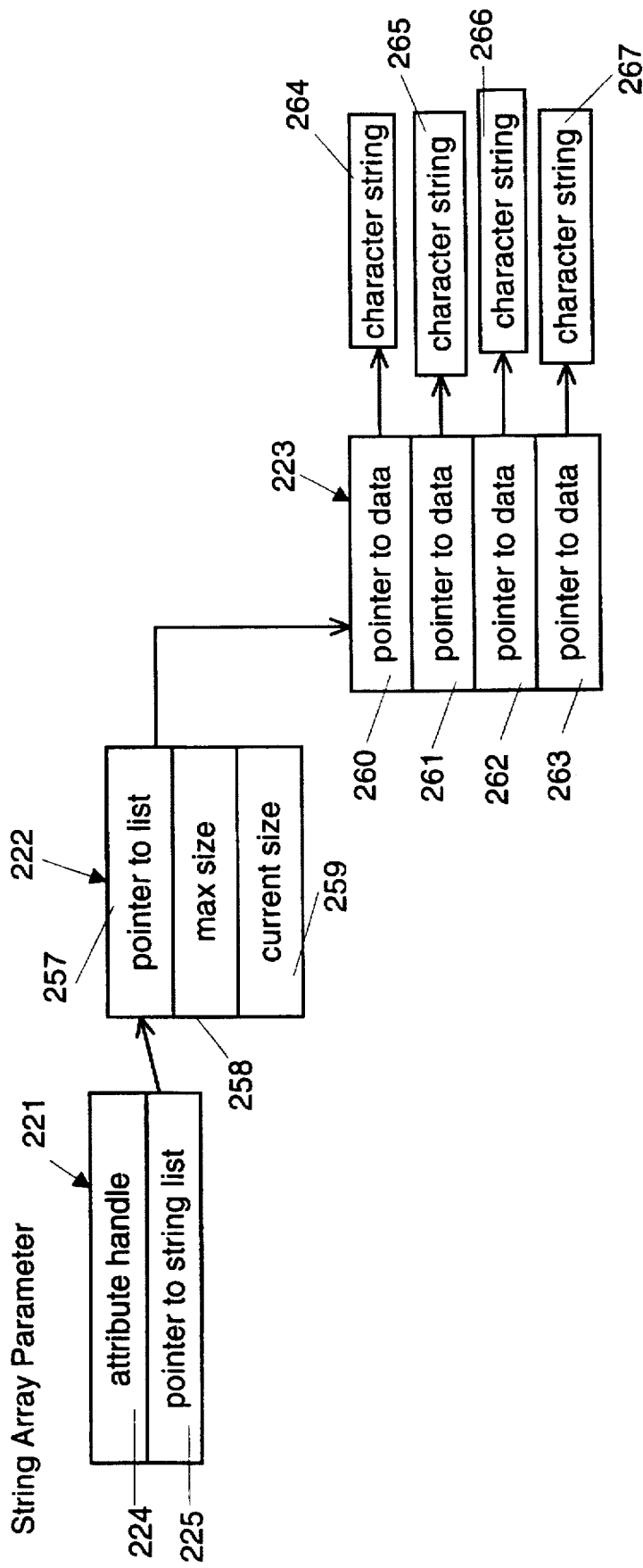
FIG. 9B depicts the data structure for a string array parameter object.
Figure 9C:
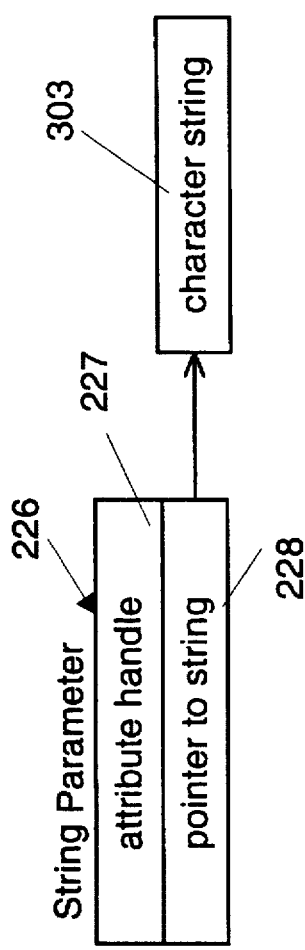
FIG. 9C depicts the data structure for a string parameter object.

Turning now to FIG. 9C, a string parameter 226 contains a field for an attribute handle 227 and a pointer 228 to a character string 303. The attribute handle 227 is used to refer to the correct attribute object for that particular parameter object.

Figure 11:
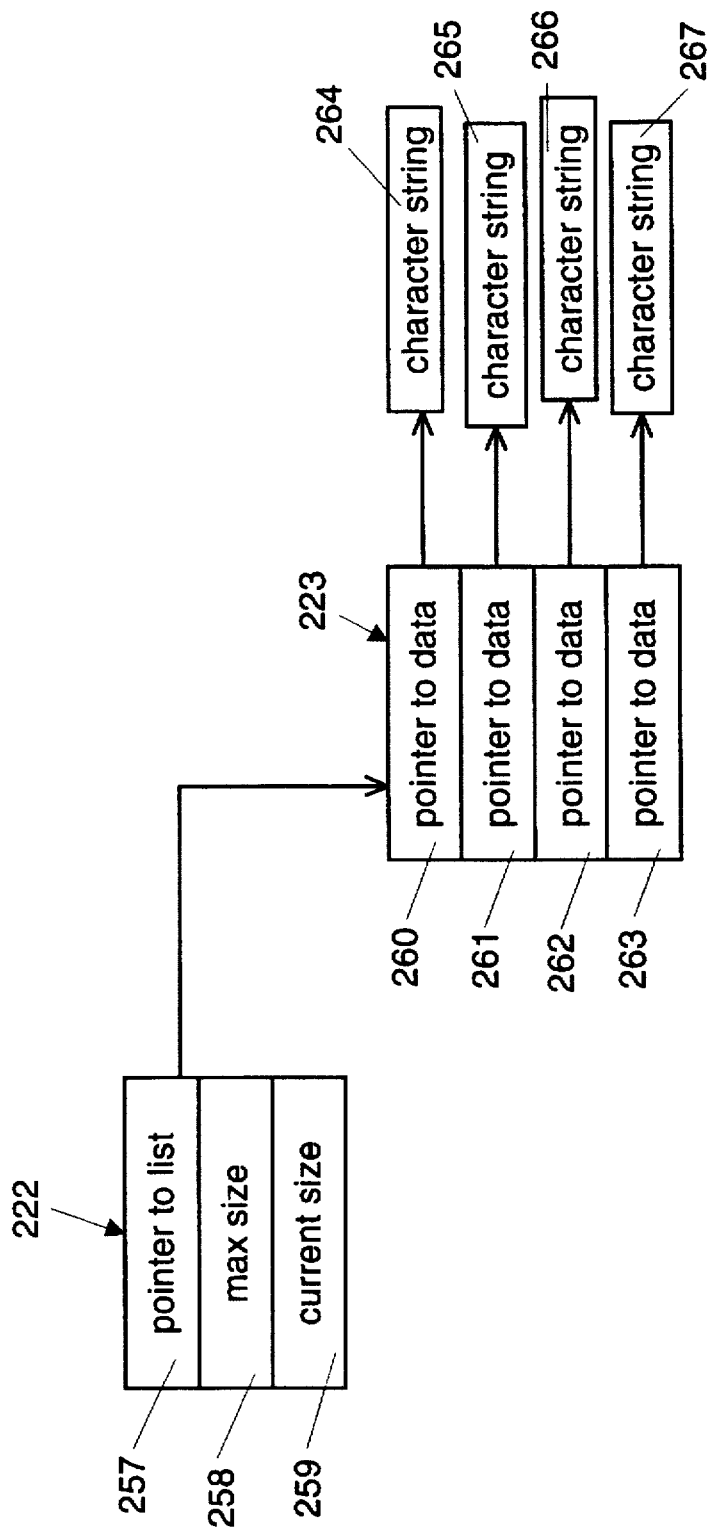
FIG. 11 depicts details of data structures used for string arrays.

In FIG. 9B, a string array parameter 221 contains an attribute handle 224 and a field 225 that points to a list object 222, which contains a pointer 257 to a list of pointers 223 that in turn each point to character strings 264, 265, 266 and 267. The list object 222 and the list of pointers 223 are similar to the correspondingly number elements shown in FIG. 11.

A string array parameter 221 has a list of pointers 223 to character strings. A list object 222 for a string array parameter 221 has a pointer 257 to a list of data pointers 223. The list of data pointers 223 contains a series of pointers 260, 261, 262, and 263 which each point to the location where the associated character string is actually stored. For example, the data pointer 260 contains information indicating (directly or indirectly) where the associated string 264 is actually stored. Similarly, the data pointer 261 contains information indicating (directly or indirectly) where the associated string 265 is stored. The pointer 262 contains information pointing to where the character string 266 is stored. And the pointer 263 similarly points to the character string 267. This indirection method used for string arrays 221 where the list data 223 is actually a series of pointers 260, 261, 262, and 263, is useful to provide flexibility in allocating storage space for the character strings 264, 265, 266 and 267. In this architecture, the character strings 264, 265, 266 and 267 can be of variable lengths, and can be changed and edited, without causing difficulties in the allocation and management of storage space. The character strings 264, 265, 266 and 267 can be stored anywhere in memory, such as on a disk 103 or in random access memory 127; they do not need to be stored together or in contiguous locations.

In a presently preferred embodiment, a user can select the language that the client application will use to display information. A default language may also be used to display information where a text string in the user selected client language is not available. However, the user can preferably disable the use of a default language. In that case, when the default language is disabled and no string exists in the user selected language, no text will be displayed in that instance.

The present invention has a preferred method for selecting the string 279, 280, 281 or 282 that will be displayed. A preferred "fallback method" is used to select the appropriate string 279, 280, 281 or 282. The "fallback method" is shown schematically in the flow chart of FIG. 17. In the preferred method for selecting a text string to be displayed, a return value is first set to a null value in step 400. The next step 401 is finding a corresponding string in the client language, if any. The step 402 of finding a corresponding string in the default language, if any, is preferably performed. In step 403, if a string is found that is in the currently selected client language, the system then returns the client language string in step 404. If a string in the client language is not found in step 403, step 405 is then performed. If no string was found for the default language associated with this knowledge base, then the null value is returned in step 408. If a string is found for the default language, then the system checks in step 406 to determine whether the user has enabled the fallback mode of operation. If the user has enabled (or alternatively, has not disabled) the fallback mode, then the system will return a string in the default language in step 407. If the user has not selected (or disabled) the fallback mode, then a null value is returned in step 408.

A data base administrator is not required to use international string parameter objects 216 to specify parameters in multiple languages. International string parameter objects 216 (shown in FIG. 9A) may use more storage space than comparable string parameter objects 226 (shown in FIG. 9C), and may require more steps in the processing of such information. Where multiple language capability is not desired, string objects 226 may be used to store parameter information that the database administrator intends to always display in a single language. This may be desirable in some cases in order to save space. In practice, the amount of storage space required for the storage of parameter information is typically much greater than the amount of storage space required for the storage of the remaining information contained in the knowledge base 123 (i.e., the schema objects). Thus, the present architecture provides the power and advantages of multiple language capability, while maintaining the flexibility of not using that capability in order to save space and optimize performance where such capability is not needed or desired.

FIG. 13A illustrates a simplified representation of the data structure for an international string attribute object 290. In accordance with the present invention, the international string attribute object 290 has an international string list 284. The international string attribute object 290 also contains a field 285 containing the handle for this attribute object. The international string attribute object 290 also contains a field 286 which contains the handle of the class that defines this attribute. The fourth field 287 is a Boolean indication of whether this attribute is a required attribute for the defining class. A fifth field 288 contains a Boolean field indicating whether this attribute is protected. For example, in FIG. 5 the "part number" attribute 158 is protected. This is indicated by the protected icon 159. In the data structure of the attribute object shown in FIG. 13A, this information is stored in field 288. The international string attribute object 290 also contains a field 289 which is a metaparameter list.

Figure 13B:
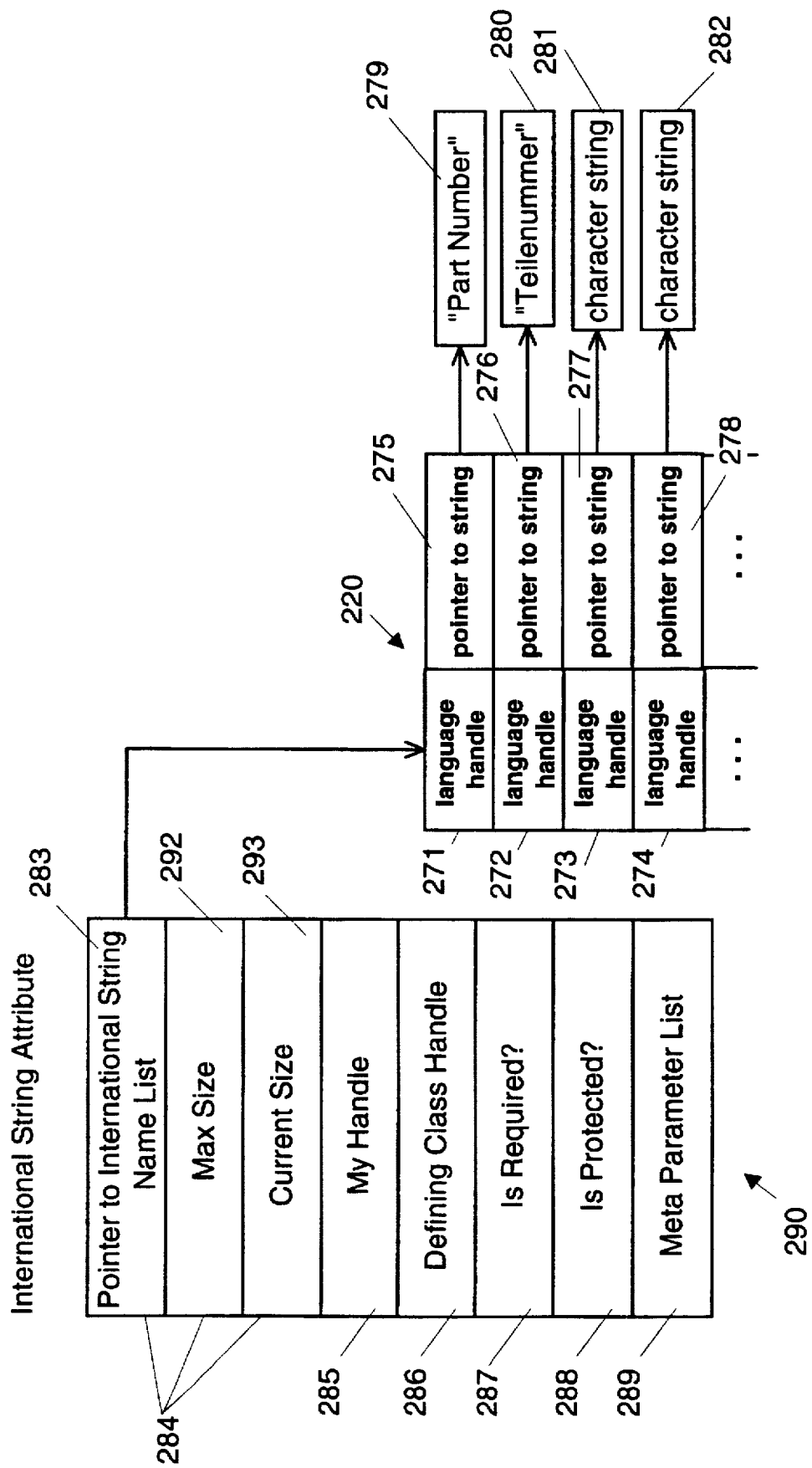
FIG. 13B illustrates the data structure for an international string attribute in more detail.

FIG. 13B shows a more detailed representation of the international string attribute object 290. The international string list 284 comprises a pointer 283 to a list of text string pairs 220. The international string list 284 also contains information on the maximum size of the list 220, and the current size of the list 220, which is the same as the international string list object 219 described in connection with FIG. 10.

As described in connection with FIG. 10, the list of text string pairs 220 shown in FIG. 13B contains a pair of fields for each language that is supported. For example, the first pair comprises a first language handle 271 and a first pointer 275 to a string 279. The string 279 is expressed in a first language (in this example the first language is English) which corresponds to the first language handle 271. If the corresponding object is the attribute 158 shown in FIG. 5, the first pointer 275 then points (directly or indirectly) to the character string 279, which contains the English language string "Part Number" that is the attribute 158 that is to be displayed to the user. The second language handle 272 in this example corresponds to the German language. A second pointer 276 points to the character string 280, which contains the German language string "Teilenummer" that is the attribute 158 that is to be displayed to a user who speaks German.

Similarly, a third pair comprises a third language handle 273 and a third pointer 277 to a string 281 associated with a third language. A fourth pair includes a fourth language handle 274 and a fourth pointer 278 which points to a string 282 that is in a fourth language corresponding to the fourth language handle 274. Additional pairs may be included, only four being shown here for simplicity.

In FIG. 13A, it should be understood that the area 284 is the international string list and actually has three fields (or subfields) contained in the area 284, as shown in FIG. 13B. Thus, the area 284 contains a pointer 283 to the list of text string pairs 220, a field 292 containing information on the maximum size allocated for the list 220, and a field 293 which contains information on the current size of the list 220.

Figure 14:
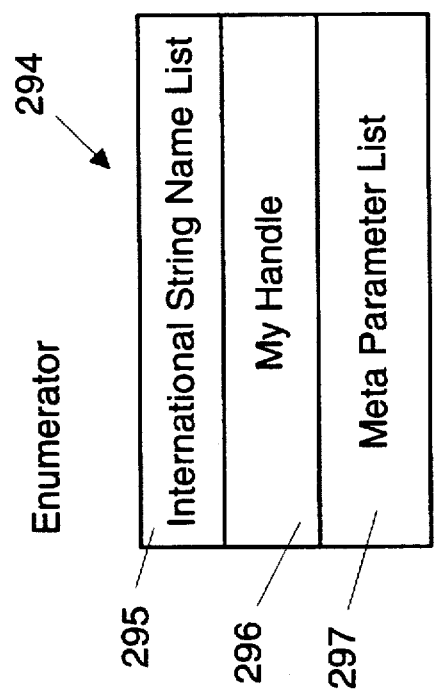
FIG. 14 illustrates the data structure for an enumerator object.

FIG. 14 illustrates the data structure for an enumerator object 294. An enumerator object 294 may comprise an international string list 295. In this case, the international string list 295 provides for the retrieval of a character string representing the enumerator name that is in the selected language for this user. A second field 296 contains the handle for the enumerator object 294. A third field 297 may contain a metaparameter list. The international string list 295 has the same detailed structure as the international string list described in connection with FIG. 10. The international string list 295 shown in FIG. 14 corresponds to the international string list object 219 shown in FIG. 10, and has an associated list that corresponds to the list 220, which is similarly linked to character strings like strings 279, 280, 281 and 282 shown in FIG. 10.

Handles are used to link from other objects to the enumerator object 294. An advantage of this structure is the ability to easily modify a knowledge base if it becomes desirable to change the name of an object, or to add additional languages that are supported for this knowledge base. Adding additional languages can be accomplished by adding another language handle 274 and associated pointer 278 to the text string 282 for that additional language. The enumerator object 294 merely contains a handle 295 which can be used by the handle manager 137 to provide the dynamic class manager 134 with the actual name for the selected language. No changes to the enumerator object 294 itself are required.

Figure 15:
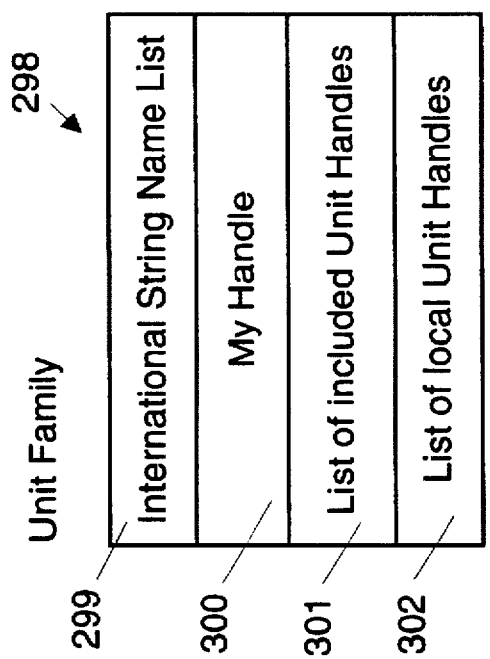
FIG. 15 illustrates the data structure for a unit family.

FIG. 15 depicts the data structure for a unit family object 298. In the example illustrated in FIG. 15, the unit family object 298 has four fields. The first field 299 is an international string list 299 which provides for the retrieval of the character string for the name in the selected language for the unit family object 298. The international string list 299 has the same detailed structure as the international string list described in connection with FIG. 10. The international string list 299 shown in FIG. 15 corresponds to the international string list object 219 shown in FIG. 10, and has an associated list that corresponds to the list 220, which is similarly linked to character strings like the strings 279, 280, 281 and 282 shown in FIG. 10.

The remaining fields are described in application Ser. No. 08/339,481, entitled OBJECT ORIENTED DATABASE MANAGEMENT SYSTEM, now pending. The second field 300 contains the handle for this unit family object 298. The third field 301 is a list of unit family handles of unit families which are included in the unit family 298. The last field 302 contains a list of handles for local units.

A unit is a system of measurement for a numeric parameter. A unit family is a collection of units that may be used for a numeric attribute. A unit family handle is a reference to a unit family. A unit family name is the international character string list that identifies a unit family. A unit handle is a reference to a unit. A unit name is the international character string list that identifies a unit. Local units are units that are defined in this unit family 298.

Figure 16:
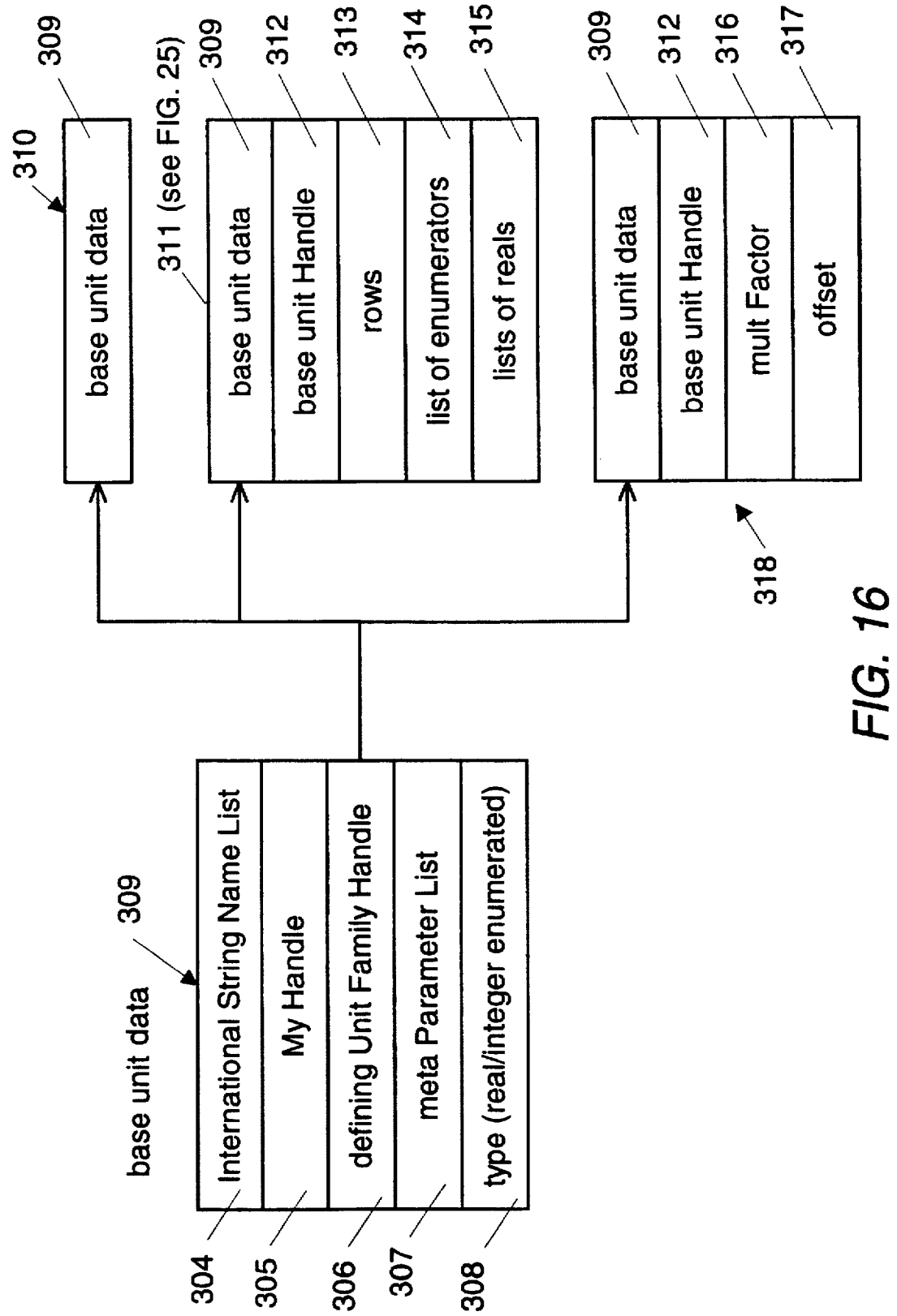
FIG. 16 depicts data structures for units.

FIG. 16 depicts the data structure for units. All types of unit objects may comprise five data fields 304-308, which are collectively referred to as "base unit data" 309. The first field 304 is an international string list 304, which is used as described above to retrieve the name for the unit in the selected language. The international string list 304 has the same detailed structure as the international string list described in connection with FIG. 10. The international string list 304 shown in FIG. 14 corresponds to the international string list object 219 shown in FIG. 10, and has an associated list that corresponds to the list 220, which is similarly linked to character strings like strings 279, 280, 281 and 282 shown in FIG. 10.

The base unit data 309 includes a handle 305 for the unit object which is stored in the second field 305. The third field 306 contains a handle 306 for the defining unit family. The fourth field 307 is a metaparameter list 307. The last field 308 contains an indication of the type of unit (e.g., real, integer or enumerated table). This data in areas 304-308 comprise the "base unit data" 309 shown in FIG. 16 to simplify the description of the various unit object types.

If the unit object is a base unit 310, then no additional data is required. Thus, item 310 shown in FIG. 16 is the same as the base unit data 309 that is shown in detail. If the unit object is an enumerated derived unit 311, it will contain the base unit data 309, which includes fields 304-308. An enumerated derived unit 311 will also include an additional field 312 which provides the handle for the base unit. Another field 313 provides information on how many rows are present in the enumerated list. The field 314 provides the list of enumerators which typically comprises text character strings. The field 314 preferrably points (directly or indirectly) to a list of international string names. Each item on the list of enumerators can be expressed in the selected language, so that each item on the list of enumerators is itself an international string name list. This is shown in more detail in FIG. 25. The field 315 provides a list of corresponding values for the list of enumerators in field 314.

Figure 25:
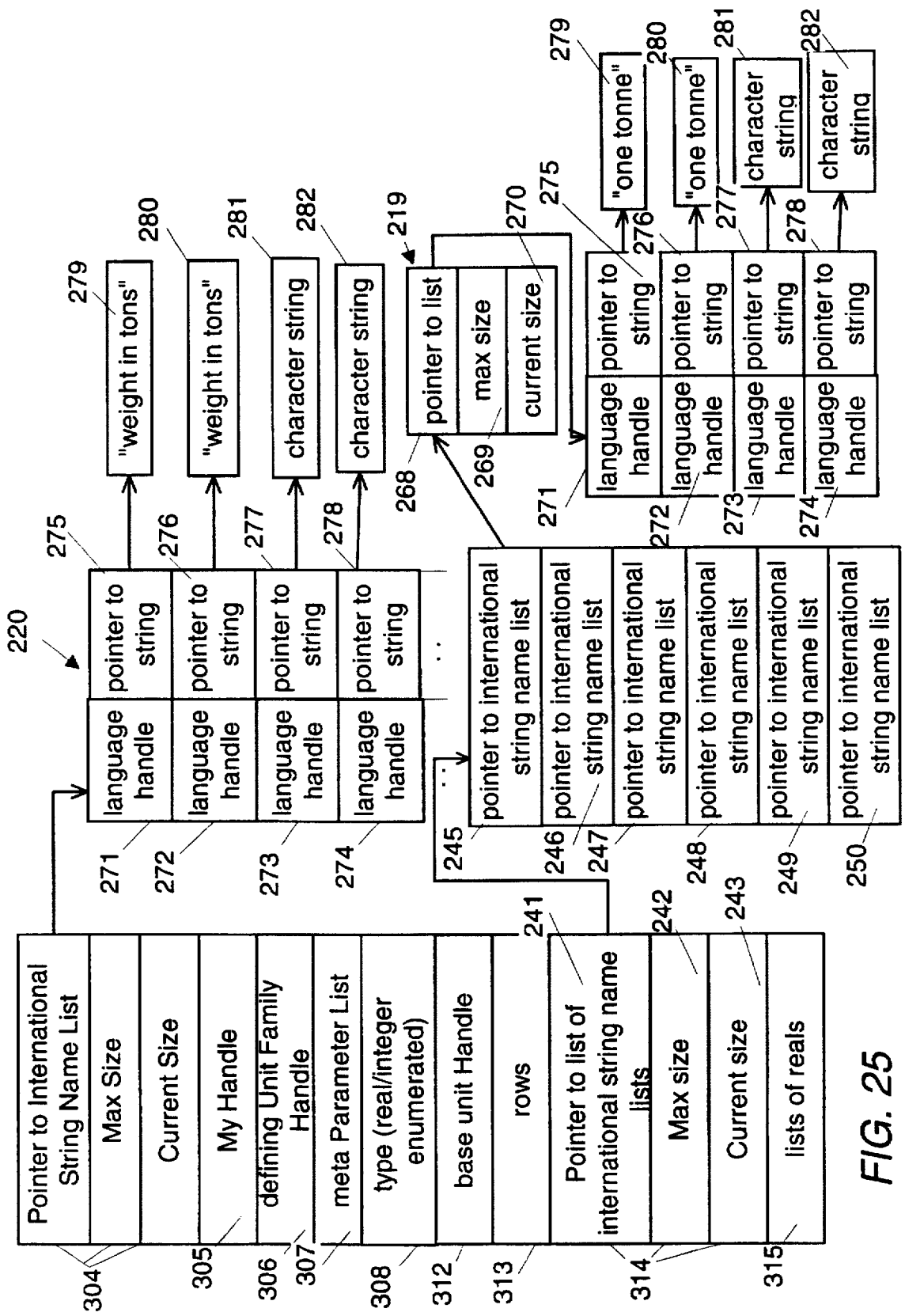
FIG. 25 shows a more detailed view of a preferred data structure for the enumerated derived unit shown in FIG. 16.

FIG. 25 shows a detailed representation of an enumerated derived unit 311. The list of enumerators 314 is a list of pointers to international string name lists. List 314 comprises a pointer to the list 241, a maximum size for the list 242, and the current size of the list 243. Each element in list 241 is a pointer to an international string list. For example, pointer 245 refers to an international string name list 219. The international string list 219 has the same detailed structure as the international string list described in connection with FIG. 10.

If the unit object is a real derived unit 318, it will include the base unit data 309 which comprises fields 304-308 shown in FIG. 16. In addition, a real derived unit object 318 will include a field 312 in which is stored the handle for the base unit. A second additional field 316 will contain a multiplication factor used to derive the real derived unit 318. A third additional field 317 will provide an offset, if any, which must be added or subtracted to the base unit in order to derive the real derived unit 318. In instances where different units are used in connection with the display of information in different languages, as indicated by the locale information pointed to by the locale pointer 212 in the associated language object 210, real derived unit objects 303 provide for the correct expression of such information. For example, if the base unit 303 is degrees Centigrade, and a user is viewing data using the American English language selection, a real derived unit 318 for degrees Fahrenheit may be used by a graphical user interface to allow the user who selects American English as the viewing language to see the same data in degrees Fahrenheit, while a European viewer who has selected the German language may see the same data expressed in degrees Centigrade. In this example, for the real derived unit 318 for degrees Fahrenheit, the multiplication factor 316 would be 9/5 and the offset 317 would be 32 degrees. Real derived units may similarly be used to display the same data in different formats according to the locale rules for the selected viewing language, such as dates according to different calendar systems, different currencies, metric units verses English units, or time (24 hour expression verses 12 hour expression).

For purposes of simplification, illustrations of relationships between certain objects may show an arrow drawn directly from a handle to an associated list or family of objects. In actual practice, the handle from the list is provided to the handle manager 137, and the handle manager 137 provides the address in virtual memory for the schema object. It should be understood therefore that the handle manager 137 is involved in linking handles to the objects associated with the handles. With the understanding that such linkage to the handle manager 137 occurs in every instance where a handle is used to refer to an object, reference to the handle manager 137 in this description is sometimes omitted for purposes of simplification.

Aspects of the above described data structures, as well as additional data structures which may also be used in conjunction with the present invention are described in more detail in application Ser. No. 08/339,481, entitled OBJECT ORIENTED DATABASE MANAGEMENT SYSTEM, now pending.

Figure 17:
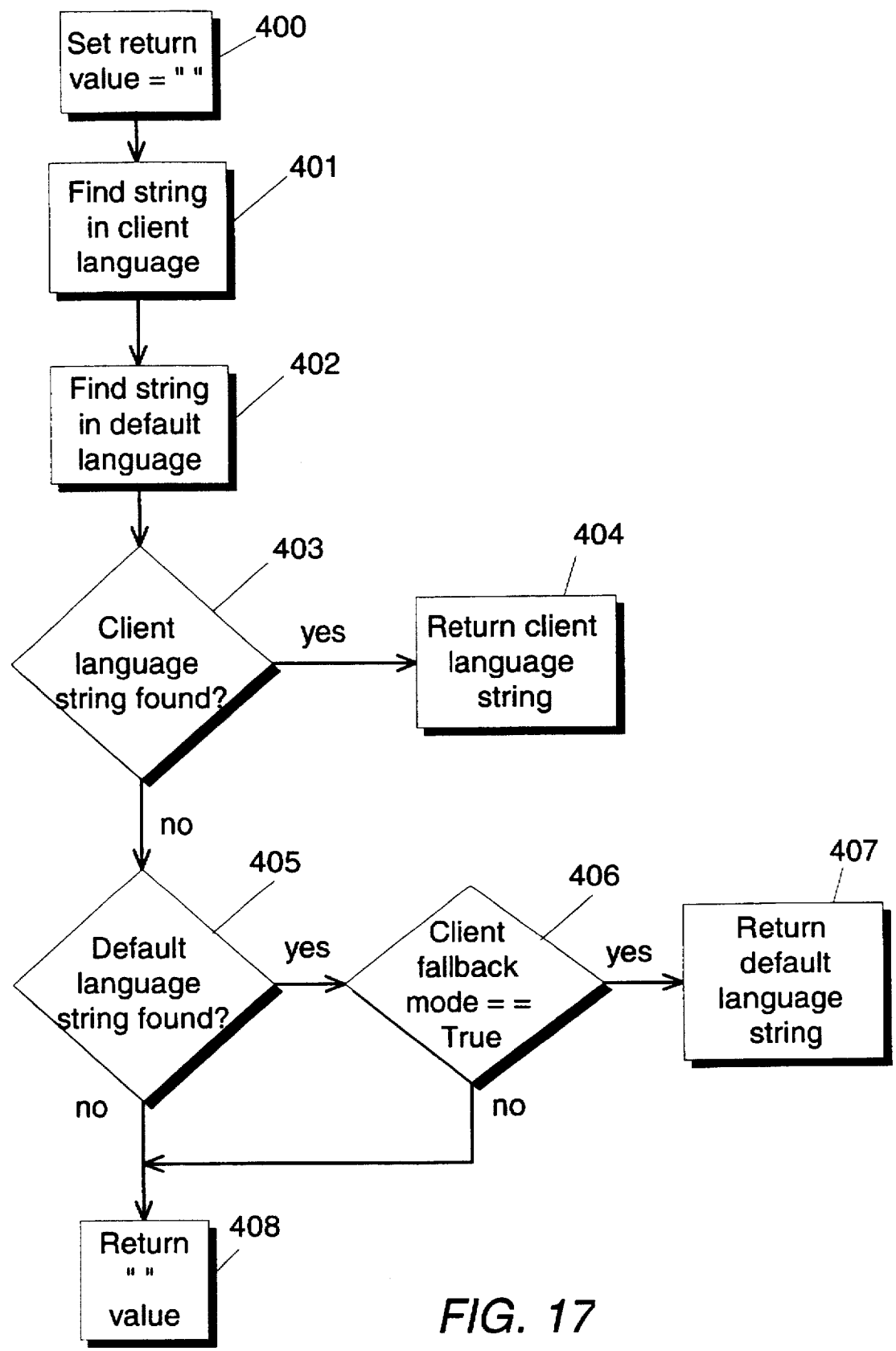
FIG. 17 is a flow chart showing a preferred method for retrieving a character string from an international string object and returning the character string that corresponds to the selected language.

The method shown in FIG. 17 is called at a number of locations in the operation of the system. For example, it is invoked when the retriever 130 is being used to navigate the tree structure of the schema.

Figure 18:
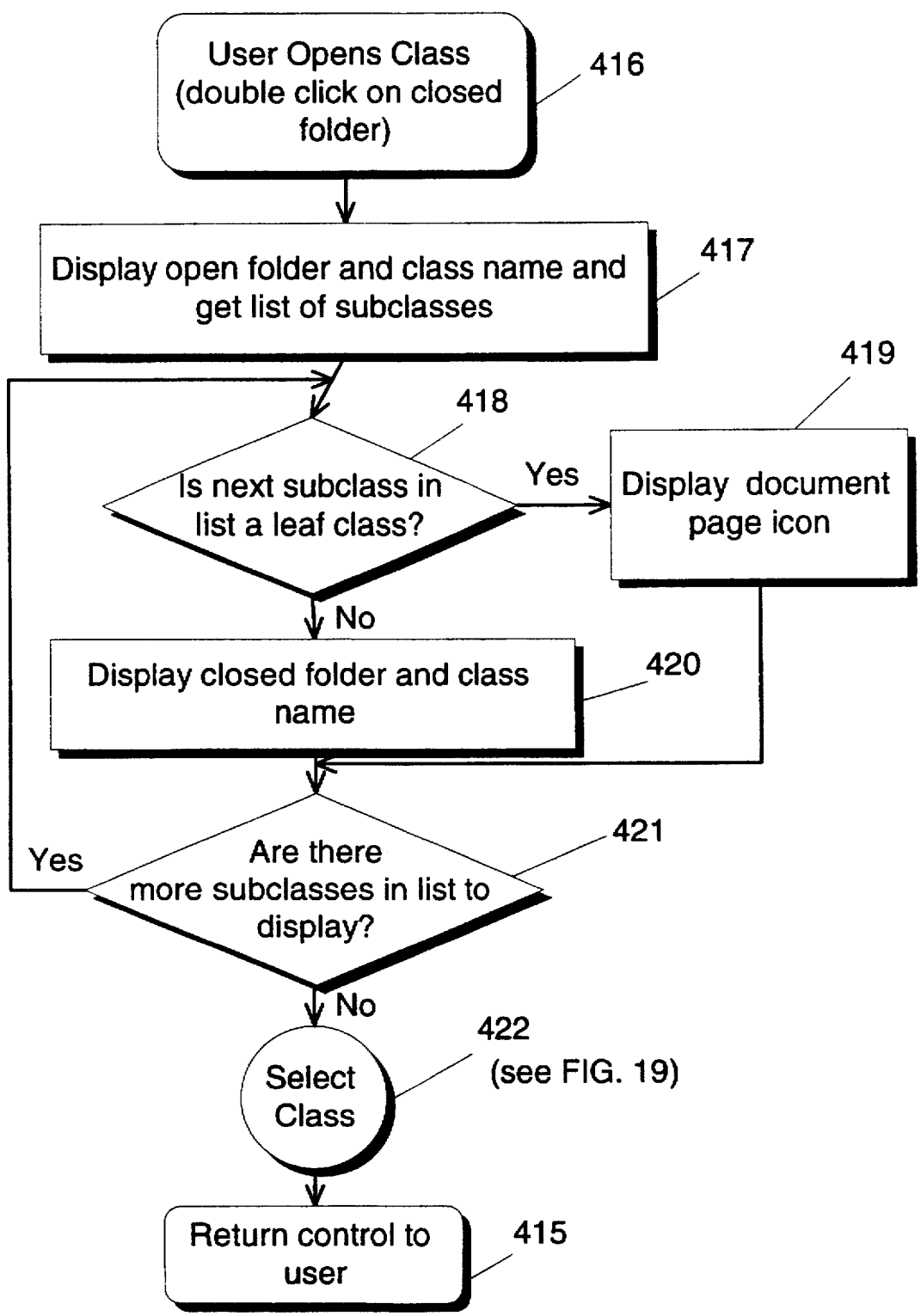
FIG. 18 is a flow chart depicting a preferred procedure for opening a class.

FIG. 18 depicts steps performed by the retriever 130 to open a class 157, (which may be displayed in multiple languages). In order to open a class such as the "Accessories" class 157 shown in FIG. 5, the user would position the cursor (using a mouse 114) to point to the closed folder icon that would be immediately next to the class and double click, which is shown as step 416 in FIG. 18. In FIG. 5, the "Accessories" class 157 is shown as already open in the illustration, and an opened folder icon 321 appears next to it. Prior to opening the class, it would have a closed folder icon 320 such as is illustrated next to the "Raw Materials" class 160.

As shown in FIG. 18, in step 417 the retriever 130 changes the display of a closed folder icon 320 and replaces it with an open folder icon 321. The retriever 130 gets a list of the subclasses for the opened class 157. The class name 157 is displayed in the language selected by the user. In performing the step of displaying the class name 157 in the selected language, the method described in FIG. 17 is performed.

In step 418, the retriever 130 proceeds through the list of subclasses and determines whether the next subclass in the list is a leaf class. If it is, flow proceeds to step 419 in FIG. 18 and a page icon is displayed for that subclass. Control will then proceed to step 421.

In step 418, if the next subclass in the list is not a leaf class, the method proceeds to step 420 where the retriever 130 displays a closed folder icon and the class name for the subclass. The method then proceeds to step 421.

Figure 19:
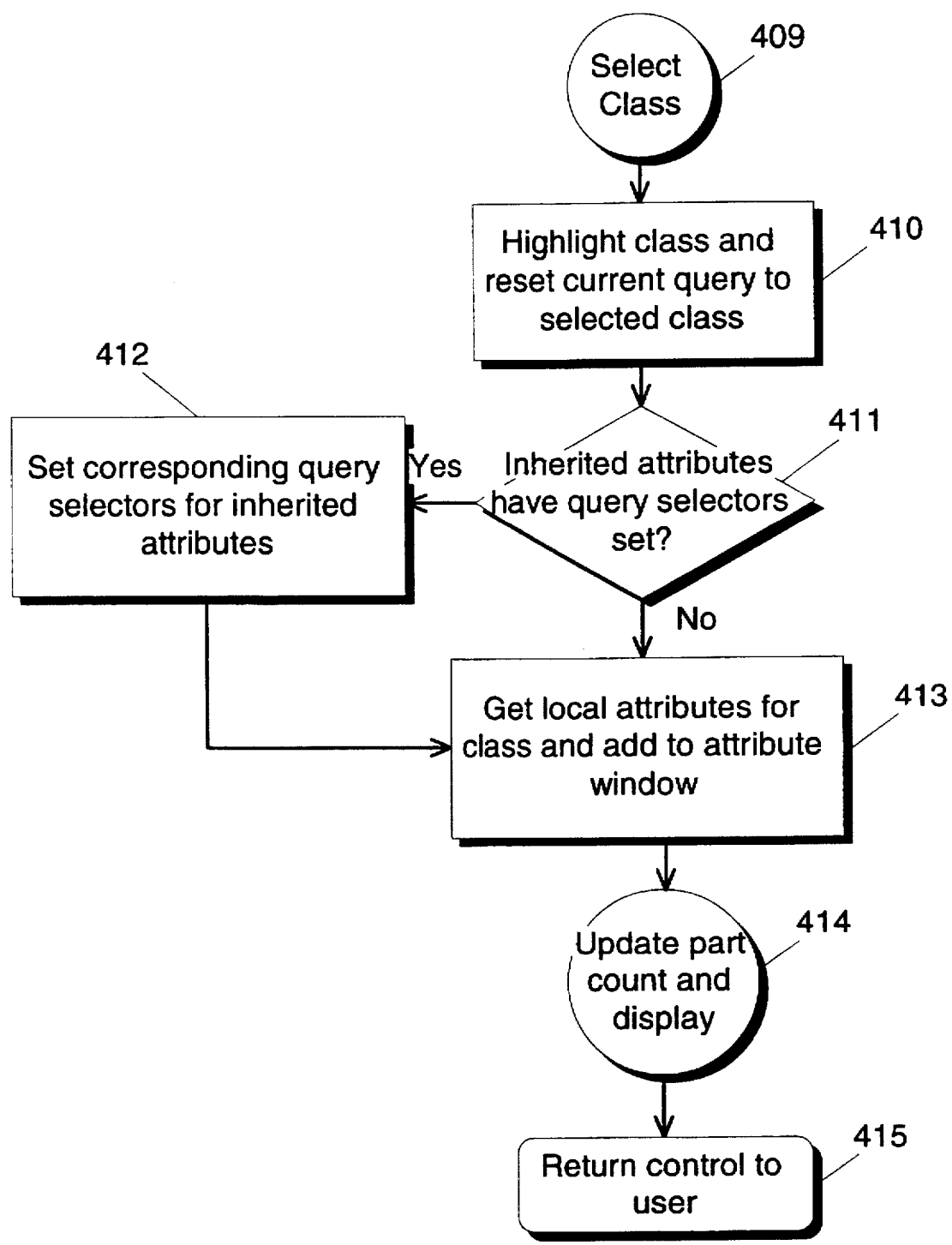
FIG. 19 is a flow chart depicting a preferred procedure for selecting a class.

In step 421, the retriever 130 checks to determine whether there are any more subclasses in the list to display. If there are, flow proceeds back to step 418. If there are not, flow proceeds to step 422. The steps performed when a class is selected are shown in FIG. 19. After the select class process is performed, the step 415 of returning control to the user is performed.

The process of selecting a class in step 422 (which may be displayed in multiple languages) may be broken down into several steps. The steps followed by the retriever 130 in this example are depicted in FIG. 19. Assume that a class 157 has been selected in step 409. In step 410, the selected class is displayed in a highlighted representation 157 (see FIG. 5). The retriever 130 resets the current query to the selected class 157 in step 410.

Referring to FIG. 19, in step 411 the retriever 130 determines whether inherited attributes have query selectors set. If query selectors are set, then in step 412 the retriever 130 sets corresponding query selectors for inherited attributes. The method would then proceed with step 413. In step 411, if inherited attributes do not have any query selectors set, the method proceeds directly to step 413.

In step 413, the retriever 130 gets local attributes for the class 157 and adds them to the display in the right hand portion 319 of the part specification window 155, which may be referred to as the attribute window 319. In getting the local attributes, the retriever 130 must retrieve the character strings to display which are in the language that has been selected by the user. For example, the attribute 322 entitled "Year-to-Date Failures" is a local attribute that must be displayed. If the selected language is English, the retriever 130 retrieves the character string "Year-to-Date Failures" 322 to be displayed in the attribute window 319, as shown in FIG. 5. If the selected language is German, the retriever 130 retrieves the character string "Jährliche Ausfälle" 322 to be displayed in the attribute window 319, as shown in FIG. 6. In order to do so, the step 413 of getting the local attributes for the class 157 includes the method described in FIG. 17.

The retriever 130 would take advantage of international string attribute data structures 290 such as is illustrated in FIG. 13B. If the selected language is English, for example, an international string attribute 290 would be used to retrieve the character string 279 shown in FIG. 13B as "Part Number." This would be displayed in FIG. 5 as the first attribute 158. If the selected language is German, the international string attribute 290 would be used to retrieve the character string 280 shown in FIG. 13B as "Teilenummer." This would be displayed in FIG. 6 as the first attribute 158 in the attribute window 319.

In FIG. 19, the method then proceeds to step 414 where the retriever 130 updates the part count and displays that information as parts found 154. In step 415, control is returned to the user and the system waits for another command.

Figure 20:
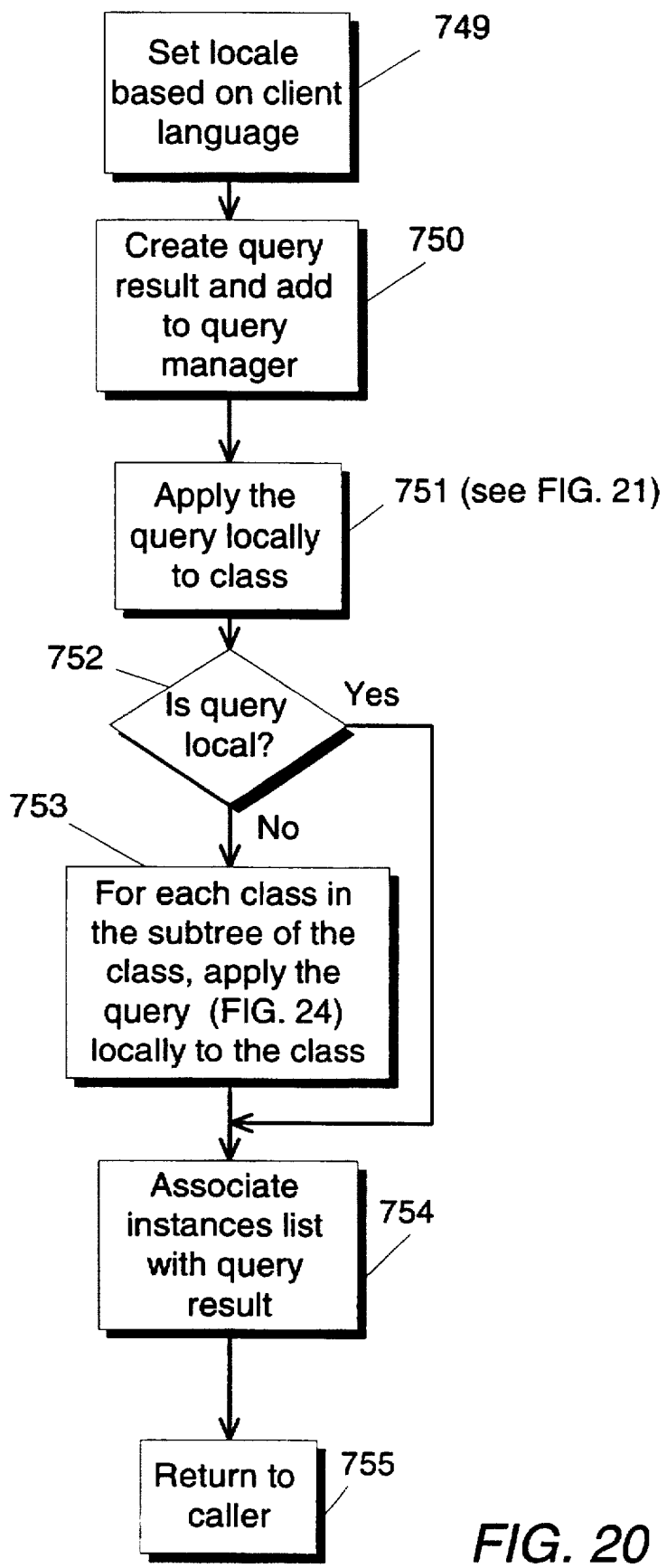
FIG. 20 is a flow chart describing a method of applying a query.

International string parameter objects 216 are used in performing queries. A process for performing a query is shown schematically in FIG. 20. The procedure is initiated in step 749. The system checks the locale 212 for the selected client language to obtain the string comparison information appropriate for the selected language. Additional information on how to check the locale for a selected language is described in P. J. Plauger, *The Standard C Library* (1992).

A query result object that is the result of applying the query is created in step 750. The query result is assigned a query result handle that is different from all other query result handles. The query result and query result handle are given to the query manager for it to add to its table of query results and query result handles.

Continuing with step 751, the query is applied to all the instances that are owned by the class at which the query is applied. The class at which the query has been initiated is properly called the query class. Step 751 is explained in more detail in FIG. 21. After the query is applied to the query class, the system determines if the query was to be applied locally or globally at step 752. Local queries are applied only to the instances that are owned by the query class. Global queries are applied to the instances that are owned by the query class and to all the instances that are owned by descendant classes of the query class. If the query is local in step 752, control continues at step 754.

If the query is not local (in other words, it is global), then at step 753 the query is applied to the instances owned by each class in the subtree of the query class. A practitioner skilled in the art will know how to find all the descendants of a class in the tree, perferably either by using recursive calls to a subroutine for each subclass, or by using interation and a stack of subclasses. The query is applied to each subclass in the same manner as in step 751.

At step 754, the query, either local or global, has been applied to all the required instances. The list of instance handles that have matched the selectors in the query become the instances that are the query result. The query result is returned to the caller in step 755.

Figure 30:
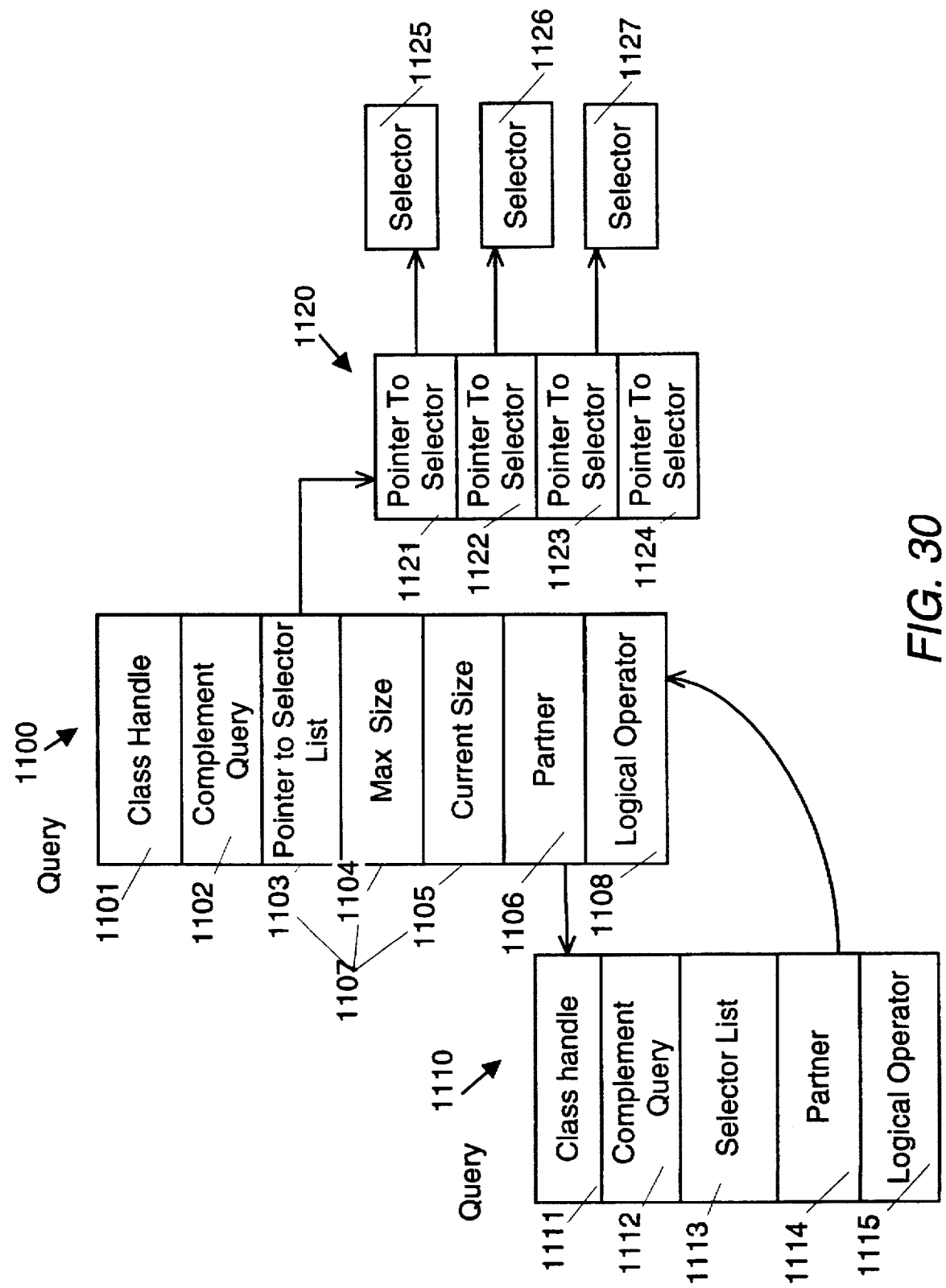
FIG. 30 is a schematic diagram of a query object.

Details of how a query are performed by a knowledge base server 132 may be best understood by first referring to FIG. 30. FIG. 30 is a schematic diagram of a data structure 1000, referred to as a query object 1000, that is used to store a query. A query object 1000 is composed of a class handle 1101, a complement query flag 1102, a selector list 1107, query partner pointer 1106, and a partner logical operator 1108. The query is applied to find a subset of instances in a knowledge base 123 that match the criteria specified by the fields in the query.

The class handle 1101 is called the "query class." The query class binds the query to the instances in the subtree rooted by the class, thus defining the search domain for the query. The query can applied either globally or locally. A global query is applied to all the instances in the subtree. A local query is applied only to the instances that are owned by the query class. The other fields in the query are used to test against the parameter values in the instances.

The parameters for which values are to be tested are specified with the list of selectors, item 1107. The list of selectors is a generic list object 240 comprising the maximum allocated size of the list 1104 and the current size of the list in use 1105. In the example these values are four and three, respectively. The selector list also comprises a pointer to a list of pointers to selectors 1103 which points to the data, item 1120. In this example, three of the pointers are in use, pointer 1121 refers to selector 1125, pointer 1122 refers to selector 1126, and pointer 1123 refers to selector 1127. Pointer 1124 is "Null" because the data is not in use. Selectors are described in more detail with regard to FIG. 31.

A query is applied by comparing each instance in the domain defined by the query class 1101 with each of the selectors in the query. If all the selectors match, then the instance is said to match the query. This means that the conjunction (or 'AND') of the selectors is used. The algorithm for applying a query is described in more detail in FIGS. 20, 21, 22, 23A, 23B, and 37.

The query complement flag 1102 indicates that the query should be complemented. After the selectors have been compared to an instance, if the complement flag 1102 is FALSE, the instance is considered to match if the values in the selectors matched the parameter values in the instance. If the selectors did not match the parameters, then the instance does not match. However, if the complement flag 1102 is TRUE, then the instance is considered to match if the values in the selectors do not the parameter values in the instance. And, if the selectors did not match the parameters, then the instance matches.

The query partner 1106 is a pointer to a second query 1110 that can be associated with the first query 1100. The query partner 1110, has fields identical to the query 1100, being a query class handle 1111, a complement flag 1112, a selector list 1113, a partner 1114, and a logical operator 1115. If the query 1100 has a query partner pointer 1106, then the class handles 1101 and 1111 must be identical, the logical operators 1108 and 1115 must be identical, and the query partner pointer 1106 refers to the second query 1110 and the query partner pointer 1114 refers to the first query 1100. A query 1100 need not have a partner 1110, in which case the query partner pointer 1106 is "Null," and the logical operator 1108 is meaningless.

If a query 1100 has a partner 1110, then an instance matches the query 1100 depending on the logical operator 1108. The logical operator 1108 can be either 'AND' or 'OR'. If the logical operator 1108 is 'AND', then an instance matches the query 1100 only if the instance matches both the first query 1100 and the second query 1110. If the logical operator 1108 is 'OR', then an instance matches the query if it matches either the first query 1100 or the second query 1110 or both queries 1100 and 1110. Thus, the query partner 1106 and logical operator 1108 are used to create queries with more complexity than can be created with only a single query 1100. This partnered query 1106 can be used to perform a conjunction or disjunction of two queries 1100 and 1110.

A practitioner skilled in the art, after having the benefit of this disclosure, will be able to see how to extend this concept of the partner query 1106 in several ways. First, the query 1100 and partner query 1110 form a linked list of just two objects. The query partner pointer 1106 could be modified to become an arbitrary linked list of queries with arbitrary logical operators. The queries could be applied in sequence to determine if an instance matches the query. Or, the partner query pointer 1106 could be modified into a left-child/right-child duple and, along with the logical operator 1108, represent an arbitrary logical query expression with a query tree.

Another extension is to allow the class handles 1101 and 1111 to differ. Recall that the class handle 1101 defines a domain of instances for the query 1100. If the logical operator 1108 between two partnered queries 1100 and 1110 is 'OR', then the domain for the query is the union of the instances in query 1100 and query 1110. If the logical operator 1108 between the queries is 'AND', then the domain for the query is the intersection of the instances in query 1100 and query 1110. Clearly, if the generality mentioned above is used, then the domain for the query is the result of doing all the intersections and unions of all the queries in a linked list or tree.

Figure 31:
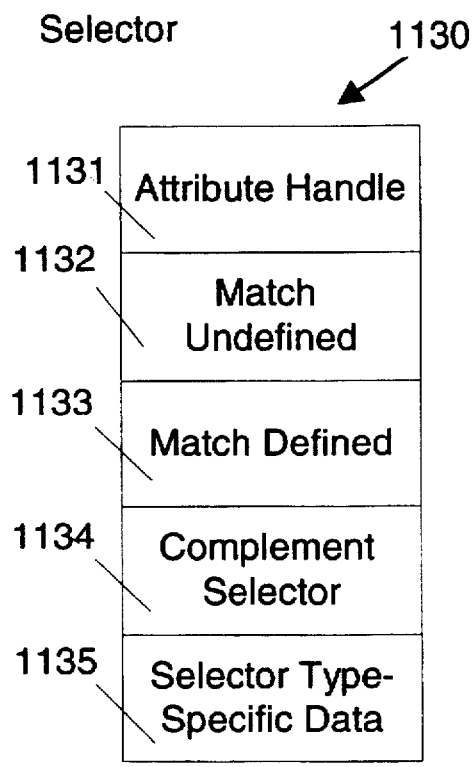
FIG. 31 is a schematic diagram of a selector object.

Referring now to FIG. 31, a selector for an attribute (for example 1125, 1126, or 1127 in FIG. 30) is described in greater detail. The attribute selector 1130 comprises an attribute handle 1131, a match undefined flag 1132, a match defined flag 1133, a complement selector flag 1134, and some attribute type specific data 1135.

The attribute handle 1131 is a reference to an attribute that must be inheritable to the query class 1101 in query 1100 shown in FIG. 30. All attribute handles 1131 in selectors 1130 in a query 1100 must be distinct. In other words, a query can have at most one selector for each of the attributes inheritable to the query class. The attribute handle 1130 specifies which parameter value for instances will be tested when the query is applied. The remaining fields specify the nature of the parameter value test.

The match undefined flag 1132 is used to specify that parameters that are undefined match the selector. If the match undefined flag 1132 is TRUE, then undefined parameters match the selector. If the match undefined flag 1133 is FALSE, then the other fields are used to test for a match.

The match defined flag 1133 is used to specify that parameters that are defined with any value match the selector. If the match defined flag 1133 is TRUE and a parameter value is not undefined, then that parameter value matches the selector. If the match defined flag 1133 is FALSE, then the other fields are used to test for a match. Note that the match undefined flag 1132 and the match defined flag 1133 cannot both be TRUE. This state would be the same as 'always match' and this is done in practice by not specifying a selector for the attribute.

The complement selector flag 1134 is used in conjunction with the selector type-specific data 1135. The type-specific data 1135 are described in the following figures. For example, if the attribute handle 1131 type is Boolean, then the type-specific data 1135 are specifiers for the Boolean parameter values TRUE and FALSE. Or, if the attribute handle 1131 type is enumerated, then the type-specific data 1135 are enumerators that need to match. If the complement selector flag 1134 is TRUE, then the type-specific data 1135 is complemented for the match. This is useful for making the type-specific data simpler. In other words, if the attribute handle 1131 type is enumerated, and the enumerated attribute is, for example, "Color" with one hundred color enumerators, the type-specific data can be set to match every color except "Blue" by setting the type-specific data to match "Blue" and setting the complement selector flag 1134 to TRUE. If the complement selector flag 1134 is FALSE, then the flag has no effect on the selector type-specific data. The selector type-specific data 1135 can be empty, in which case the complement selector flag 1134 is ignored and no test need by done on the parameter value.

The match undefined flag 1132 can be used together with the complement selector flag 1134 and the type-specific data 1135. If the match undefined flag 1132 is TRUE and selector type-specific data 1135 is non-empty, then a parameter value that is either undefined or matches the type-specific data 1135 matches the query. However, if the match defined flag 1133 is TRUE, then the type-specific data 1135 must be empty and, as mentioned previously, the match undefined flag 1132 must be FALSE. These constraints can be summarized in the truth table of Table I:

TABLE I

| defined set? | undefined set? | selector type-specific data non-empty? | |
|---|---|---|---|
| TRUE | TRUE | TRUE | not allowed, would match everything |
| TRUE | TRUE | FALSE | not allowed, would match everything |
| TRUE | FALSE | TRUE | not allowed, defined overrides values |
| TRUE | FALSE | FALSE | ok |
| FALSE | TRUE | TRUE | ok |
| FALSE | TRUE | FALSE | ok |
| FALSE | FALSE | TRUE | ok |
| FALSE | FALSE | FALSE | ok, but this state is the same as if the selector didn't exist. In the preferred embodiment, if an application were to set the selector to this state, the selector should be removed from the query. |

Figure 32:
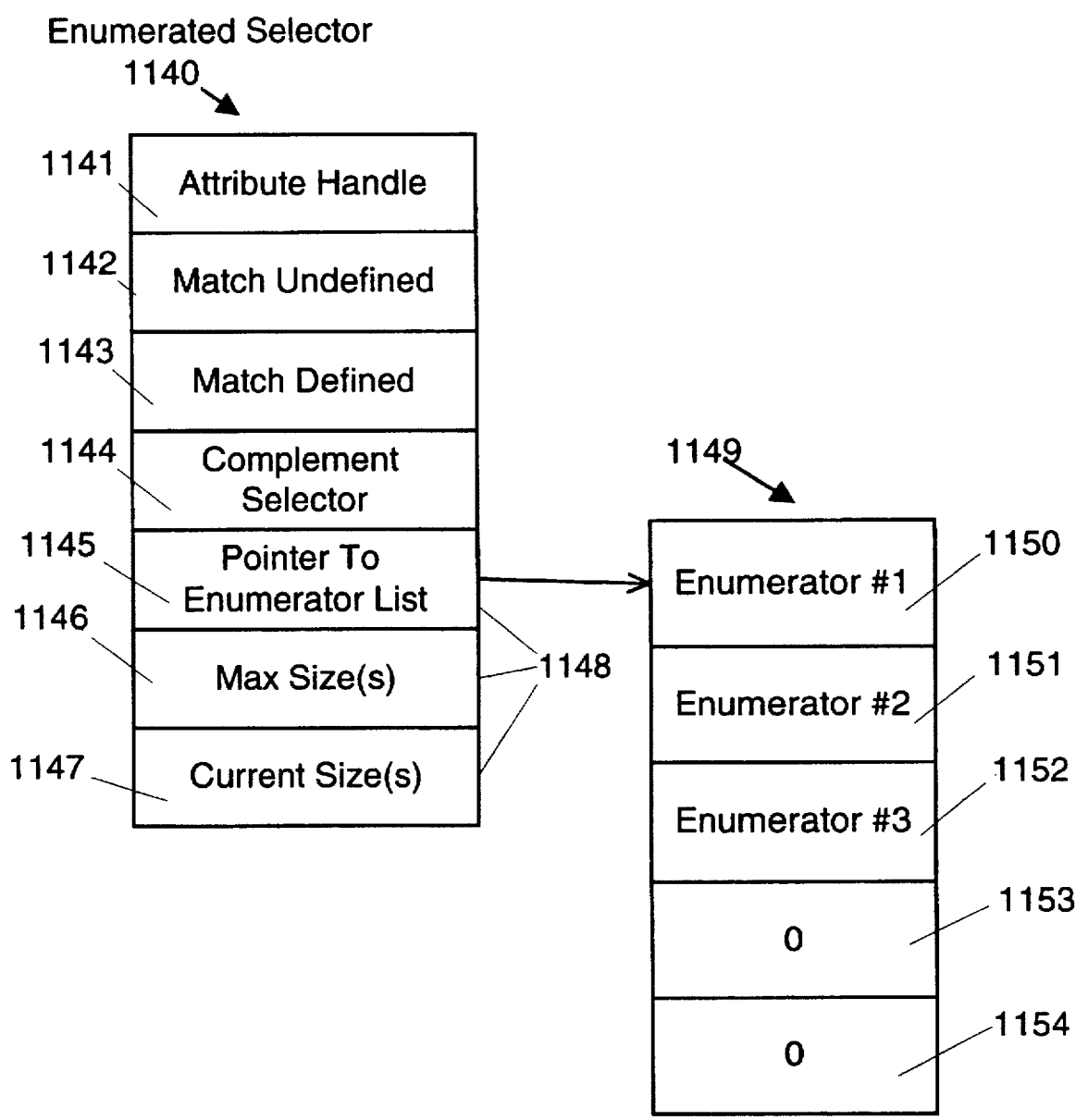
FIG. 32 is a schematic diagram of an enumerated selector object.

The selector type-specific data for enumerated attributes is explained in FIG. 32. In this diagram, the fields common to all selectors are repeated for clarity. The enumerated selector 1140 comprises the attribute handle 1141, the match undefined flag 1142, the match defined flag 1143, and complement selector flag 1144. The type specific data 1148 is a list of enumerators. The list 1148 is a generic list object 240 comprising the maximum allocated size of the list 1146, the current size 1147, and a pointer to a list of enumerator handles 1145. The list of enumerator handles 1149, in this example has five elements, three of which are in use. These are the three enumerators 1150, 1151, and 1152 that are to be compared to parameter values. The two elements of the list 1149 that are not in use, items 1153 and 1154, are set to zero.

An instance with an enumerated parameter value that is any one of the enumerators in the enumerator list 1149 matches the selector. As an example, if the attribute handle 1141 is the enumerated attribute "Color" and the enumerator handles 1150, 1151, and 1152 are the colors "Red," "White," and "Blue," then an enumerated parameter with one of these colors matches the selector. If the parameter is not one of these colors, then it does not match the selector.

Figure 33A:
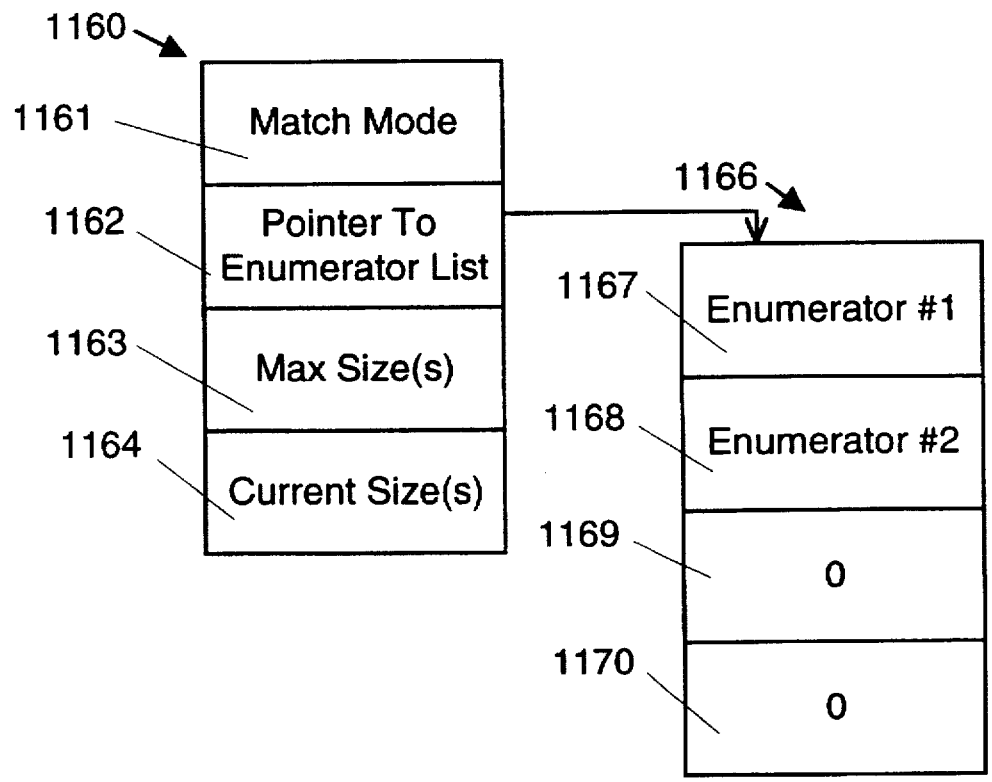
FIG. 33A is a schematic diagram of an enumerated set selector specific data object.
Figure 33B:
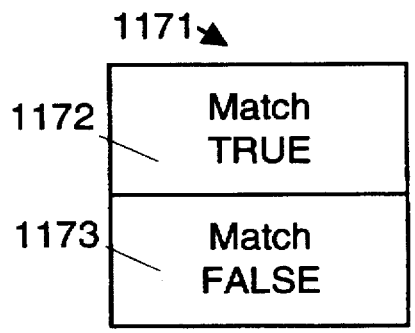
FIG. 33B is a schematic diagram of a Boolean selector specific data object.

Referring next to FIGS. 33A and 33B, the selector type-specific data for an enumerated set selector is shown. Henceforth, the fields common to all selectors will be omitted during this description for clarity, and only the type-specific data will be depicted, it being understood that the other common fields are present, but are not shown. The enumerated set selector type-specific data 1160 comprises a match mode flag 1161 and a list of enumerator handles 1165. The list of enumerators handles 1165 is a generic list object comprising the pointer to the enumerator handles 1162, the maximum size 1163, and current size 1164.

The enumerator handles in the list 1166 are used in conjunction with the match mode 1161 to determine if a parameter value matches the selector. The match mode 1161 can be one of 'ANY', 'ALL', or 'EXACT'. If the match mode 1161 is 'ANY', then the parameter value testing is done in the same manner as for the enumerated type selector 1140. If any one of the enumerated set selector values 1166 equals any one of the enumerated set parameter values, then the parameter value matches. If the match mode 1161 is 'ALL', then only if all of the enumerated set selector values 1166 are found in the enumerated set parameter values does the parameter match. In other words, the enumerated set selector values must be a subset of the parameter values for the match to be TRUE. Finally, if the match mode 1161 is 'EXACT', then the enumerated set parameter values must equal all of the enumerated set selector values 1166 for the match to be TRUE.

FIG. 33B also depicts the Boolean selector type-specific data 1171. If the match TRUE flag 1172 is TRUE, then Boolean parameters values that are TRUE match the selector. If the match FALSE flag 1173 is TRUE, then Boolean parameters values that are FALSE match the selector.

Figure 34A:
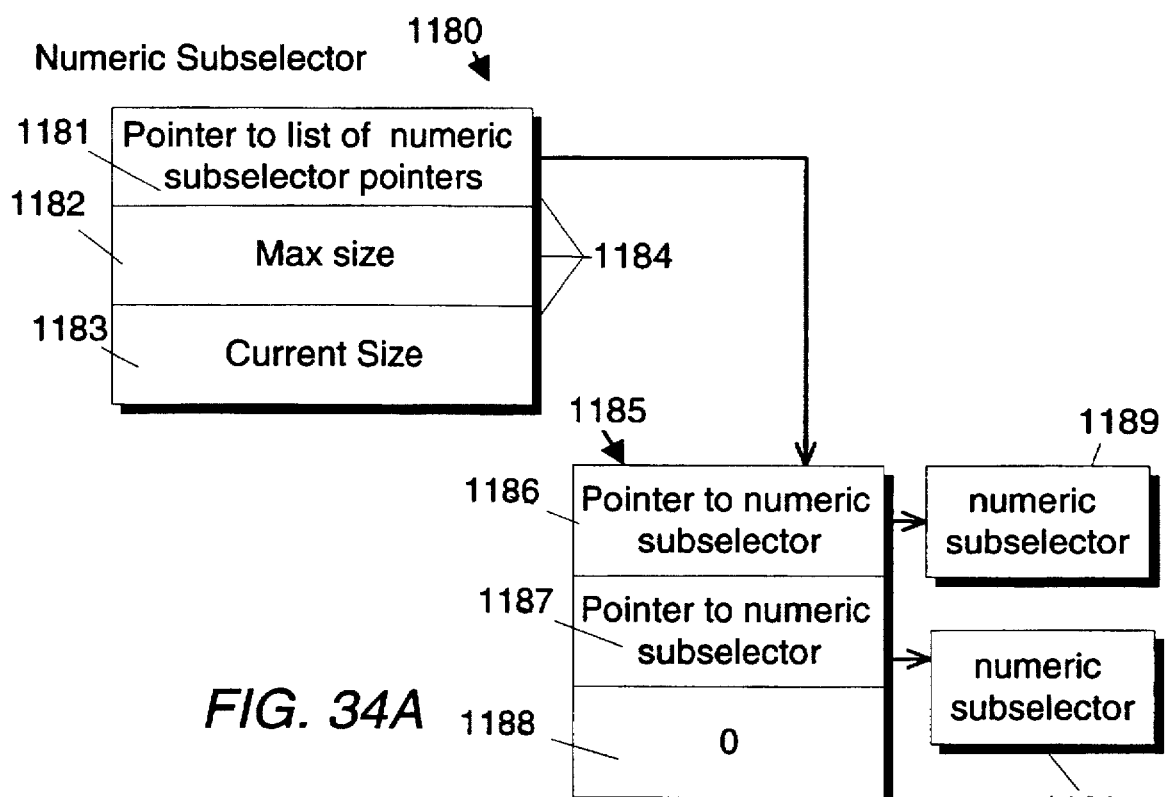
FIG. 34A is a schematic diagram of a numeric selector type-specific data object.
Figure 34B:
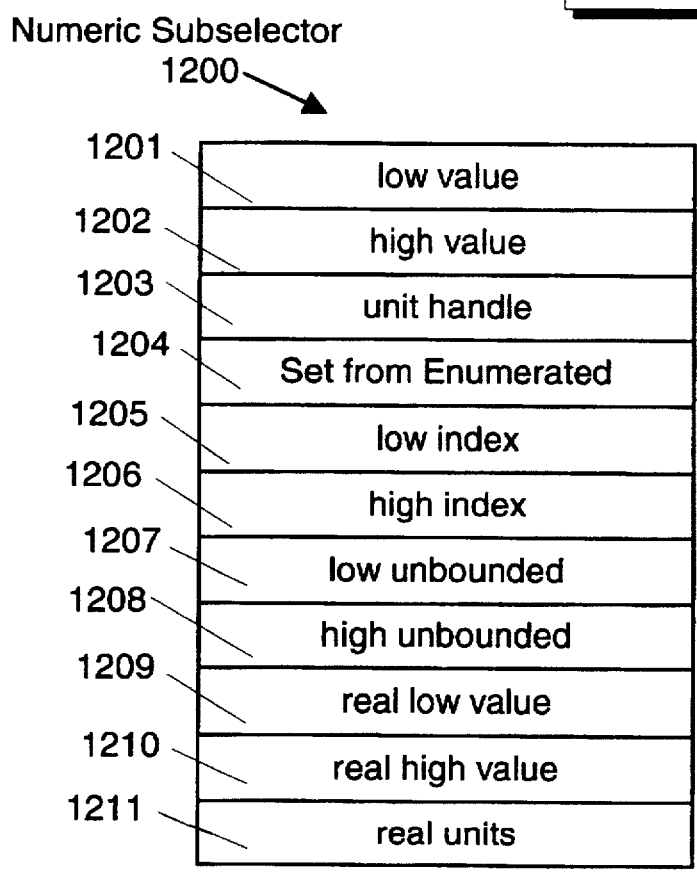
FIG. 34B is a schematic diagram of a numeric subselector object.

Continuing with FIGS. 34A and 34B, the numeric selector type-specific data 1180 is shown. The numeric selector type-specific data is a list 1184 of pointers to numeric sub-selectors. The list 1184 is a generic list object comprising the pointer to a list of pointers to numeric sub-selectors 1181, the maximum size of the list 1182, and the current size 1183. The list of pointers to sub-selectors 1185, is shown in this example with two pointers, item 1186 which points to the numeric sub-selector 1189, and item 1187 which points to the number sub-selector 1190. The remaining pointer 1188 in list 1185 is unused and set to "Null."

The numeric sub-selectors 1189 and 1190 are described more completely as item 1200. The numeric sub-selector 1200 contains several fields that are not used in the query, but are used to recall the way the user specified the query. These fields are the low value 1201, the high value 1202, the unit handle 1203, the set from enumerated flag 1204, the low index 1205, and the high index 1206. A numeric sub-selector can be specified by a low value 1201, high value 1202, and unit handle 1203. The low and high values are converted from the unit handle 1203 into the base units for the numeric attribute 1131. The converted low and high values are stored in the real low value 1209 and real high value 1210, respectively. The base unit to which the values were converted is stored in the real units handle 1211.

A numeric sub-selector can also be specified by a low index 1205 and a high index 1206. These indices refer to values in an enumerated unit table that can be associated with the numeric attribute 1131. The numeric values found in the enumerated unit table at the low and high indices are stored in the real low value 1209 and real high value 1210, respectively. The base unit associated with the enumerated unit table is stored in the real units handle 1211.

The real low value 1209 and real high value 1210 define a range of values in between which a numeric parameter value must lie for the parameter to match the selector. In addition, a numeric sub-selector can be specified to be open-ended at either the low end, high end, or both. This is done by setting the low unbounded flag 1207 or the high unbounded flag 1208 to TRUE. If either flag is TRUE, then the respective real low value 1209 or real high value 1210 is ignored. Using the low unbounded flag 1207 or the high unbounded flag 1208 is exactly equivalent to setting the real low value 1209 or real high value 1210 to negative or positive infinity, respectively.

A numeric parameter value is compared to the ranges defined in all the numeric sub-selectors and if the numeric parameter value lies within at least one of the ranges, then the numeric parameter matches the selector.

Figure 35:
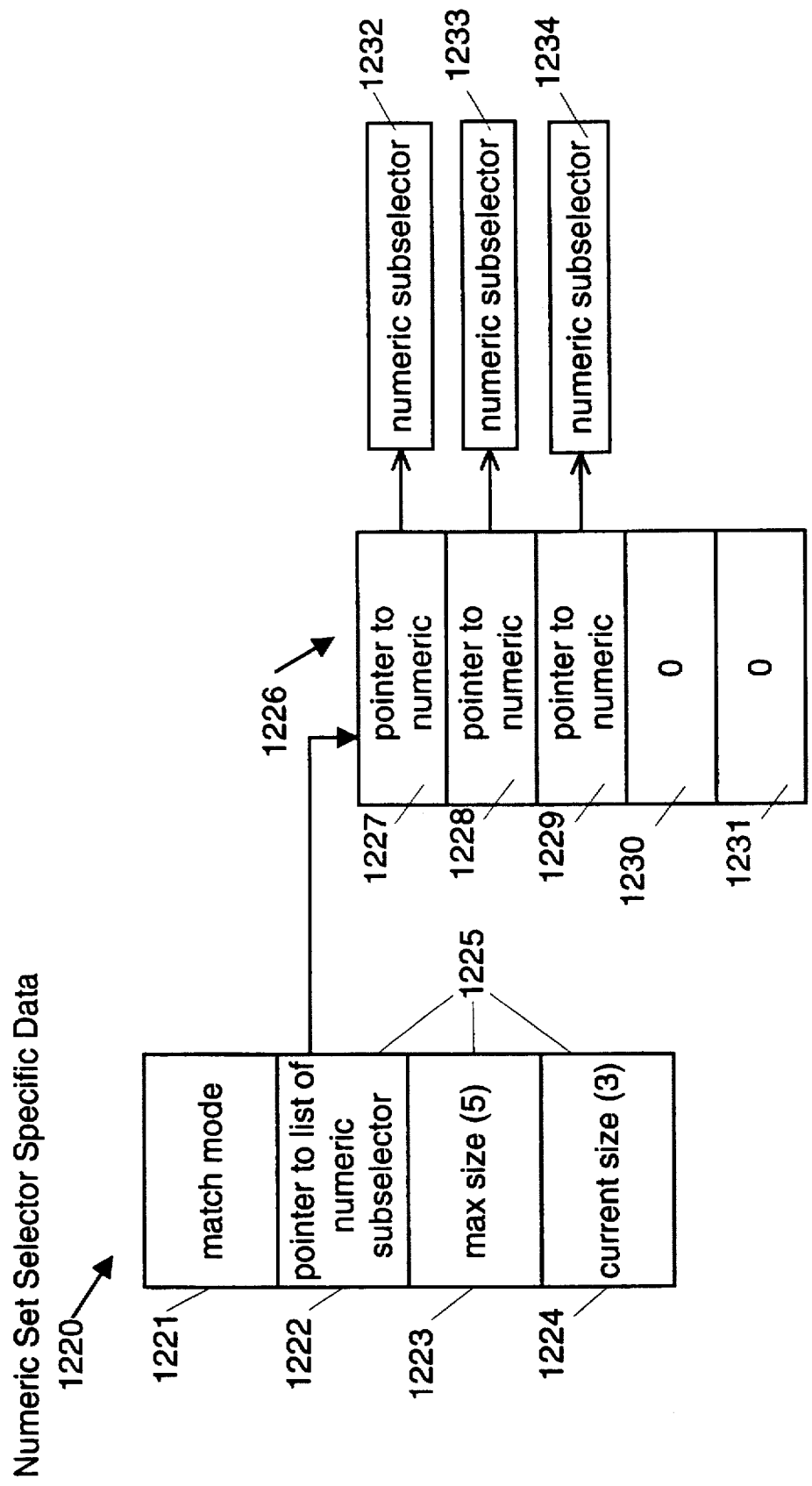
FIG. 35 is a schematic diagram of a numeric set selector specific data object.

The numeric set selector type-specific data 1220 is shown in FIG. 35. It is composed of a match mode flag 1221 and a list of pointers to numeric sub-selectors 1225. The match mode flag 1221 has semantics identical to the match mode flag 1161 in the enumerated set selector type-specific data 1160. The list 1225 is a generic list object 240 comprising the pointer to the list of pointers to sub-selectors 1222, the maximum list size 1223, and the current size 1224. The list of pointers to numeric sub-selectors 1226 is identical in form and use to the list 1185 in the numeric selector 1180, and the numeric sub-selectors 1232, 1233, and 1234 in this example are the numeric sub-selector 1200 shown in FIG. 34B.

Similar to the way the enumerated set selector 1160 is used, the numeric set selector 1220 matches a numeric set parameter depending on the match mode flag 1221. If the match mode flag is 'ANY', then if any one of the numeric set parameter values is in between any of the ranges specified by the numeric sub-selectors, then the parameter matches the selector. The two other match mode values are slightly different from the match modes in the enumerated set because the numeric sub-selector allows a range. If the match mode flag is 'ALL', then all of the ranges specified by the numeric sub-selectors must match the numeric set parameter values for the selector to match. In other words, comparing the numeric set parameter values with the ranges in the numeric sub-selectors, each numeric sub-selector must get matched, but not all the parameters need match. And, if the match mode flag is 'EXACT', then each of the numeric set parameter values must be in between at least one of the ranges specified by the numeric sub-selectors and each of the ranges specified by the numeric sub-selectors must match at least one of the numeric set parameter values for the selector to match.

Finally, string selector type-specific data, string array selector type-specific data, and international string selector type-specific data are identical, shown as item 1240. This will be referred generically as string type-specific data. The string type-specific data 1240 comprises a list of pointers to string sub-selectors 1244. The list 1244 is a generic list object comprising the pointer to a list of pointers to string sub-selectors 1241, the maximum size of the list 1242, and the current size of the list 1243.

Figure 36A:
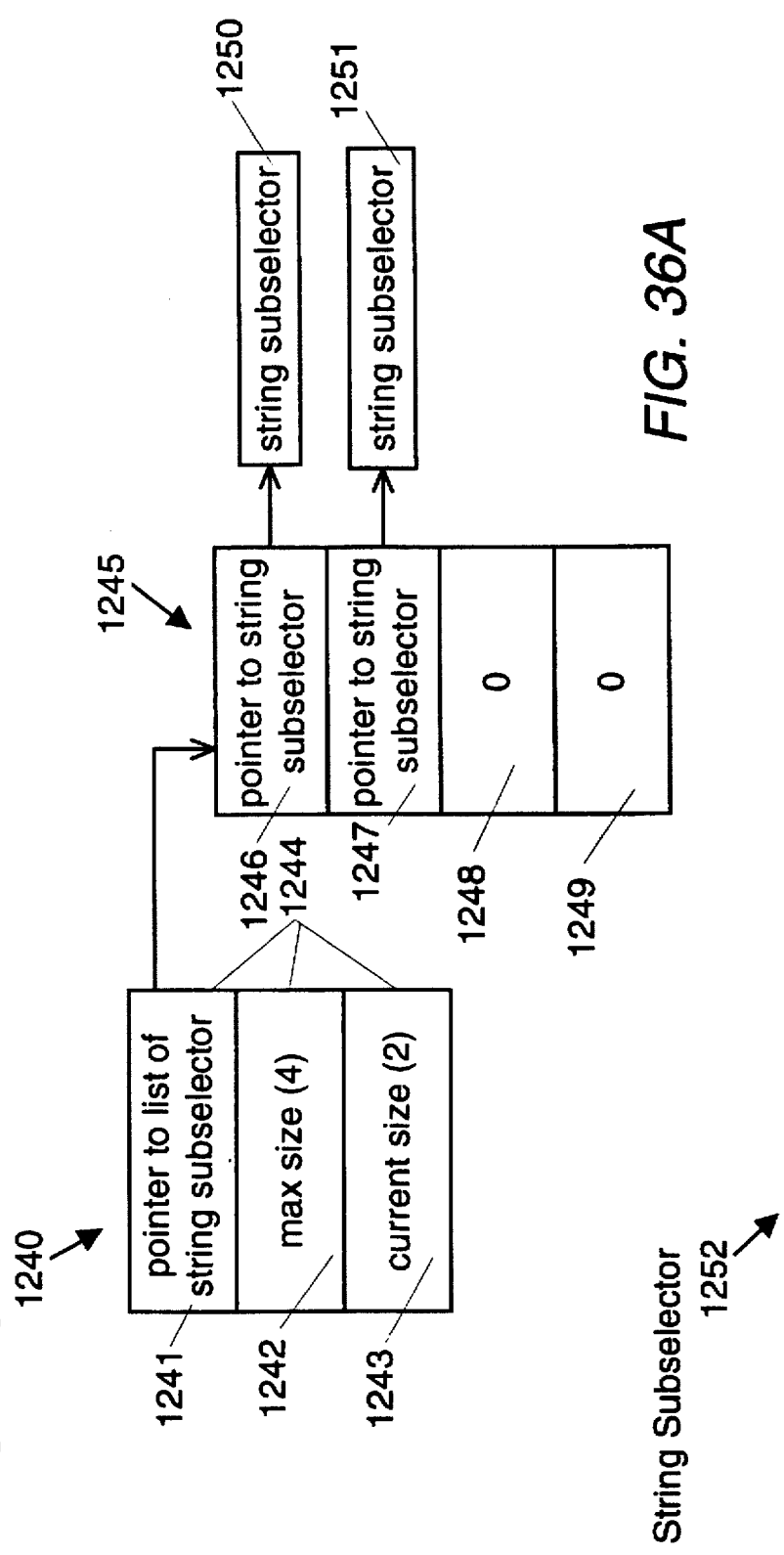
FIG. 36A is a schematic diagram showing the structure of string, string array, and international string selector specific data objects.

The list of pointers to string sub-selectors 1245 is depicted in FIG. 36A with a maximum of four elements, of which two are currently used. The pointer 1246 refers to a string sub-selector 1250, the pointer 1247 refers to a string sub-selector 1251, and the two elements 1248 and 1249 are set to "Null" because they are unused.

Figure 36B:
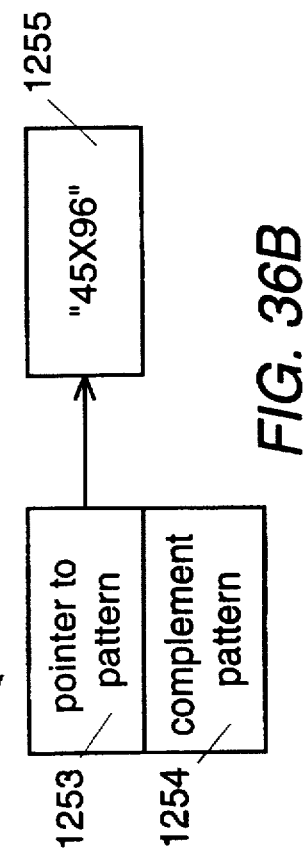
FIG. 36B is a schematic diagram of a string subselector object.

String subselectors 1252, shown in FIG. 36B, are composed of a pointer to a character string 1253, which is a pattern 1255 for matching against the string. In the preferred embodiment, the pattern 1255 is a sequence of characters that match strings similar to Unix shell patterns. Also, the pattern 1255 can be a more powerful regular expression. For example, the pattern "45*96" matches all strings that start with "45" and end with "96". The complement pattern flag 1254 is used to invert the sense of the pattern match. If the complement pattern flag 1254 is FALSE, then it has no effect. However, if the complement pattern flag 1254 is TRUE, then strings that do not match the pattern match the string sub-selector. Using the example above, if the complement pattern flag were TRUE, then all strings that do not start with "45" and end with "96" would match the string sub-selector.

The semantics of the string selector match depend on the type of the attribute. A string parameter value matches the selector if any one of the string sub-selectors match. Also, an international string parameter value matches the selector if any one of the string sub-selectors match. The international string parameter 216 value that is matched with the pattern is a character string 279 referenced as shown in FIG. 9A, and is located using the method described in FIG. 17. If the attribute type is a string array 221, then the string array parameter value matches if any one of the elements of the string array parameter values 264, 265, 266 and 267 matches any one of the string sub-selectors.

Figure 21:
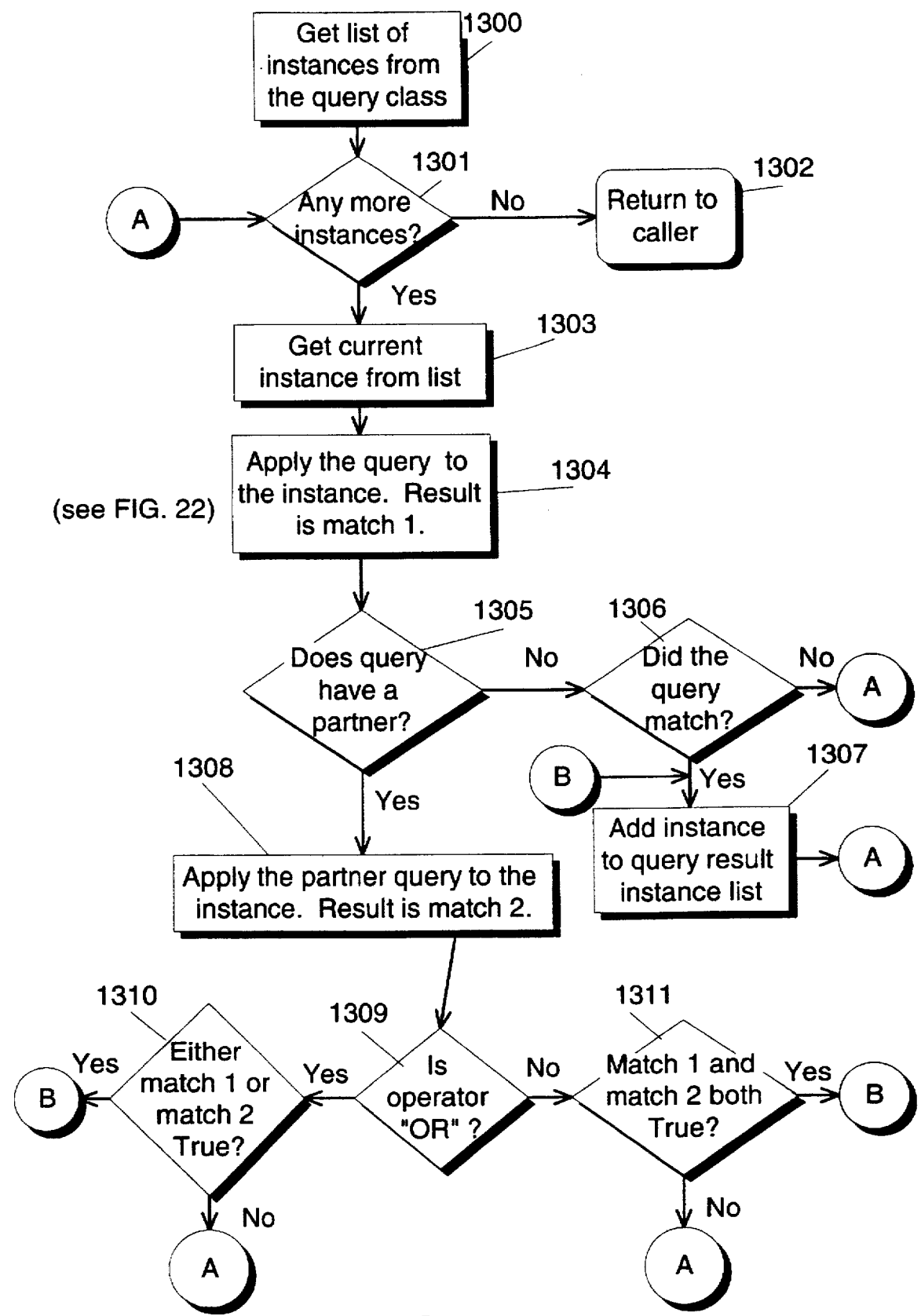
FIG. 21 is a flow chart describing a method of applying a query to a class.

The procedure for applying each of the selectors in the query to each of the instances owned by a class is described in FIG. 21. Beginning with step 1300, processing begins with the list of instances that are owned by the class. If the list of instances is empty at step 1301, then control is returned to the caller, step 1302.

Figure 22:
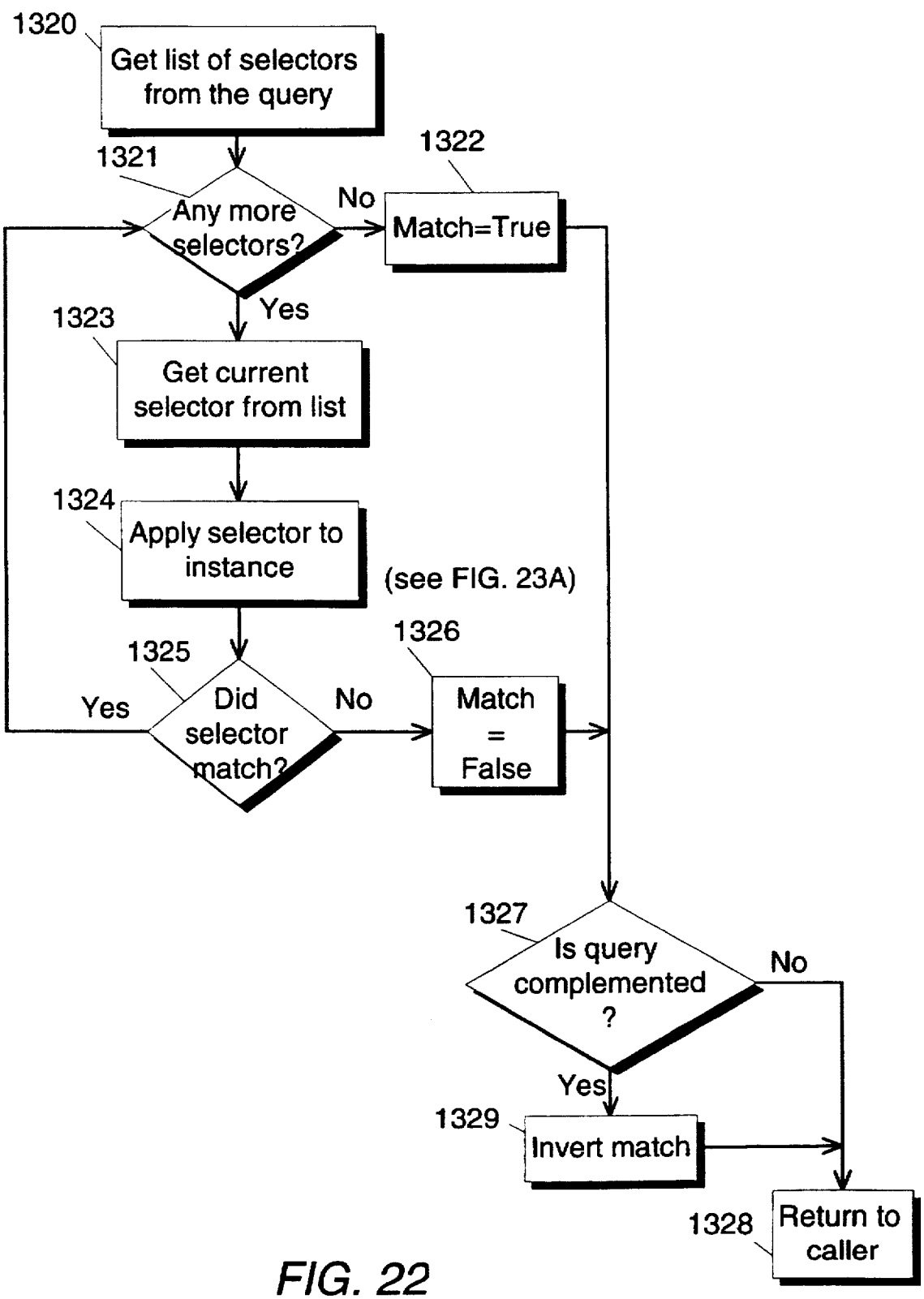
FIG. 22 is a flow chart describing a method of applying a query to multiple instances.

At step 1301, if there are instances to be examined, control continues at step 1303. At step 1303, the first instance to be examined becomes the current instance. The query is applied to the current instance in step 1304. This step 1304 is explained in more detail in FIG. 22, beginning with step 1320. The return 1328 from FIG. 22 is a Boolean value which is TRUE if the match between the instance and the query succeeded. If the match failed, then the return 1328 is FALSE. This result is called "match1" in this example.

Referring to FIG. 21, the query is tested for a non-null partner in step 1305. If the query does not have a partner, processing continues with step 1306. The result of applying the query to the instance is known to be match1. In step 1306, if match1 is FALSE, then processing continues with step 1301 where the list of instances is inspected to see if any remain to be processed. If instances remain to be processed at step 1301, then processing continues at step 1303, where the next instance to be examined becomes the current instance. Control continues with step 1304 as described above.

If the value of match1 is TRUE at step 1306, then control passes on to step 1307. At step 1307 the instance, which is now known to match, is added to the query result instance list. Control then continues with step 1301 as described above.

If the query has a partner at step 1305, then the partner query must also be applied to the instance. Processing continues with step 1308 where the partner query is applied to the instance using the method shown in FIG. 22 beginning at step 1320. This is the same method used for the instance and the first query, and the description of the steps of this method need not be repeated. The result of this match is called "match2" in this example.

Now returning to FIG. 21, match1 and match2 must be logically combined to determine the match for the partnered query. In step 1309, the logical operator 1108 is checked to see if it is "OR". If it is "OR", then processing continues with step 1310. If it is not "OR" (it must, therefore, be "AND"), processing continues with step 1311. In step 1310, if either of match1 or match2 is TRUE, then control continues with step 1307 where the instance is known to match the query and it is added to the query result instance list. Otherwise, the instance does not match and control continues with step 1301 as described above. In step 1311, if both of match1 or match2 is TRUE, then control continues with step 1307 where the instance is known to match the query and it is added to the query result instance list. Otherwise, the instance does not match, and control continues with step 1301 as described above.

After having the benefit of this disclosure, a practitioner skilled in the art will appreciate that this algorithm can be optimized. The logical operator 1108 could be tested at step 1305 and, if match1 is TRUE and the logical operator is "OR", then there is no need to apply the partner query. The instance is known to match the query and a branch directly to step 1307 can be done.

FIG. 22 shows the process of applying the selectors 1120 of a query 1100 to a single instance. The process begins with the list of selectors from the query at step 1320. The list of selectors is examined in step 1321. If the list of selectors is empty at step 1321, then control continues at step 1322. A query with zero selectors always means that the instance thus far matches the query. At step 1322, the match state is set to TRUE.

However, a query can be complemented. The method continues with step 1327 where the query complement flag 1102 is tested. If the query complement flag 1102 is FALSE, then the method continues with step 1328 where the match state is returned to the caller. At step 1327, the query complement flag 1102 is TRUE, then the match state must be inverted at step 1329. At step 1329, if the match state is TRUE, then it is switched to FALSE. If the match state is FALSE, it is switched to TRUE, thus complementing the value. The method continues with step 1328 and the match state is returned to the caller.

If the list of selectors is not empty at step 1321, then the first selector becomes the current selector to be examined at step 1323. At step 1324 the current selector is applied to the instance. This algorithm is explained in detail in FIG. 23A beginning with step 1330. Referring to FIG. 22, the selector to be applied to the instance in step 1324 is tested in step 1325. If the selector does not match the instance, then the entire query does not match the instance and the method continues with step 1326. At step 1326, the match state is set to FALSE and control continues with step 1327 as described above.

If the selector does match the instance in step 1325, then the remaining selectors must be tested and the method returns to step 1321. At step 1321, a check is made to see if any selectors remain to be examined. If the list of selectors has been exhausted, the method continues with step 1322. Otherwise, the method continues with step 1323, where the next selector that has not been processed becomes the current selector.

Notice that all the selectors must match the instance for the query to match the instance and thus be added to the query result instance list. This means that the query comprises the conjunction or logical 'AND' of the selectors. In this preferred embodiment, the conjunction is optimized by rejecting the instance upon the first selector that doesn't match.

Figure 23A:
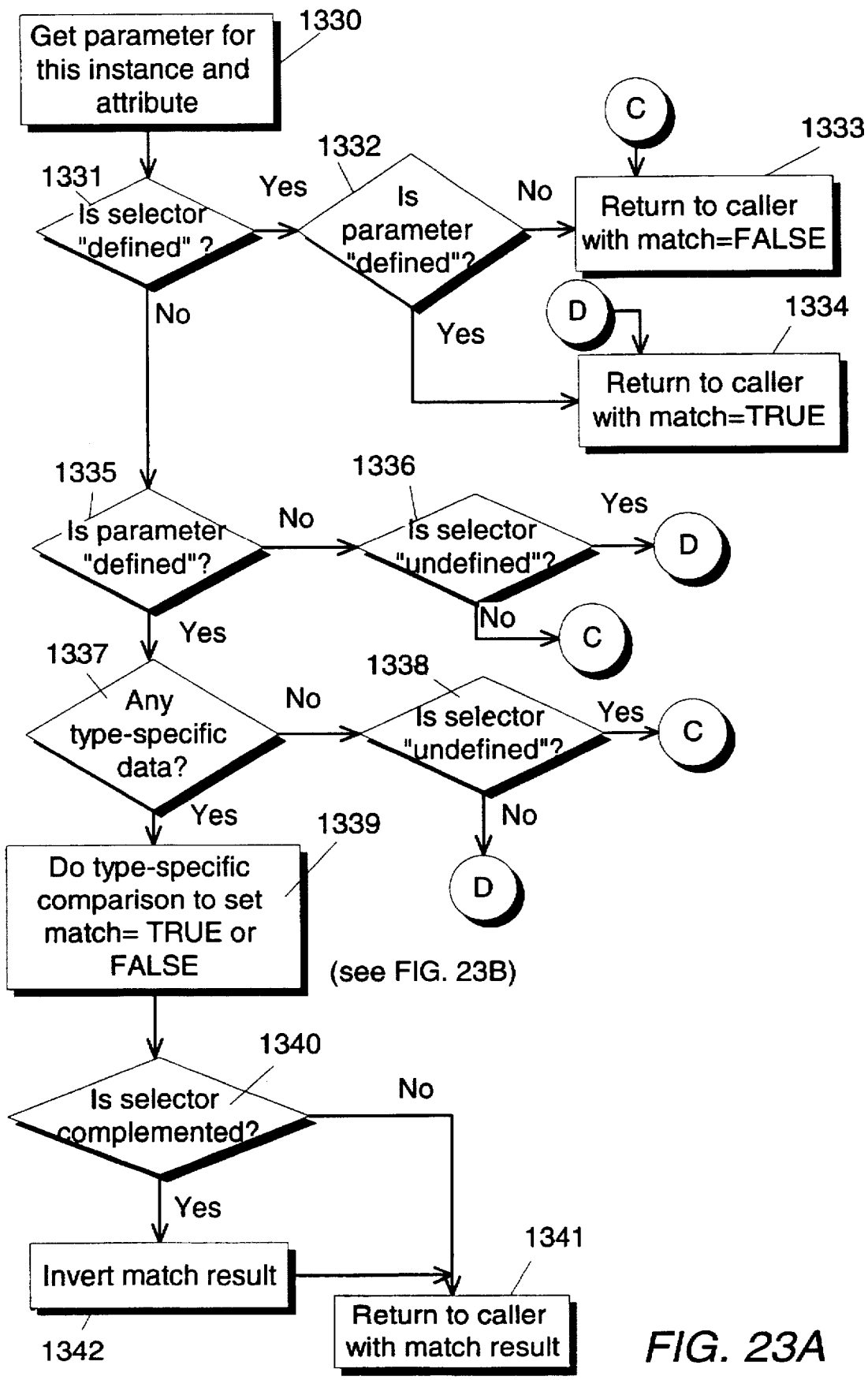
FIG. 23A is a flow chart describing a method of applying a selector to an instance.

FIG. 23A shows the algorithm for matching a single selector and instance. Beginning at step 1330, the parameter for the current instance (found in step 1303 shown in FIG. 21) for the attribute corresponding to the selector's attribute is found. Additional information concerning this technique is disclosed in application Ser. No. 08/339,481, filed Nov. 10, 1994, by Thomas S. Kavanagh, et al., for OBJECT ORIENTED DATABASE MANAGEMENT SYSTEM, now pending, the entire disclosure of which is incorporated herein by reference.

A truth table demonstrating the test that must be performed between the parameter and attribute is shown in Table II. This table combines the five legal states of the selector (see FIG. 31) with the state of the parameter value (defined or undefined). The result of the match is shown in Table II.

TABLE II

| match defined set? | parameter is defined? | match undefined set? | selector type-specific data non-empty? | result of match |
|---|---|---|---|---|
| TRUE | TRUE | FALSE | FALSE | TRUE |
| TRUE | FALSE | FALSE | FALSE | FALSE |
| FALSE | TRUE | TRUE | TRUE | Test parameter |
| FALSE | TRUE | TRUE | FALSE | FALSE |
| FALSE | TRUE | FALSE | TRUE | Test parameter |
| FALSE | TRUE | FALSE | FALSE | TRUE |
| FALSE | FALSE | TRUE | TRUE | TRUE |
| FALSE | FALSE | TRUE | FALSE | TRUE |
| FALSE | FALSE | FALSE | TRUE | FALSE |
| FALSE | FALSE | FALSE | FALSE | FALSE |

The preferred method for implementing the truth table begins at step 1331. At step 1331, the selector is checked for the match defined flag 1133. If the match defined flag 1133 is TRUE, then the method continues with step 1332. In step 1332, if the parameter is not defined, then the method continues with step 1333, where control is returned to the caller (step 1328 in FIG. 22) with the indication that the selector and parameter do not match (match=FALSE). In step 1332, if the parameter is defined then the method continues with step 1334, where control is returned to the caller with the indication that the selector and parameter do match (match=TRUE).

If the the match defined flag 1133 in step 1331 is FALSE, then the method continues with step 1335. At step 1335 the parameter is checked to see if it is defined. If the parameter is not defined (in other words, the parameter has not been given a value), then the method continues with step 1336. In step 1336, a check is made to see if the selector matches undefined parameters. If the match undefined flag 1132 is set in the selector, then the method continues with step 1334 as described above. If the match undefined flag 1132 is not set in the selector, then the method continues with step 1333 as described above.

If the parameter is defined in step 1335, then the method continues with step 1337. Selectors can specify zero values to match. For example, the selector may be set to match only undefined parameters. At step 1337, if there are no type-specific data 1135 set in the selector, then the method continues with step 1338. In step 1338, a check is made to see if the selector matches undefined parameters. If the match undefined flag 1132 is set in the selector, then the method continues with step 1333 as described above. If the match undefined flag 1132 is not set in the selector, then the method continues with step 1334 as described above.

If type-specific data 1135 are set in the selector at step 1337, then the method continues at step 1339. In step 1339, a determination of the type of the parameter (and selector) is made, which determines the type of test that is done to see if the parameter and selector match. The semantics of each type-specific test is described in more detail in FIGS. 32, 33A & B, 34A & B, 35, and 36A & B. Thus, the applicable test may be "plugged in" at this point in the flowchart of FIG. 23A. A match value of either TRUE or FALSE will be generated and returned by each specific test when the described method is performed.

Referring to FIG. 23A, the method continues with step 1340 after the selector and parameter values have been compared. If the complement selector flag 1134 is set to FALSE, the method continues with step 1341 where the result of the match is returned to the caller. If the complement selector flag 1134 is set to TRUE, then the result of the match must be inverted. At step 1342, if the match was TRUE then it is changed to FALSE. If the match was FALSE, then it is changed to TRUE in step 1342. The method continues with step 1341 where the result of the match is returned to the caller.

Figure 23B:
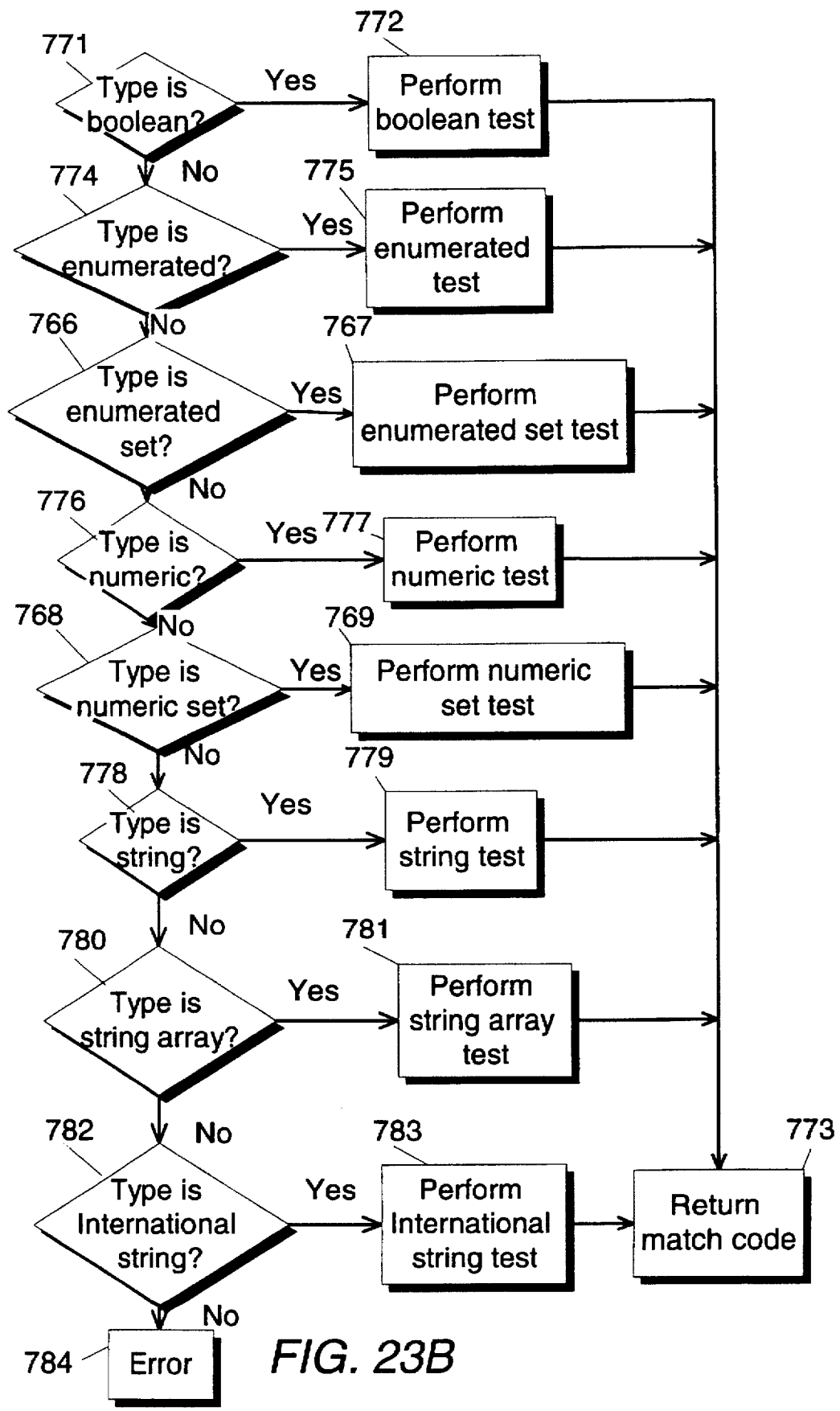
FIG. 23B is a flow chart depicting a process for applying a selector to a parameter.

One procedure for comparing a parameter and a selector for purposes of applying a query is shown in FIG. 23B. The system determines the type of the parameter (and selector) which determines the type of test that is done to determine if the parameter and selector match. At step 771, the type is tested for boolean. If the type is boolean, control continues with step 772. If the type is not boolean, control continues with step 774. If the type is enumerated at step 774, then the method continues with step 775. Otherwise, the method continues with step 766. If the type is an enumerated set at step 766, then the method continues with step 767. Otherwise, the method continues with step 776. If the type is numeric at step 776, then the method continues with step 777. Otherwise, the method continues with step 776. If the type is a numeric set at step 768, then the method continues with step 769. Otherwise, the method continues with step 778. If the type is string at step 778, then the method continues with step 779. Otherwise, the method continues with step 780. If the type is string array at step 780, then the method continues with step 781. Otherwise, the method continues with step 782. If the type is international string at step 782, then the method continues with step 783. Otherwise, the method continues with step 784. In step 784, an error is returned because the type is not one of those recognized by the system.

At step 771, the Boolean test is performed. If the value of the parameter matches the value in the selector (as explained in connection with FIG. 32), then the method continues with step 773, returning a match to the caller. Otherwise, the method continues with step 773, returning no match to the caller.

At step 774, the enumerated parameter value is compared with the list of enumerators in the selector. If the parameter value matches one of the enumerators in the selector, then control continues with step 773, returning a match to the caller. Otherwise, control continues with step 773, returning no match to the caller.

At step 766, the enumerated set parameter value is compared with the list of enumerators in the selector (as explained in connection with FIGS. 33A & 33B).

At step 776, the numeric parameter value is compared with the numeric values in the selector. The parameter value matches if the numeric value is within the range of the numeric values specified in the selector. If the parameter value matches, then control continues with step 773, returning a match to the caller. Otherwise, control continues with step 773, returning no match to the caller.

At step 768, the numeric set parameter value is compared with the list of enumerators in the selector (as explained in connection with FIGS. 34A & 34B).

At step 778, the string parameter value is compared with the string patterns in the selector. If any one of the string patterns matches the string parameter value, then the parameter value matches. Additional information on pattern matching can be found in P. J. Plauger, *The Standard C Library* (1992). If the parameter value matches, then control continues with step 773, returning a match to the caller. Otherwise, control continues with step 773, returning no match to the caller.

At step 780, the string array parameter values are compared with the string patterns in the selector. If any one of the string array values matches any one of the patterns in the selector, then the parameter value matches. If the parameter value matches, then control continues with step 773, returning a match to the caller. Otherwise, control continues with step 773, returning no match to the caller.

At step 782, the international string parameter value 216 is compared with the string patterns in the selector. The international string parameter value 216 that is matched with the pattern is character string 279 found as shown in FIG. 9A using the process in FIG. 17. If the parameter value matches, then control continues with step 773, returning a match to the caller. Otherwise, control continues with step 773, returning no match to the caller.

Figure 37:
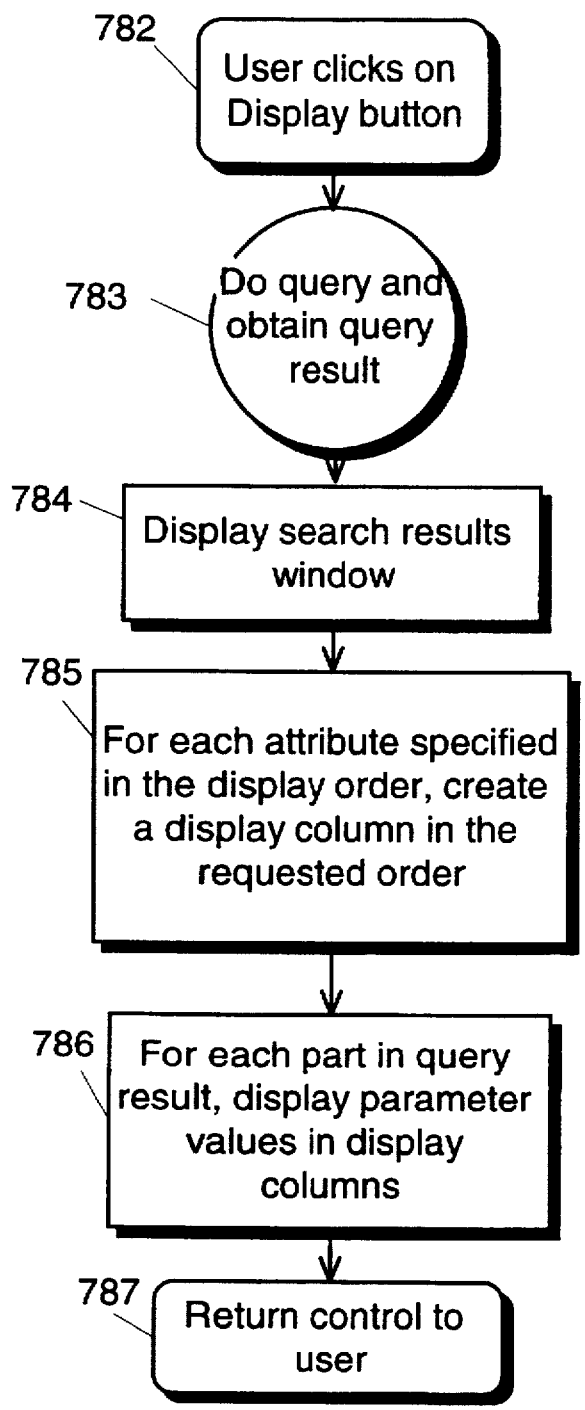
FIG. 37 is a flow chart depicting the application of a query count.

A procedure for requesting display of search results is depicted in FIG. 37. The procedure is initiated in step 782 when the user clicks on a display button 325. The procedure then moves to step 783 shown in FIG. 37. In this step, the system does a query and obtains the query result. After the query result is obtained, the procedure then moves to step 784 and displays a search results window 326, an example of which is shown in FIG. 24.

Referring again to FIG. 37, the next step in the procedure is step 785. For each attribute specified, a display column is created. The procedure then moves to step 786, and for each part in the query result, the parameter values for the specified attributes are displayed in the respective display columns. In order to display the parameter values 327 in the currently selected language, international string parameter objects 216, such as the example shown in FIG. 9A, are used to retrieve the appropriate character string 279 for each parameter to be displayed. Control is then returned to the user in step 787 and the retriever 130 waits for another command.

Figure 24:
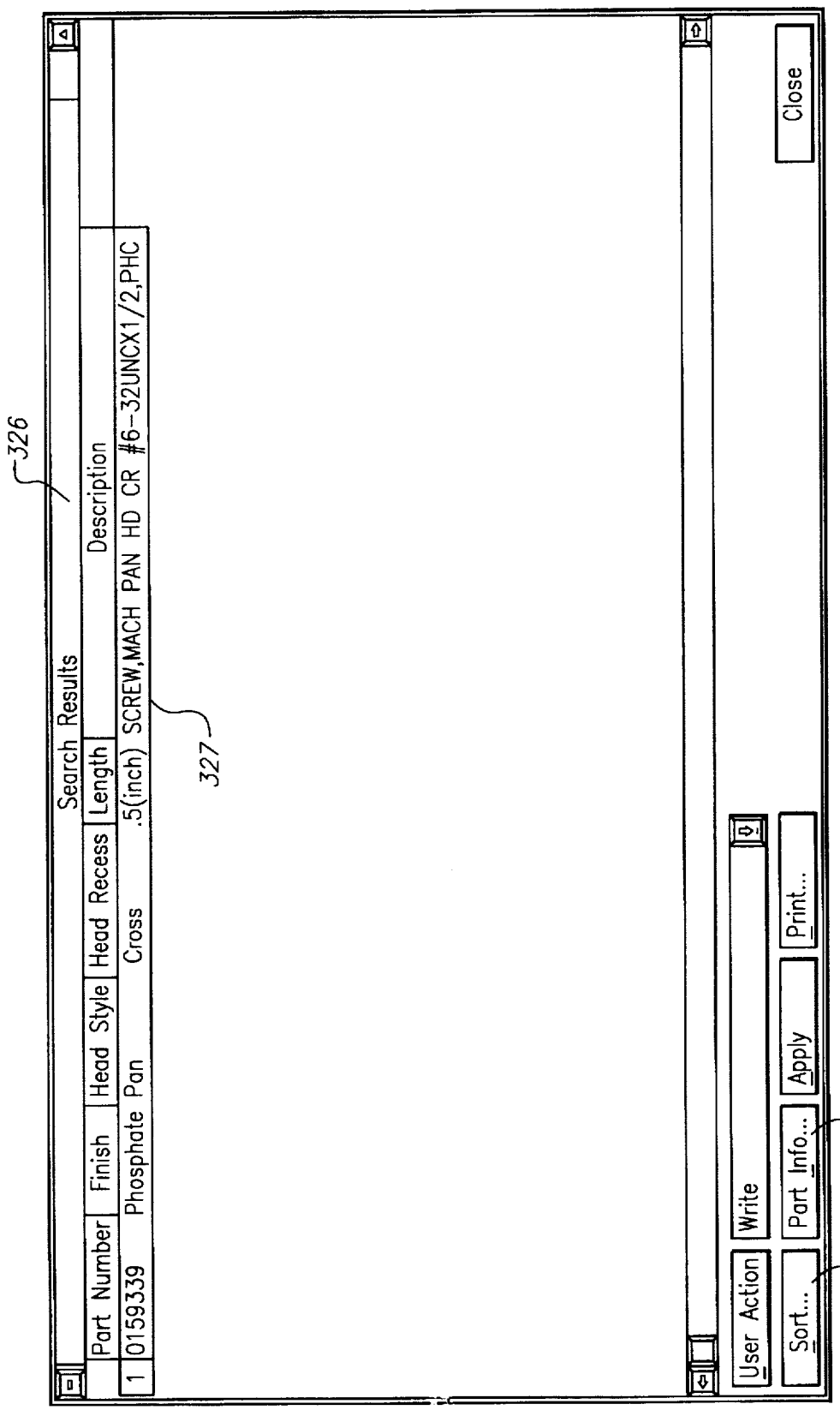
FIG. 24 depicts a display screen showing information displayed in the search results window.
Figure 26:
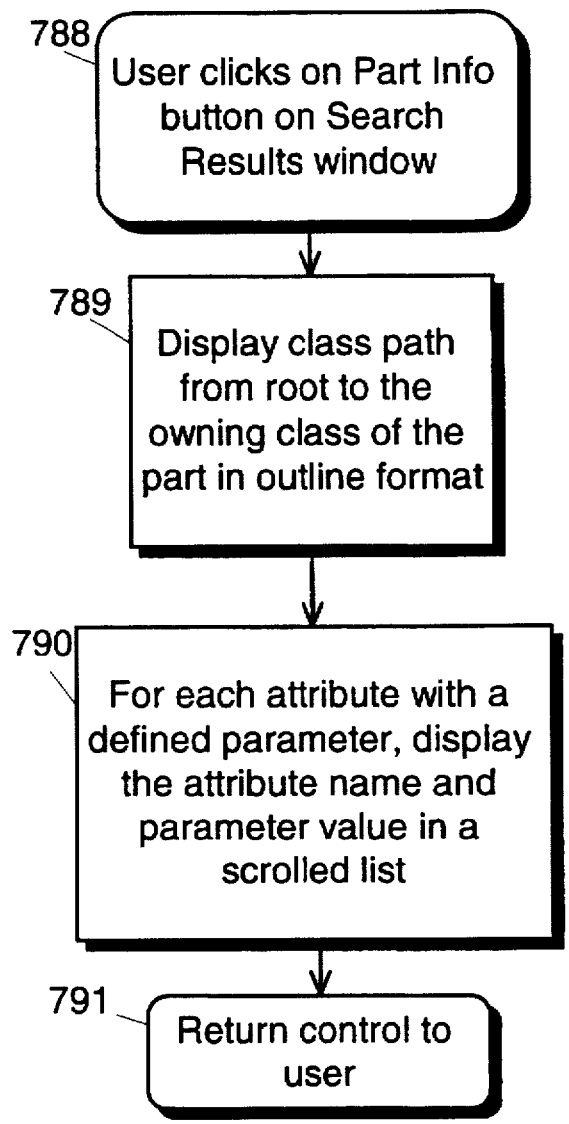
FIG. 26 is a flow chart depicting the procedure for displaying part information.

Referring to FIG. 24, the search results window 326 includes a part info button 328. The procedure initiated by actuation of the part info button 328 is shown in FIG. 26. In step 788, the user clicks on the part info button 328. The system proceeds to step 789 to produce a display of a class path in outline format 329 from the root class 153 to the owning class 330 of the part, as shown in part information display window 331 in FIG. 27. Referring to FIG. 26, the method proceeds to step 790 and produces a display of a scrolled list 332 containing attribute names and parameter values.

Figure 27:
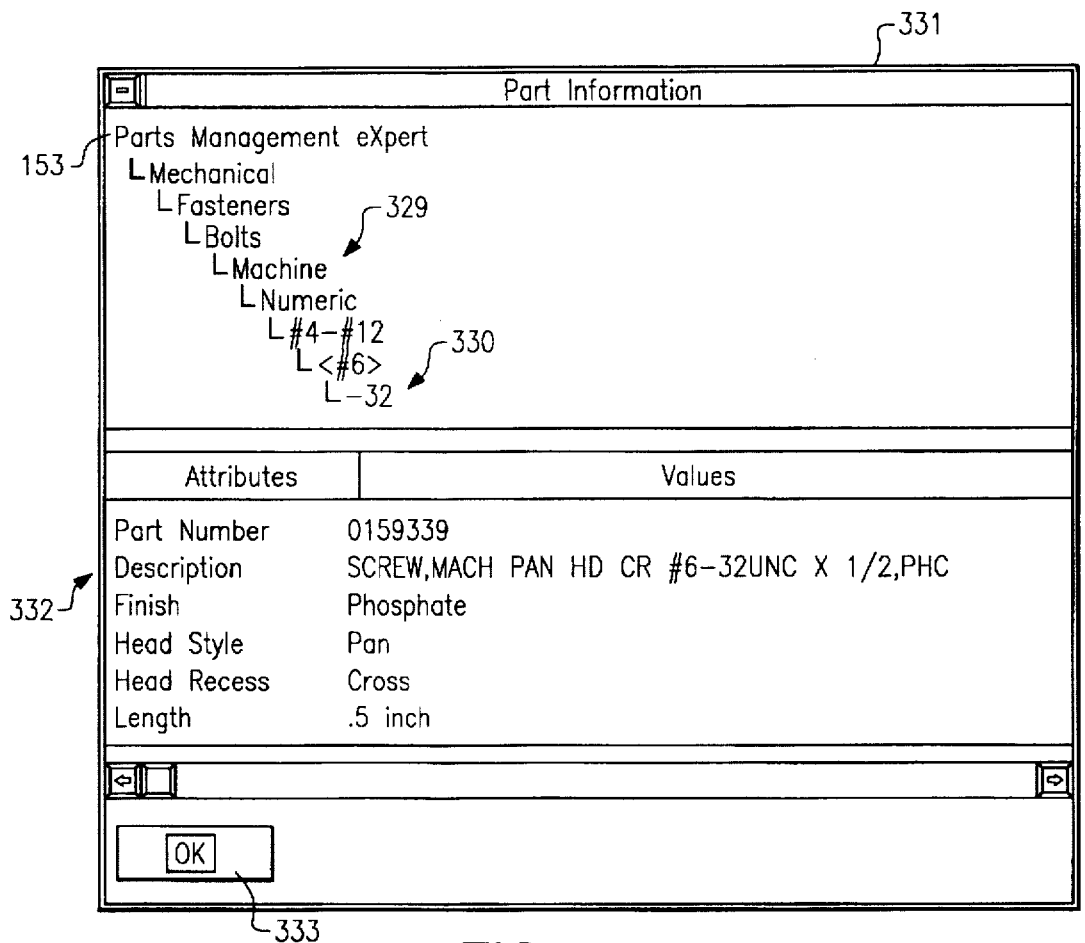
FIG. 27 depicts a display screen showing information displayed in the part information window.

FIG. 27 depicts the part information window 331. The attribute name and values for those attributes are displayed in a scrolled list 332. As described above, in order to display parameter values in the scrolled list 332 which are expressed in the currently selected language, international string parameter objects 216, such as the example shown in FIG. 9A, are used to retrieve the appropriate character string 279 for each parameter to be displayed. Similarly, in order to display attribute names in the scrolled list 332, international string attribute objects 290, such as that shown in FIG. 13B, are used to retrieve the character string 279 that corresponds to the currently selected language. And international string list objects such as that shown in FIG. 10, are used to retrieve the character string 279 which corresponds to the class names in the selected language that are to be displayed in the class path in outline format 329, as shown in the part information display window 331 in FIG. 27.

The part information window 331 shown in FIG. 27 may be closed by actuating the OK command button 333. Referring to FIG. 26, the method then goes to step 791 and control is returned to the user.

Figure 28:
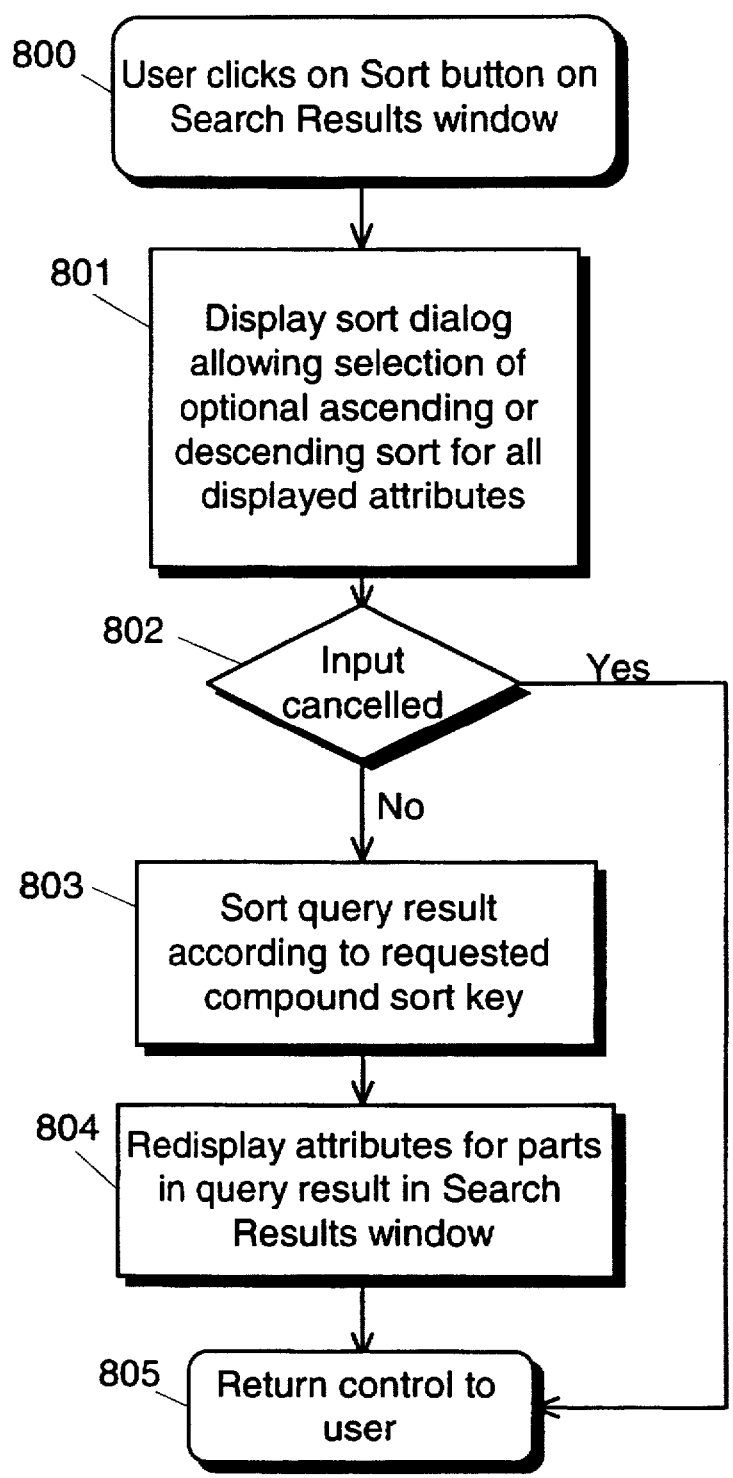
FIG. 28 is a flow chart depicting the procedure followed when the user actuates the sort button.

The sort procedure executed when the user actuates a sort button 340 in the search results window 326 is depicted in the flow chart of FIG. 28. Step 800 is performed when the user clicks on the sort button 340. The system then displays a sort dialog box 345, as described in step 801.

Figure 29:
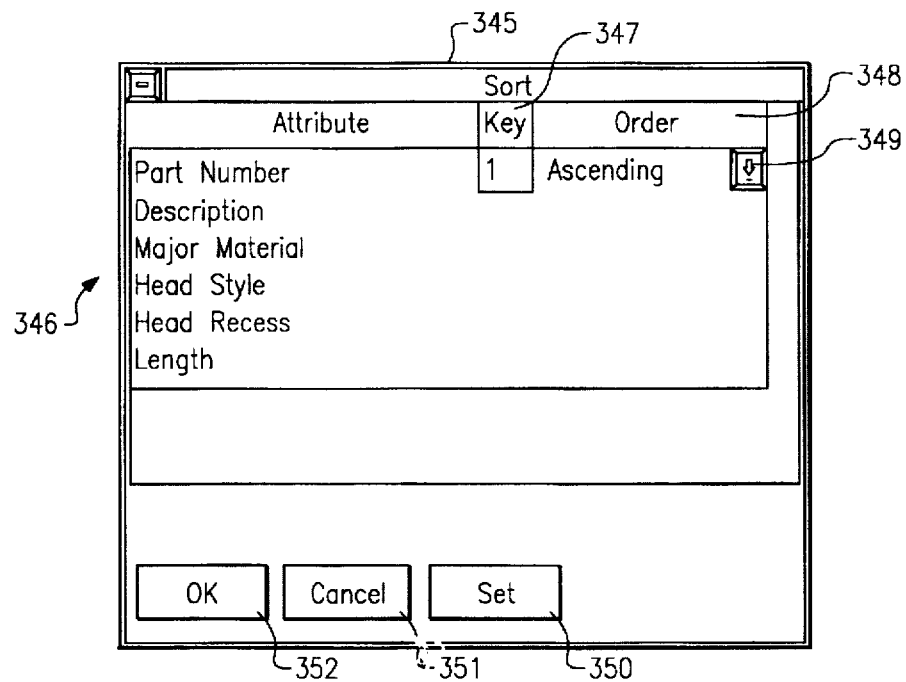
FIG. 29 depicts a display screen showing information displayed in the sort dialog box.

An example of a sort dialog box 345 is shown in FIG. 29. Attributes are displayed in an attribute column 346 in accordance with step 801 of FIG. 28. The dialog box 345 also includes a sort key column 347 and a sort order column 348. The sort order column 348 contains pull-down menus actuated by appropriate buttons 349 (only one of which is shown) which allow the user to select the sort order (such as ascending order or descending order) for each attribute. This is described in step 801 shown in FIG. 28.

The sort procedure allows a user to reorganize the list of parts in an alphanumeric or numeric sequence. The user can sort the list of parts in ascending or descending order based upon one or more of the attribute values.

To establish the sort order the user wishes to use, the user should choose the sort command button 340, then from the sort dialog box 345, select the attribute the user wants to sort first, then choose the set command button 350. The system checks the locale 212 for the selected language to obtain a sort sequence appropriate to the selected language. Additional information on how to use a different sort sequence for a selected language is described in P. J. Plauger, *The Standard C Library* (1992).

As shown in step 802 in FIG. 28, the user can cancel the input by actuating the cancel command button 351. If the user does so, flow will jump to step 805 and control will be returned to the user.

After selecting the attributes with respect to which the user wants to sort, the user may actuate the OK command button 352. This results in flow going to step 803 in FIG. 28. In step 803, the query result is sorted according to the requested sort sequence according to the selected language. In accordance with step 804, the sort dialog box 345 will close and the search results window 326 will reappear with the parts information sorted according to the user's selections in a manner appropriate to the selected language. Then in step 805, control will be returned to the user.

The above description is intended to set forth one or more presently preferred embodiments and examples of the present invention. The description is only intended to provide examples of embodiments employing the inventive concepts that are disclosed. Persons skilled in the art, after having the benefit of this disclosure, will appreciate that many modifications may be may to the particular embodiments and examples described herein without departing from the spirit or scope of the present invention. The present invention is not limited to the particular embodiments and examples described herein. The present invention is intended to be as broad as the claims appended hereto, when properly construed.

What is claimed is:

1. A dynamically selectable language display system for object oriented database management systems, comprising:

class objects having international string parameters that include a pointer to an international string list, said international string list including a language handle structure linked to a plurality of character strings in different languages; and, a handle manager operative to select a character string corresponding to one of said plurality of character strings for display which corresponds to a dynamically selectable user specified language handle, whereby a representation of said class object may be simultaneously displayed to a plurality of users in different languages based upon a language handle individually selectable by each of said plurality of users.

* * * * *